(12) United States Patent
Yamazaki et al.

(10) Patent No.: US 12,103,481 B2
(45) Date of Patent: Oct. 1, 2024

(54) OCCUPANT PROTECTION DEVICE

(71) Applicant: Semiconductor Energy Laboratory Co., Ltd., Atsugi (JP)

(72) Inventors: Shunpei Yamazaki, Setagaya (JP); Takayuki Ikeda, Atsugi (JP); Yoshiyuki Kurokawa, Sagamihara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/381,330

(22) Filed: Oct. 18, 2023

(65) Prior Publication Data
US 2024/0140341 A1    May 2, 2024

Related U.S. Application Data

(63) Continuation of application No. 17/337,464, filed on Jun. 3, 2021, now Pat. No. 11,794,679, which is a (Continued)

(30) Foreign Application Priority Data

Jan. 27, 2015  (JP) .................................. 2015-012880

(51) Int. Cl.
  *B60R 21/00*   (2006.01)
  *B60R 21/0134*   (2006.01)
  (Continued)

(52) U.S. Cl.
  CPC .......... *B60R 21/0134* (2013.01); *B60R 21/00* (2013.01); *G06V 20/56* (2022.01);
  (Continued)

(58) Field of Classification Search
  CPC ... B60R 21/0134; B60R 21/00; B60R 21/013; B60R 2021/01013; B60R 2021/01211; G06V 20/56; G06T 2207/30252
  See application file for complete search history.

(56) References Cited

U.S. PATENT DOCUMENTS 6,678,598 B1   1/2004  Hillebrand et al.
7,616,101 B2   11/2009 Kuttenberger et al.
(Continued)

FOREIGN PATENT DOCUMENTS

AT         215033         5/1961
CN      102245441 A      11/2011
(Continued)

OTHER PUBLICATIONS

International Search Report (Application No. PCT/IB2016/050184) Dated Mar. 29, 2016.
(Continued)

*Primary Examiner* — Truc M Do
(74) *Attorney, Agent, or Firm* — Eric J. Robinson; Robinson Intellectual Property Law Office, P.C.

(57) ABSTRACT

An occupant protection device which can protect an occupant without delay is provided. An image taken by an imaging device is analyzed to judge whether there is an object approaching the subject car. In the case where a collision between the object and the subject car is judged to be inevitable, an airbag device is activated before the collision, whereby the occupant can be protected without delay. By using selenium for a light-receiving element of the imaging device, an accurate image can be obtained even under low illuminance. Imaging in a global shutter system leads to an accurate image with little distortion. This enables more accurate image analysis.

8 Claims, 42 Drawing Sheets

Related U.S. Application Data continuation of application No. 15/544,087, filed as application No. PCT/IB2016/050184 on Jan. 15, 2016, now Pat. No. 11,027,684.

(51) Int. Cl.
  *G06V 20/56* (2022.01)
  *B60R 21/01* (2006.01)
  *B60R 21/013* (2006.01)

(52) U.S. Cl.
  CPC ............ *B60R 2021/01013* (2013.01); *B60R 2021/01211* (2013.01); *B60R 21/013* (2013.01); *G06T 2207/30252* (2013.01)

(56) References Cited

U.S. PATENT DOCUMENTS

| | | | |
|---|---|---|---|
| 7,691,666 B2 | 4/2010 | Levy et al. | |
| 7,843,408 B2 | 11/2010 | Yamazaki et al. | |
| 7,947,528 B2 | 5/2011 | Iwabuchi et al. | |
| 8,049,293 B2 | 11/2011 | Iwabuchi et al. | |
| 8,242,988 B2 | 8/2012 | Yamazaki et al. | |
| 8,309,392 B2 | 11/2012 | Iwabuchi et al. | |
| 8,378,391 B2 | 2/2013 | Koyama et al. | |
| 8,440,499 B2 | 5/2013 | Iwabuchi et al. | |
| 8,508,256 B2 | 8/2013 | Yakubo et al. | |
| 8,536,670 B2 | 9/2013 | Yoshihara et al. | |
| 8,552,933 B2 | 10/2013 | Koyama et al. | |
| 8,570,256 B2 | 10/2013 | Yamazaki et al. | |
| 8,716,712 B2 | 5/2014 | Kozuma et al. | |
| 8,809,983 B2 | 8/2014 | Yoshihara et al. | |
| 8,825,305 B2 | 9/2014 | Itoga | |
| 8,841,743 B2 | 9/2014 | Iwabuchi et al. | |
| 8,916,869 B2 | 12/2014 | Koyama et al. | |
| 8,946,610 B2 | 2/2015 | Iwabuchi et al. | |
| 9,007,503 B2 | 4/2015 | Oike | |
| 9,058,972 B2 | 6/2015 | Yoshihara et al. | |
| 9,117,710 B2 | 8/2015 | Iwabuchi et al. | |
| 9,117,713 B2 | 8/2015 | Koyama | |
| 9,131,171 B2 | 9/2015 | Aoki et al. | |
| 9,196,648 B2 | 11/2015 | Kozuma et al. | |
| 9,197,825 B2 | 11/2015 | Oike | |
| 9,199,614 B2 | 12/2015 | Ito | |
| 9,236,408 B2 | 1/2016 | Yamazaki | |
| 9,270,903 B2 | 2/2016 | Wayama et al. | |
| 9,331,112 B2 | 5/2016 | Koyama et al. | |
| 9,443,893 B2 | 9/2016 | Yamazaki | |
| 9,548,327 B2 | 1/2017 | Inoue et al. | |
| 9,576,994 B2 | 2/2017 | Inoue et al. | |
| 9,576,995 B2 | 2/2017 | Inoue et al. | |
| 9,584,707 B2 | 2/2017 | Inoue et al. | |
| 9,615,043 B2 | 4/2017 | Oike | |
| 9,666,626 B2 | 5/2017 | Kishi | |
| 9,673,249 B2 | 6/2017 | Iwabuchi et al. | |
| 9,704,899 B2 | 7/2017 | Kurokawa | |
| 9,748,291 B2 | 8/2017 | Ikeda et al. | |
| 9,748,292 B2 | 8/2017 | Yamazaki | |
| 9,773,814 B2 | 9/2017 | Koyama et al. | |
| 9,807,330 B2 | 10/2017 | Aoki | |
| 9,900,482 B2 | 2/2018 | Oike | |
| 9,905,596 B2 | 2/2018 | Koyama | |
| 9,955,097 B2 | 4/2018 | Iwabuchi et al. | |
| 10,129,444 B2 | 11/2018 | Oike | |
| 10,129,497 B2 | 11/2018 | Iwabuchi et al. | |
| 10,163,948 B2 | 12/2018 | Ohmaru | |
| 10,192,913 B2 | 1/2019 | Kurokawa | |
| 10,506,190 B2 | 12/2019 | Kishi | |
| 10,594,972 B2 | 3/2020 | Iwabuchi et al. | |
| 10,645,324 B2 | 5/2020 | Iwabuchi et al. | |
| 10,999,550 B2 | 5/2021 | Kishi | |
| 2002/0000573 A1 | 1/2002 | Higuchi et al. | |
| 2003/0040859 A1 | 2/2003 | Farmer | |
| 2003/0075746 A1 | 4/2003 | Maeda et al. | |
| 2003/0114972 A1 | 6/2003 | Takafuji et al. | |
| 2004/0252565 A1* | 12/2004 | Yamazaki | G09G 3/3233 365/202 |
| 2004/0263506 A1* | 12/2004 | Koyama | G09G 3/3225 345/204 |
| 2006/0284171 A1 | 12/2006 | Levy et al. | |
| 2008/0129541 A1 | 6/2008 | Lu et al. | |
| 2009/0152664 A1 | 6/2009 | Klem et al. | |
| 2010/0120197 A1 | 5/2010 | Levy et al. | |
| 2010/0182471 A1 | 7/2010 | Toda | |
| 2011/0101201 A1 | 5/2011 | Venezia et al. | |
| 2011/0108836 A1 | 5/2011 | Koyama et al. | |
| 2011/0121189 A1 | 5/2011 | Okada | |
| 2011/0125372 A1 | 5/2011 | Ito | |
| 2011/0149102 A1 | 6/2011 | Toda | |
| 2011/0215323 A1 | 9/2011 | Kurokawa et al. | |
| 2011/0231067 A1 | 9/2011 | Itoga | |
| 2012/0200734 A1 | 8/2012 | Tang | |
| 2012/0330512 A1 | 12/2012 | Mahlisch | |
| 2013/0070133 A1 | 3/2013 | Takazawa | |
| 2013/0222584 A1 | 8/2013 | Aoki et al. | |
| 2013/0285046 A1 | 10/2013 | Yamazaki | |
| 2013/0292729 A1 | 11/2013 | Nunotani et al. | |
| 2015/0332568 A1 | 11/2015 | Kurokawa | |
| 2016/0155852 A1 | 6/2016 | Yamazaki et al. | |
| 2016/0234452 A1 | 8/2016 | Aoki | |
| 2016/0329024 A1 | 11/2016 | Maeda | |
| 2016/0329368 A1 | 11/2016 | Ohmaru | |
| 2017/0195602 A1 | 7/2017 | Iwabuchi et al. | |
| 2021/0021776 A1 | 1/2021 | Iwabuchi et al. | |
| 2021/0227165 A1 | 7/2021 | Kishi | |

FOREIGN PATENT DOCUMENTS

| | | |
|---|---|---|
| DE | 1146669 | 4/1963 |
| DE | 10231362 | 1/2004 |
| DE | 102004046101 | 9/2006 |
| DE | 102009038906 | 3/2011 |
| DE | 102011105356 | 12/2012 |
| EP | 2371629 A | 10/2011 |
| EP | 2426718 A | 3/2012 |
| EP | 3051588 A | 8/2016 |
| JP | 05-345556 A | 12/1993 |
| JP | 2001-308306 A | 11/2001 |
| JP | 2003-182508 A | 7/2003 |
| JP | 2004-361424 A | 12/2004 |
| JP | 2005-037919 A | 2/2005 |
| JP | 2008-547195 | 12/2008 |
| JP | 2010-137607 A | 6/2010 |
| JP | 2011-100584 A | 5/2011 |
| JP | 2011-105250 A | 6/2011 |
| JP | 2011-109012 A | 6/2011 |
| JP | 2011-119710 A | 6/2011 |
| JP | 2011-119711 A | 6/2011 |
| JP | 2011-192976 A | 9/2011 |
| JP | 2012-054450 A | 3/2012 |
| JP | 2012-054876 A | 3/2012 |
| JP | 2012-248953 A | 12/2012 |
| JP | 2013-009364 A | 1/2013 |
| JP | 2013-051674 A | 3/2013 |
| JP | 2013-131610 A | 7/2013 |
| JP | 2013-243355 A | 12/2013 |
| JP | 2014-112720 A | 6/2014 |
| JP | 2014-197862 A | 10/2014 |
| JP | 2015-095676 A | 5/2015 |
| JP | 2016-086164 A | 5/2016 |
| JP | 2017-028286 A | 2/2017 |
| WO | WO-2001/000459 | 1/2001 |
| WO | WO-2006/129762 | 12/2006 |
| WO | WO-2006/138071 | 12/2006 |
| WO | WO-2011/055625 | 5/2011 |
| WO | WO-2011/055626 | 5/2011 |
| WO | WO-2011/102183 | 8/2011 |

OTHER PUBLICATIONS

Written Opinion (Application No. PCT/IB2016/050184) Dated Mar. 29, 2016.

(56) References Cited

OTHER PUBLICATIONS

German Office Action (Application No. 112016000496.6) Dated Nov. 16, 2020.

* cited by examiner

FIG. 6
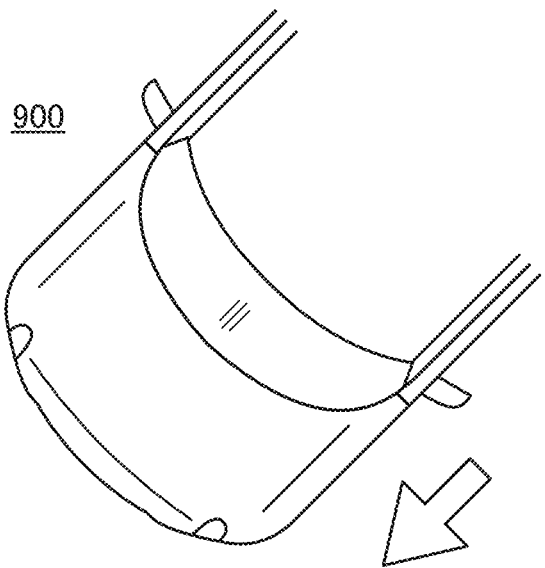
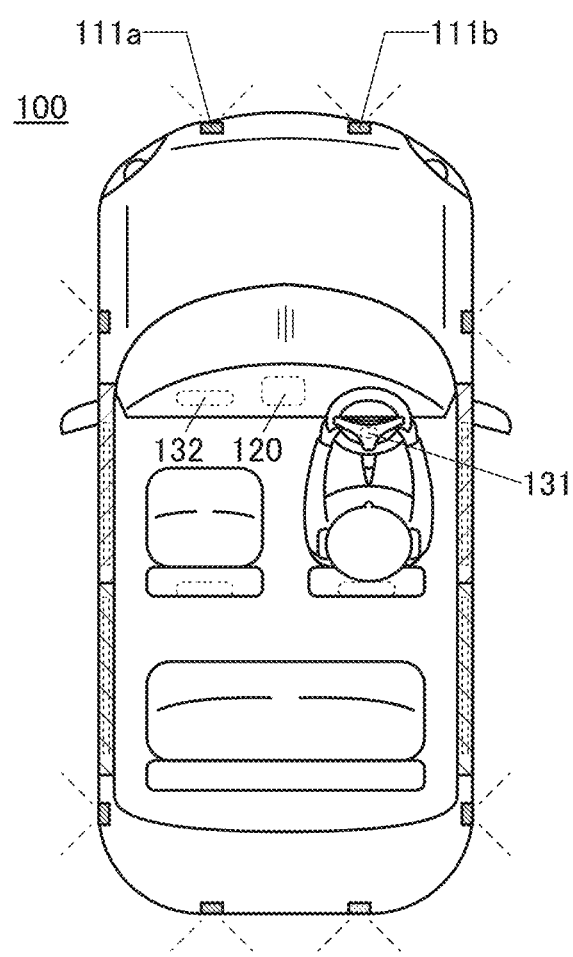

FIG. 12
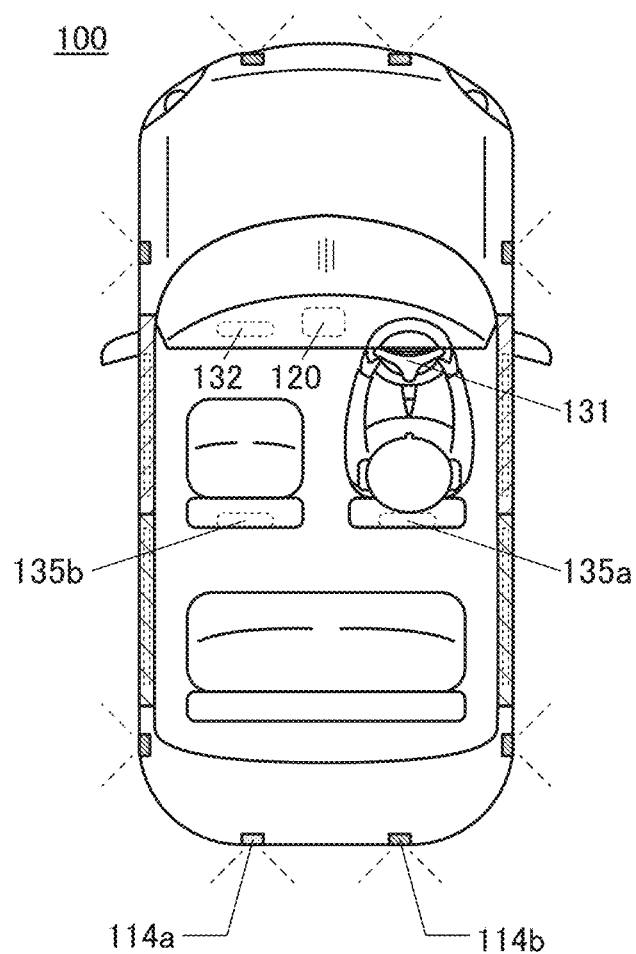
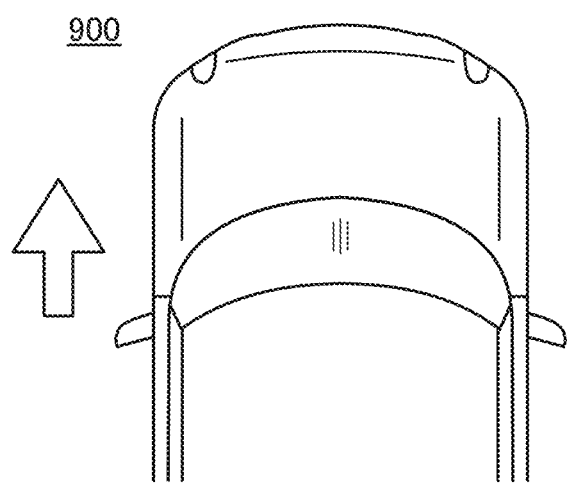

FIG. 30A1
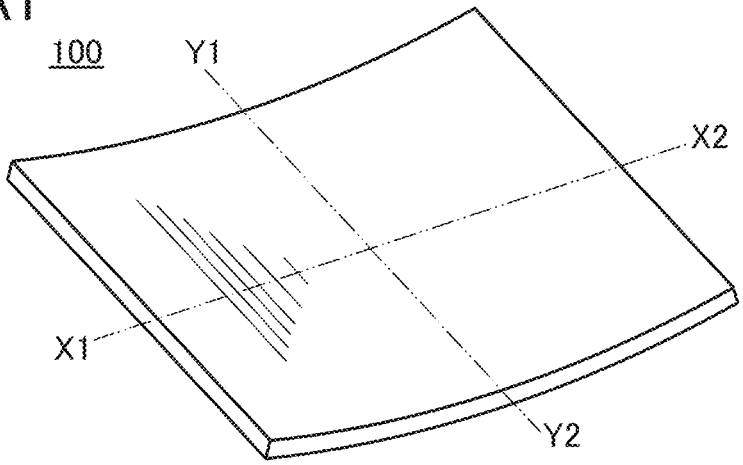
FIG. 30A2
FIG. 30A3
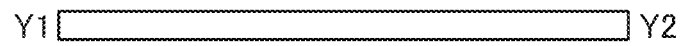
FIG. 30B1
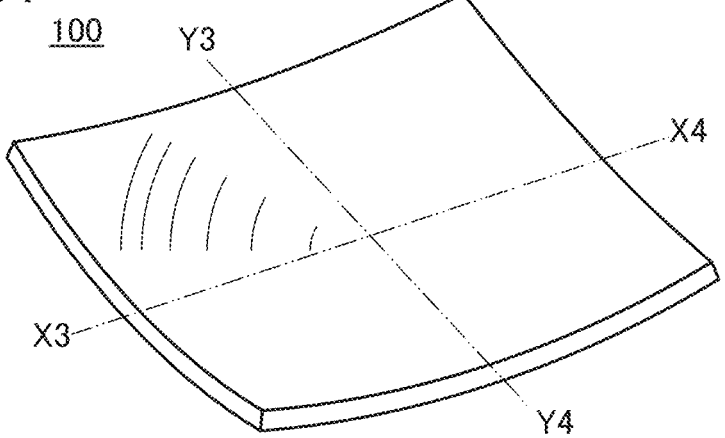
FIG. 30B2
FIG. 30B3

FIG. 31A1
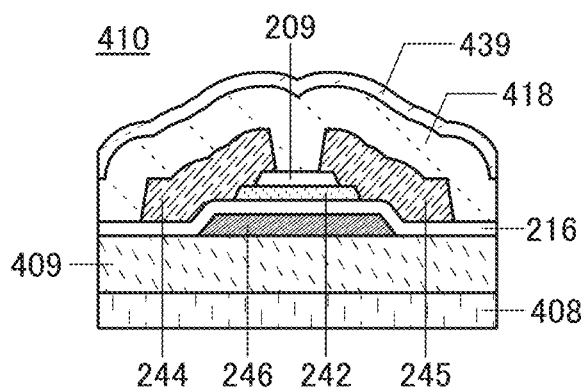
FIG. 31A2
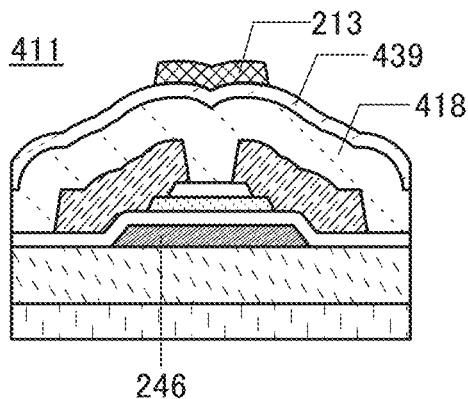
FIG. 31B1
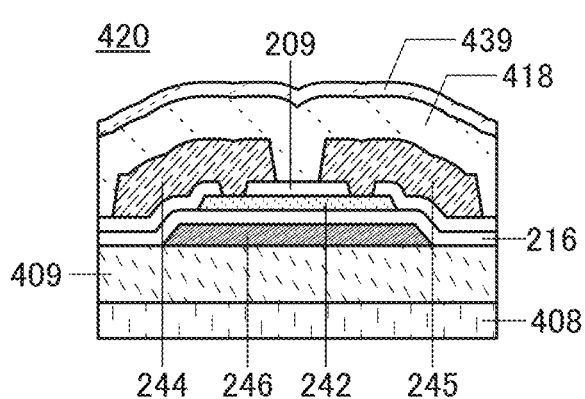
FIG. 31B2
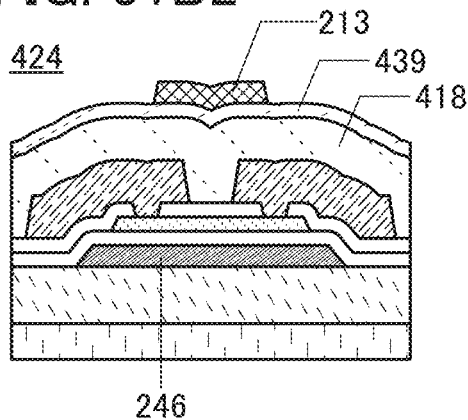
FIG. 31C1
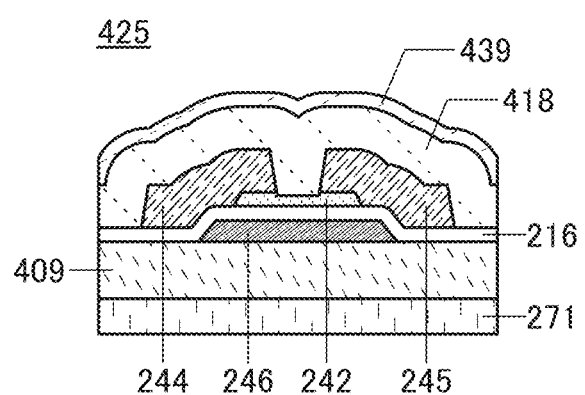
FIG. 31C2
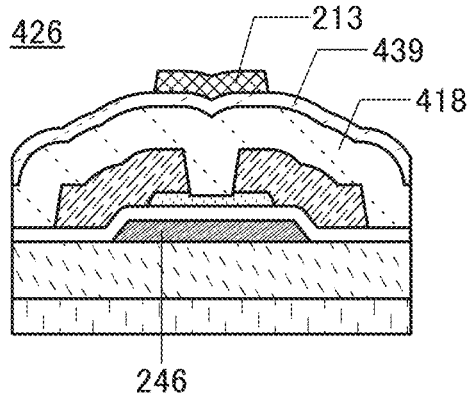

FIG. 32A1
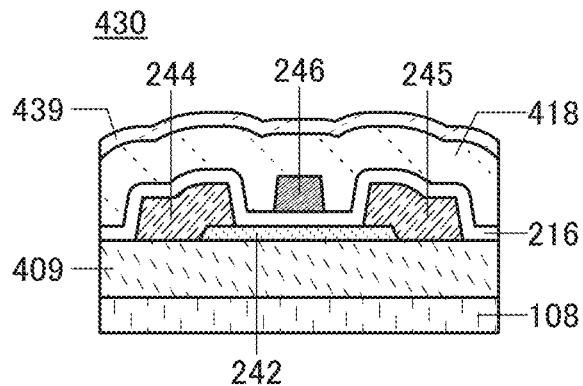
FIG. 32A2
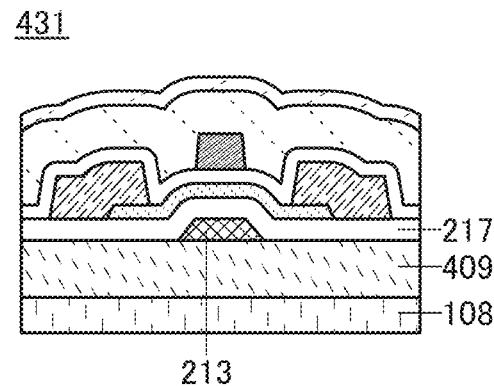
FIG. 32A3
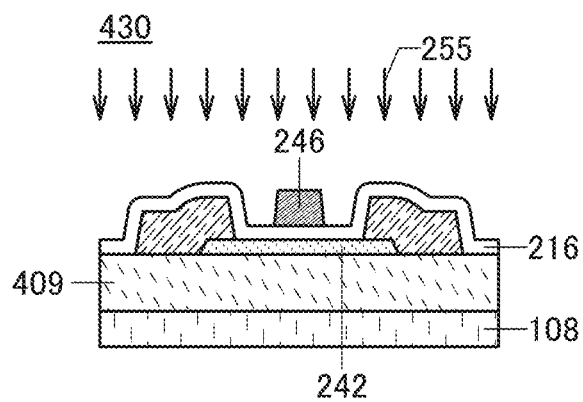
FIG. 32B1
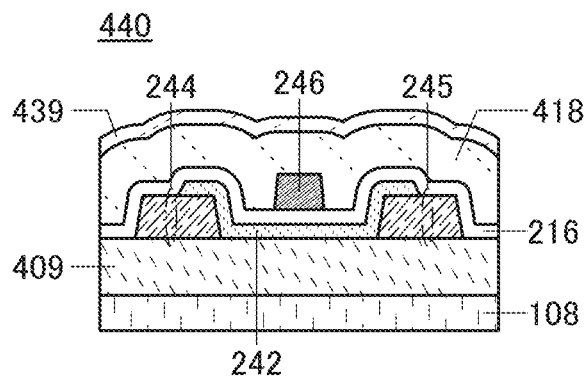
FIG. 32B2
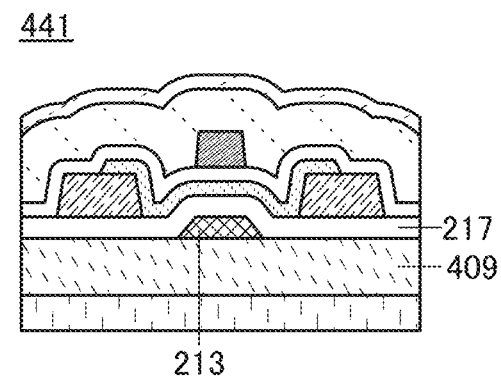

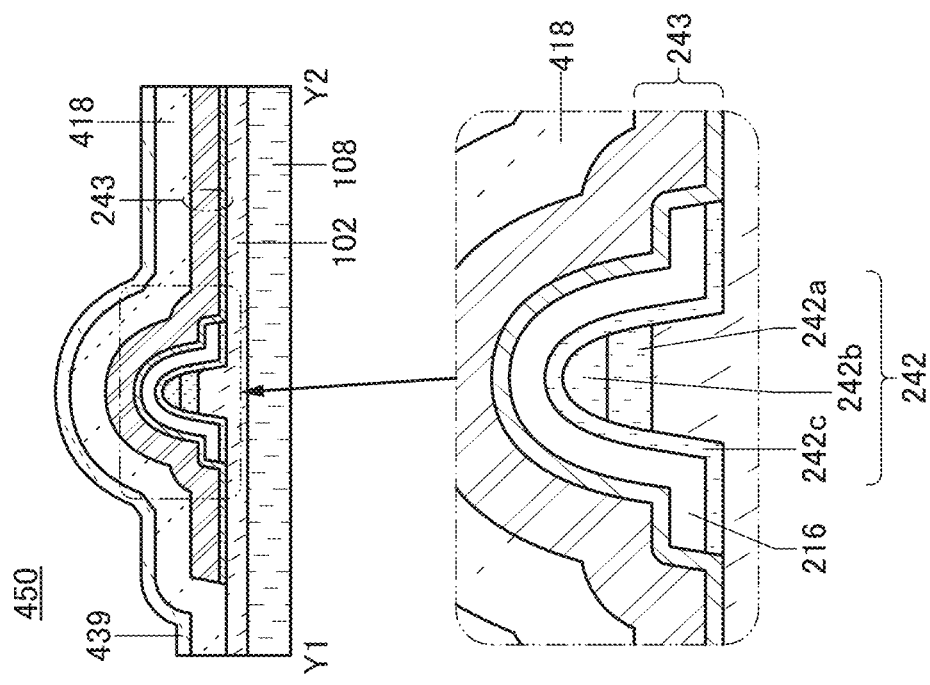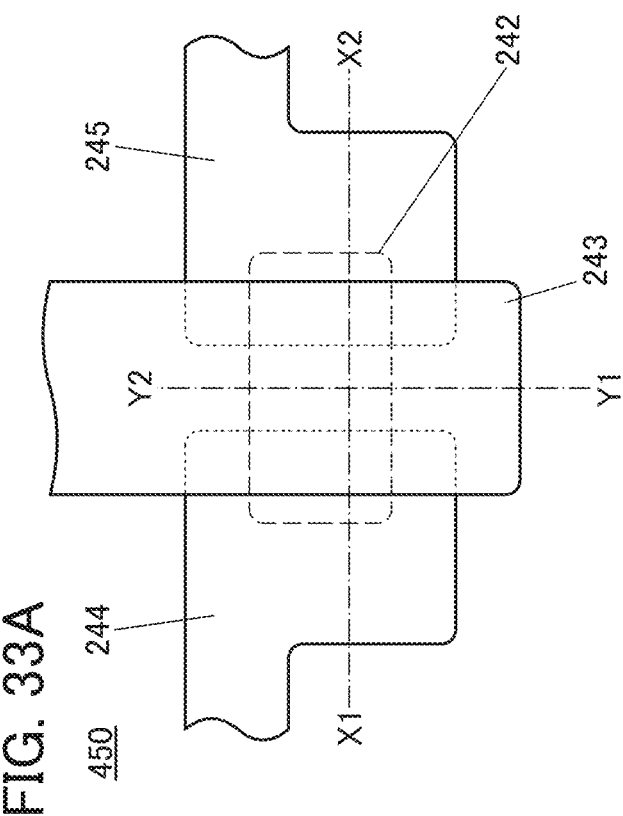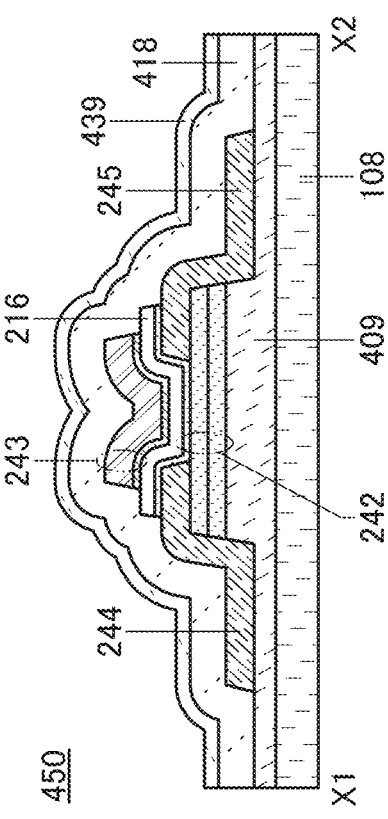
FIG. 33A
FIG. 33B
FIG. 33C

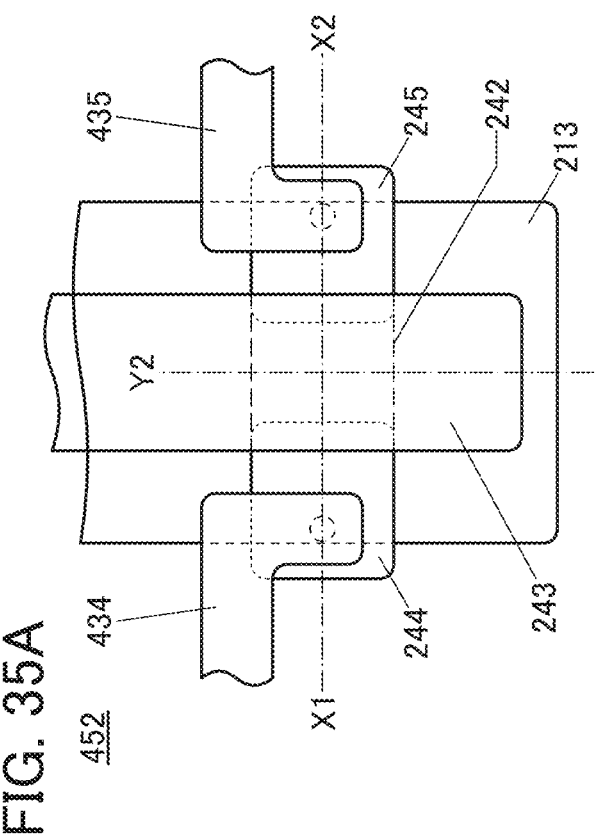
FIG. 35A
FIG. 35C
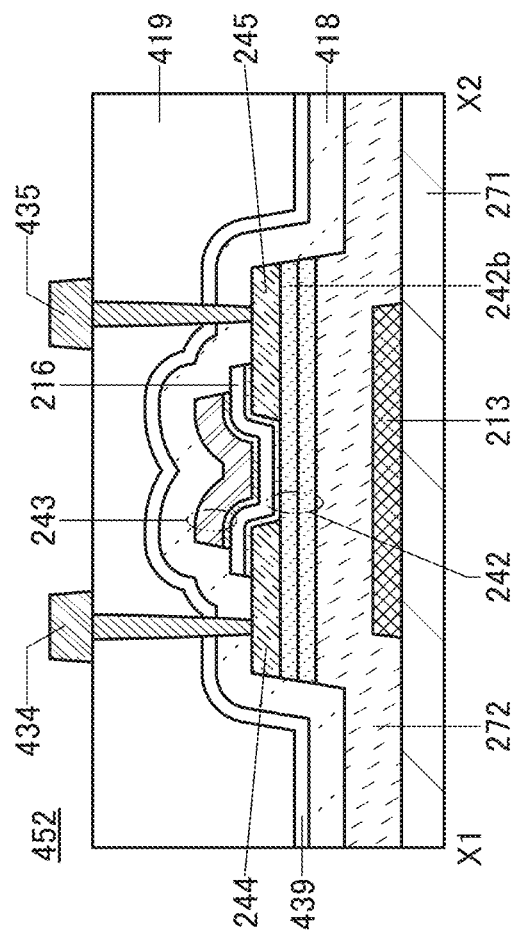
FIG. 35B

FIG. 39A
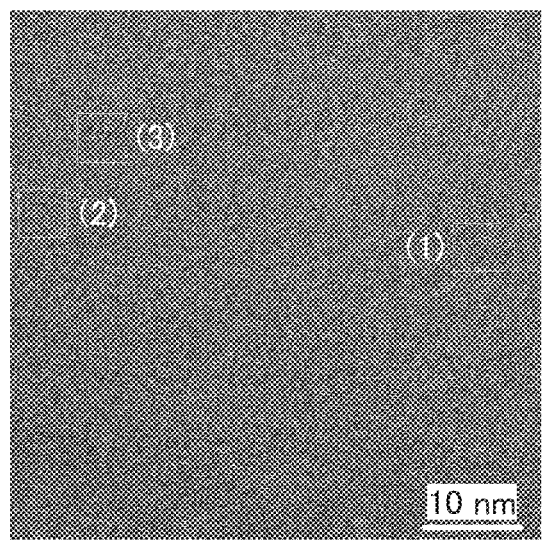
FIG. 39B   FIG. 39C   FIG. 39D
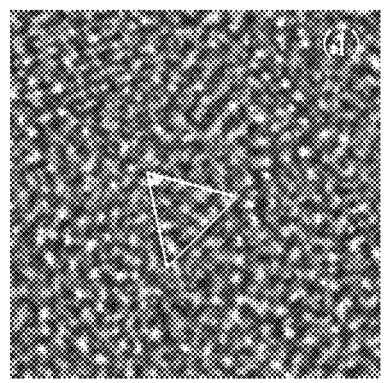 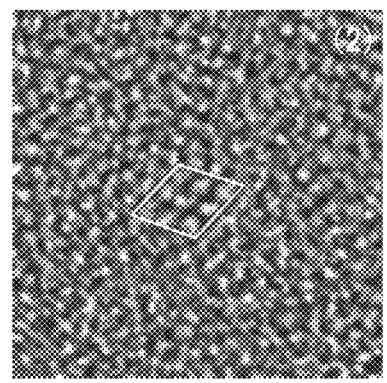 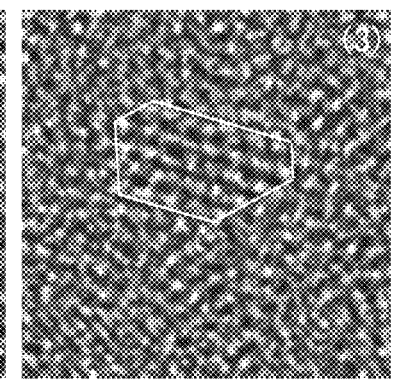

OCCUPANT PROTECTION DEVICE

TECHNICAL FIELD

One embodiment of the present invention relates to an occupant protection device. Another embodiment of the present invention relates to a method for operating an occupant protection device.

Note that one embodiment of the present invention is not limited to the above technical field. The technical field of one embodiment of the invention disclosed in this specification and the like relates to an object, a method, or a manufacturing method. Another embodiment of the present invention relates to a process, a machine, manufacture, or a composition (composition of matter).

In this specification and the like, a semiconductor device generally means a device that can function by utilizing semiconductor characteristics. Thus, a semiconductor element such as a transistor or a diode and a semiconductor circuit are semiconductor devices. Furthermore, a display device, a light-emitting device, a lighting device, an electro-optical device, an imaging device, an electronic appliance, and the like may each include a semiconductor element or a semiconductor circuit. Therefore, a display device, a light-emitting device, a lighting device, an electro-optical device, an imaging device, an electronic appliance, and the like may each include a semiconductor device.

BACKGROUND ART

In recent years, airbag devices which protect occupants from the impact of car collisions have been increasingly put into practical use. In general, an airbag device has a function of protecting an occupant as follows: when a car collision is sensed by an acceleration sensor, a gas supply device (an inflator) is operated to inflate an airbag with a gas which is abruptly generated by the inflator.

As airbag devices, besides the ones that are mounted on a steering wheel, an instrument panel, and the like to protect the driver, a front passenger seat airbag for protecting a front passenger seat occupant, a backseat airbag for protecting a backseat occupant, and the like are known. In addition, a side airbag for protecting an occupant from the impact of a side collision, an airbag which deploys toward the ceiling, an air belt, i.e., a safety belt with a built-in airbag, and the like are known.

Furthermore, so-called "smart airbags" which detect the physique of an occupant, the position of the occupant relative to the airbag, the manner in which the safety belt is worn, the seated condition in a child safety seat, and the like to determine whether or not to deploy the airbag, the deployment state, the deployment method, and the like are also increasingly put into practical use.

Patent Document 1 discloses an airbag device, namely an airbag device for a side collision (a side airbag) in which electromagnetic waves or ultrasonic waves are used for collision prediction to prevent an acceleration sensor from malfunctioning when the door is opened or closed. Furthermore, Patent Document 2 discloses a technical idea that, from an object anticipated to collide which is imaged by an image sensor, the impact force of a collision is estimated to optimize the timing at which an airbag device starts to operate and the pressure in the airbag.

PRIOR ART DOCUMENT

Patent Document

[Patent Document 1] Japanese Published Patent Application No. H5-345556

[Patent Document 2] Japanese Published Patent Application No. 2003-182508

SUMMARY OF INVENTION

Problem to be Solved by Invention

The collision prediction in Patent Document 1, in which electromagnetic waves or ultrasonic waves are used, provides only the distance between the car and an object anticipated to collide and cannot presume the object anticipated to collide itself; therefore, it is difficult to estimate the impact force of the collision. In the method disclosed in Patent Document 2, the accuracy in collision prediction is decreased especially under low illuminance, e.g., during night time because imaging with an existing image sensor (imaging device) is difficult. Moreover, while the car travels, as compared with the front or rear outside view with respect to the traveling direction, the side outside view changes fast. Thus, a side-view image taken while the car travels is likely to have a distortion, which makes the image analysis difficult. For this reason, the method disclosed in Patent Document 2 has a problem in that the accuracy in collision prediction is decreased especially in use for side collision prediction.

An object of one embodiment of the present invention is to provide an occupant protection device or the like which can protect an occupant from the impact of a car collision without delay. Another object is to provide an occupant protection device or the like which can operate accurately even under low illuminance, e.g., during night time. Another object is to provide an occupant protection device or the like which can operate accurately even while the car travels. Another object is to provide an occupant protection device or the like which can safely protect an occupant. Another object is to provide a novel occupant protection device or the like.

Note that the description of these objects does not disturb the existence of other objects. Note that one embodiment of the present invention does not need to achieve all the objects. Note that other objects will be apparent from the description of the specification, the drawings, the claims, and the like and other objects can be derived from the description of the specification, the drawings, the claims, and the like.

Means to Solve Problem

One embodiment of the present invention is an occupant protection device including an imaging device, a control device, and an airbag device. In the occupant protection device, the imaging device includes a light-receiving element containing selenium and a transistor including an oxide semiconductor, and the control device includes a means for predicting a collision with the use of an image taken by the imaging device and a means for activating the airbag device.

One embodiment of the present invention is an occupant protection device including an imaging device, a control device, and an airbag device. In the occupant protection device, the imaging device includes a light-receiving element containing selenium and a transistor including an oxide semiconductor, and the control device includes a means for predicting a collision with the use of an image taken by the imaging device and a means for activating, before the collision, the airbag device on the basis of the prediction.

In the occupant protection device of one embodiment of the present invention, a plurality of imaging devices is preferably used. Furthermore, the imaging device preferably operates in a global shutter system. Furthermore, the oxide semiconductor preferably contains at least one of In and Zn.

Note that one embodiment of the present invention can be applied not only to cars such as an automobile and a bus but also to every moving object. For example, it can be applied to a variety of moving objects, namely railroad vehicles such as an electric train and a locomotive, earthmoving vehicles such as a crane truck and a bulldozer, piloted robots, aircraft such as an airplane and a helicopter, ships, submarines, and spacecraft.

Effect of Invention

An occupant protection device or the like which can protect an occupant from the impact of a car collision without delay can be provided. Furthermore, an occupant protection device or the like which can operate accurately even under low illuminance, e.g., during night time can be provided. Furthermore, an occupant protection device or the like which can operate accurately even while the car travels can be provided. Furthermore, an occupant protection device which can safely protect an occupant can be provided. Furthermore, a novel occupant protection device or the like can be provided.

Note that the description of these effects does not disturb the existence of other effects. Note that one embodiment of the present invention does not necessarily have all the effects. Note that other effects will be apparent from the description of the specification, the drawings, the claims, and the like and other effects can be derived from the description of the specification, the drawings, the claims, and the like.

BRIEF DESCRIPTION OF DRAWINGS

FIG. 6 A view illustrating an operation example of an occupant protection device.

FIG. 12 A view illustrating an operation example of an occupant protection device.

FIGS. 30A1-30B3 Views illustrating examples of a bent imaging device.

FIGS. 31A1-31C2 Views illustrating examples of transistors.

FIGS. 32A1-32B2 Views illustrating examples of transistors.

FIGS. 33A-33C Views illustrating an example of a transistor.

FIGS. 35A-35C Views illustrating an example of a transistor.

FIGS. 39A-39D Cs-corrected high-resolution plan-view TEM images of a CAAC-OS.

MODES FOR CARRYING OUT INVENTION

Figure 1A:
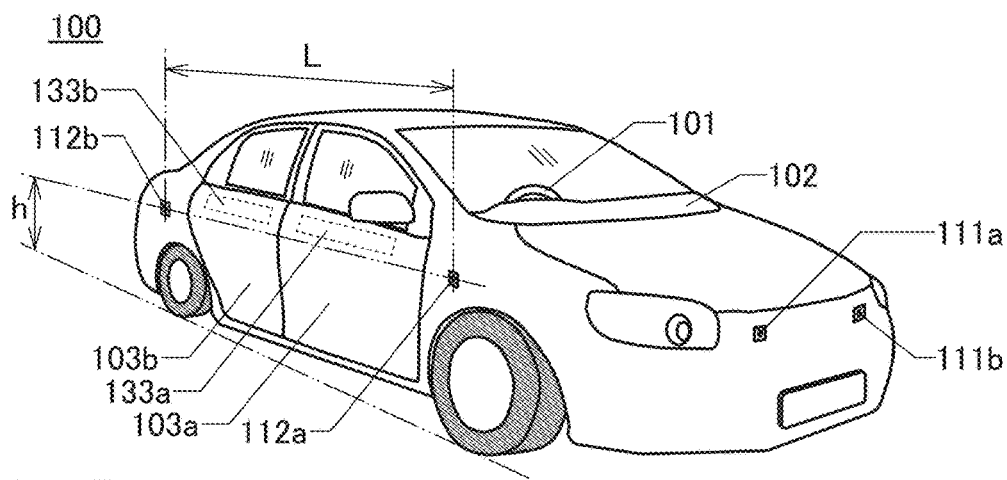
FIGS. 1A-1C Views illustrating a car 100.

Embodiments of the present invention will be described in detail below with reference to the drawings. Note that the present invention is not limited to the following description, and it is easily understood by those skilled in the art that its modes and details can be modified in various ways. In addition, the present invention should not be construed as being limited to the description of the embodiments shown below.

In each drawing described in this specification, each structure may be exaggerated in size, layer thickness, or region or omitted for clarity of the invention. Therefore, the scale is not necessarily limited to the illustrated one. Furthermore, in a top view (also referred to as "plan view"), a perspective view, or the like, the illustration of some components may be omitted for simplicity of the drawing. In addition, the illustration of some hidden lines or the like may be omitted.

Ordinal numbers such as "first" and "second" in this specification and the like are used to avoid confusion between components and do not denote any priority or order such as the order of steps or the stacking order. Furthermore, even a term which is not assigned with any ordinal number in this specification and the like may be assigned with an ordinal number in a claim to avoid confusion between components. Furthermore, even a term which is assigned with an ordinal number in this specification and the like may be assigned with a different ordinal number in a claim. Furthermore, regarding a term which is assigned with an ordinal number in this specification and the like, the ordinal number may be omitted in a claim or the like.

Furthermore, an explicit expression "X and Y are connected" in this specification and the like means that the case where X and Y are electrically connected, the case where X and Y are functionally connected, and the case where X and Y are directly connected are disclosed in this specification and the like. Accordingly, without being limited to a predetermined connection relationship, e.g., a connection relationship shown in a drawing or a text, a connection relationship which is not shown in the drawing or the text is also disclosed in the drawing or the text.

In addition, in this specification and the like, "parallel" refers, for example, to a state in which two straight lines are arranged at an angle greater than or equal to −10° and less than or equal to 10°. Accordingly, the case where the angle is greater than or equal to −5° and less than or equal to 5° is also included. Similarly, "perpendicular" and "orthogonal" refer, for example, to a state in which two straight lines are arranged at an angle greater than or equal to 80° and less than or equal to 100°. Accordingly, the case where the angle is greater than or equal to 85° and less than or equal to 95° is also included.

Note that in the specification and the like, terms for describing calculation values and measurement values, such as "identical", "same", "equal", and "uniform" (including synonyms thereof), allow for a margin of error of ±20% unless otherwise specified.

Furthermore, in this specification and the like, a high power supply potential VDD (hereinafter also referred to simply as "VDD" or "H potential") means a power supply potential that is a potential higher than a low power supply potential VSS. Similarly, the low power supply potential VSS (hereinafter also referred to simply as "VSS" or "L potential") means a power supply potential that is a potential lower than the high power supply potential VDD. In addition, a ground potential can be used as VDD or VSS. For example, in the case where a ground potential serves as VDD, VSS is a potential that is lower than the ground potential; in the case where a ground potential serves as VSS, VDD is a potential that is higher than the ground potential.

Note that the word "film" and the word "layer" can be interchanged with each other depending on the case or circumstances. For example, the term "conductive layer" can be changed into the term "conductive film" in some cases. As another example, the term "insulating film" can be changed into the term "insulating layer" in some cases.

Furthermore, in this specification, a trigonal or rhombohedral crystal is represented by a hexagonal crystal system.

Embodiment 1

Figure 1B:
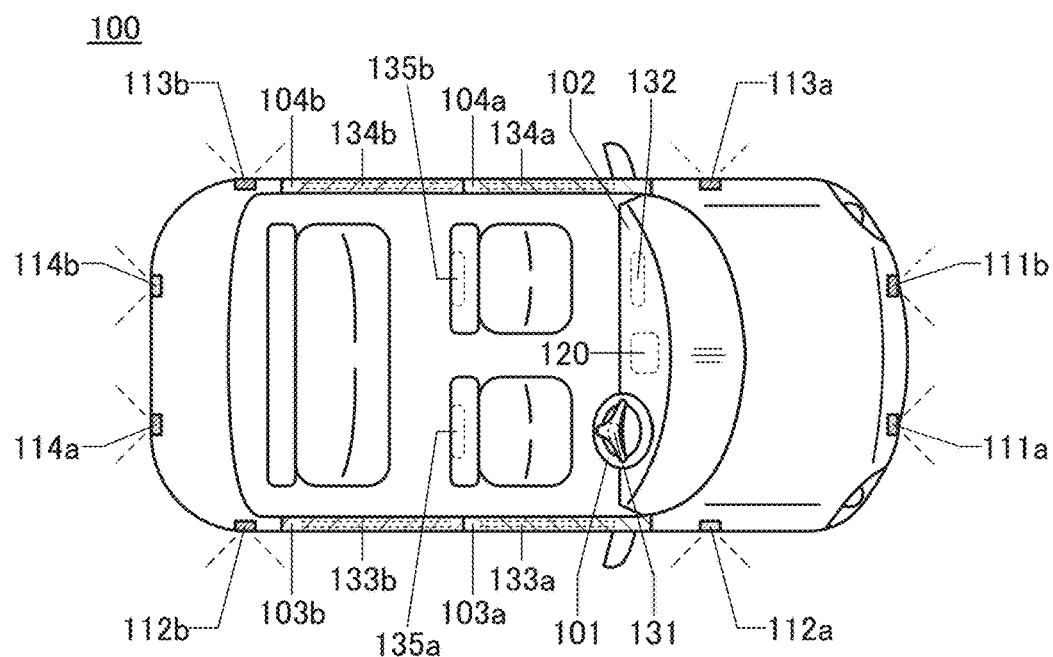
Figure 1C:
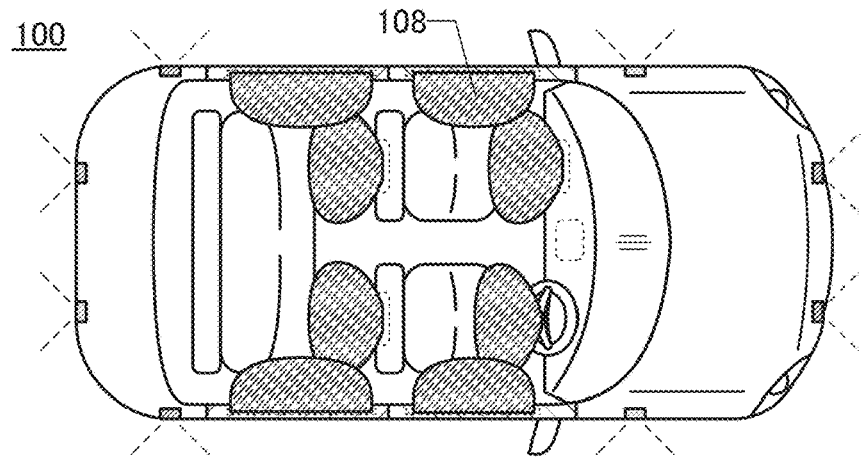
Figure 2A:
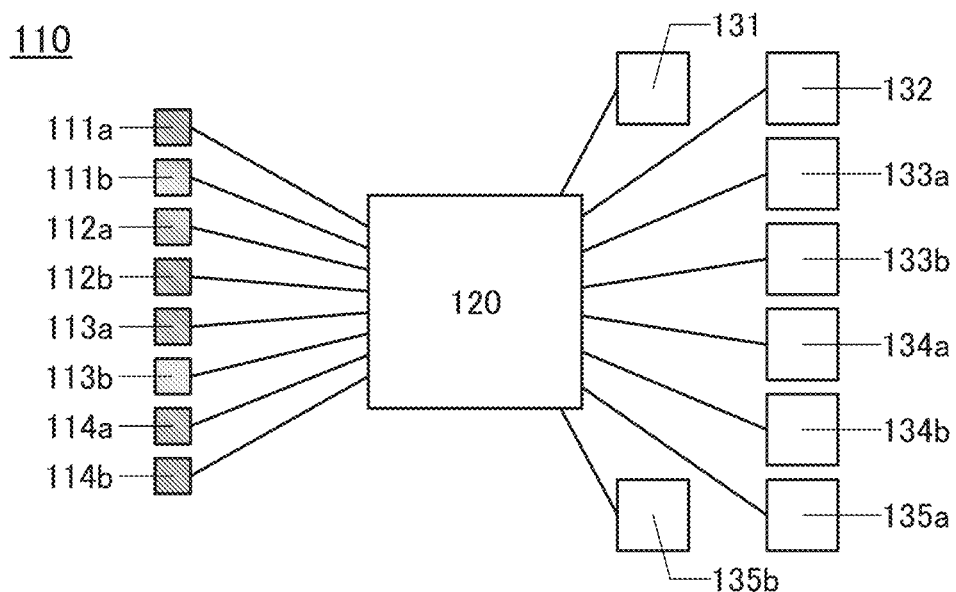
FIGS. 2A-2B Block diagrams each illustrating an occupant protection device of one embodiment of the present invention.

An occupant protection device 110 of one embodiment of the present invention will be described with reference to drawings. FIG. 1(A) is a perspective view illustrating an external view of a car 100 including the occupant protection device 110. FIG. 1(B) is a top view of the car 100. Note that in FIG. 1(B) and the like, the illustration of some components of the car 100 is omitted for simplicity of the drawings. FIG. 1(C) is a top view of the car 100 in which airbags 108 are inflated. Furthermore, FIG. 2 shows block diagrams of the occupant protection device 110.

<<Configuration Examples of Car 100 and Occupant Protection Device 110>>

On the front side of the car 100, an imaging device 111a and an imaging device 111b are provided. In addition, an imaging device 112a and an imaging device 112b are provided on the right side surface. In addition, an imaging device 113a and an imaging device 113b are provided on the left side surface. In addition, an imaging device 114a and an imaging device 114b are provided on the rear side.

The car 100 further includes an airbag device 131 in a steering 101 and an airbag device 132 in a dashboard 102. Furthermore, an airbag device 133a is provided in a door 103a, and an airbag device 133b is provided in a door 103b. Furthermore, an airbag device 134a is provided in a door 104a, and an airbag device 134b is provided in a door 104b. The car 100 further includes a control device 120.

The occupant protection device 110 includes the above-described imaging devices, the above-described airbag devices, and the control device 120. Specifically, the imaging device 111a, the imaging device 111b, the imaging device 112a, the imaging device 112b, the imaging device 113a, the imaging device 113b, the imaging device 114a, and the imaging device 114b are each connected to the control device 120, and the airbag device 131, the airbag device 132, the airbag device 133a, the airbag device 133b, the airbag device 134a, and the airbag device 134b are each connected to the control device 120 (see FIG. 2(A)).

Note that the imaging devices and the airbag devices may be connected to the control device 120 either by a wired connection method or by a wireless connection method. A wired connection method, e.g., direct connection through a metal wiring is less affected by noise than a wireless connection method, e.g., connection through wireless communication. An optical fiber or the like may be used instead of the metal wiring. On the other hand, when a wireless connection method is used, the usage of wirings used for the connection can be reduced. Moreover, the flexibility of the arrangement of the imaging devices and the airbag devices can be increased. Thus, the occupant protection device 110 can be easily installed.

Figure 2B:
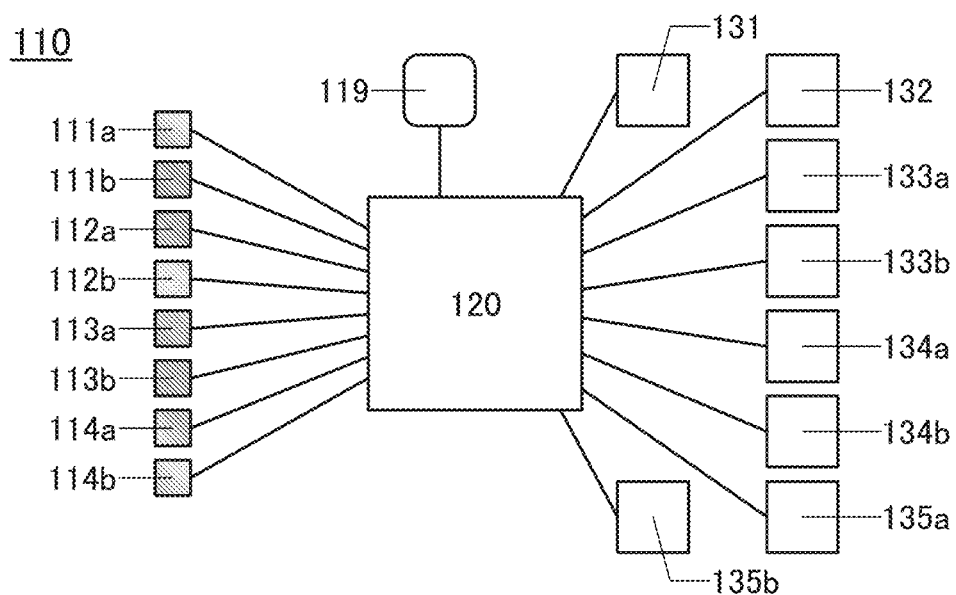

Furthermore, besides the imaging devices, a sensor 119 may be connected to the control device 120 (see FIG. 2(B)). Examples of the sensor 119 include an electromagnetic sensor, an ultrasonic sensor, an infrared sensor, and an acceleration sensor. A plurality of kinds of sensors 119 may be connected to the control device 120.

The imaging device 111a and the imaging device 111b each have a function of imaging an outside view in front of the car 100. Furthermore, the imaging device 112a and the imaging device 112b each have a function of imaging an outside view on the right side of the car 100. Furthermore, the imaging device 113a and the imaging device 113b each have a function of imaging an outside view on the left side of the car 100. Furthermore, the imaging device 114a and the imaging device 114*b* each have a function of imaging an outside view behind the car 100.

For example, images taken by the imaging device 112*a* and the imaging device 112*b* are transmitted to the control device 120. The control device 120 compares the images with each other to determine the position, the speed, and the like of an object approaching the car 100 from the right. For this purpose, the imaging device 112*a* and the imaging device 112*b* are preferably installed at the same height h from the ground. In addition, the distance L between the imaging device 112*a* and the imaging device 112*b* is 50 cm or more, preferably 1 m or more, further preferably 2 m or more. With an increase in the distance L, the accuracy in detecting the position, the speed, and the like of an object approaching the car 100 can be improved. The above description also applies to the imaging device 111*a* and the imaging device 111*b*, the imaging device 113*a* and the imaging device 113*b*, and the imaging device 114*a* and the imaging device 114*b*.

Figure 3A:
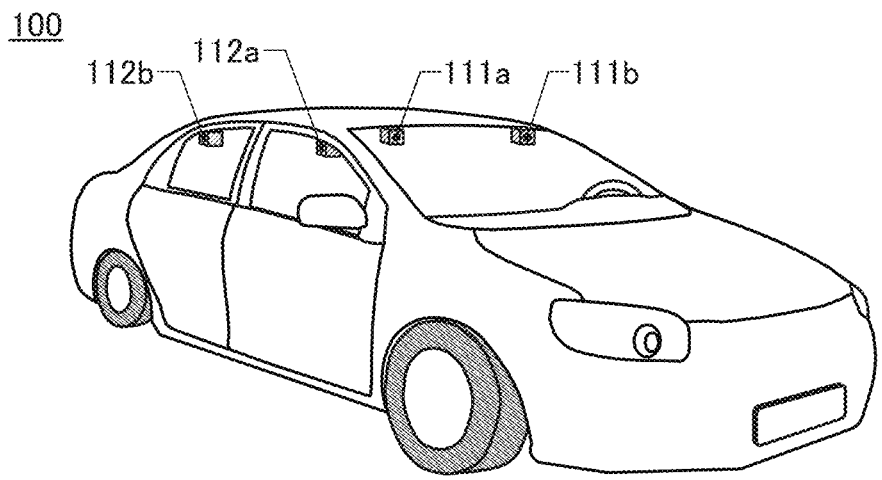
FIGS. 3A-3C Views illustrating arrangement examples of imaging devices.

Alternatively, the imaging devices may be installed in the vicinity of a roof of the car 100. The imaging devices installed at higher positions can image a more distant object. Accordingly, an object approaching the car 100 can be detected early. FIG. 3(A) illustrates an example in which the imaging device 111*a*, the imaging device 111*b*, the imaging device 112*a*, and the imaging device 112*b* are installed in the vicinity of the roof of the car 100.

Figure 3B:
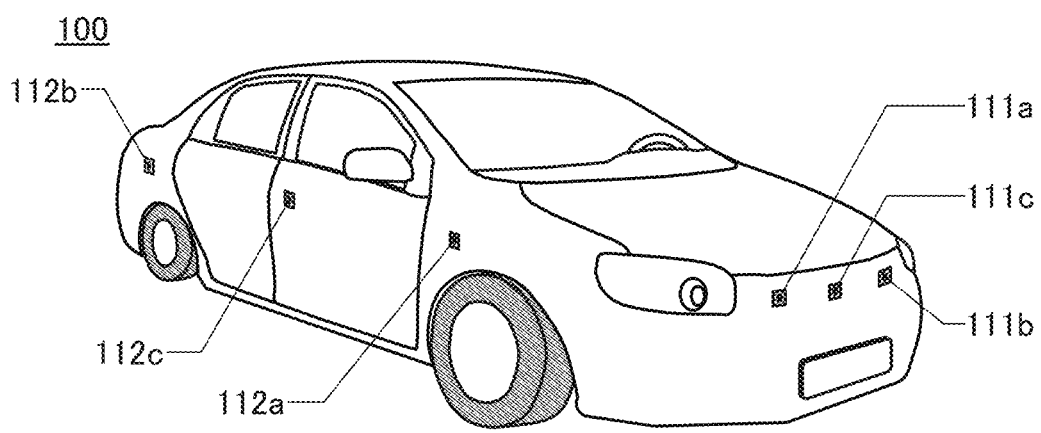
Figure 3C:
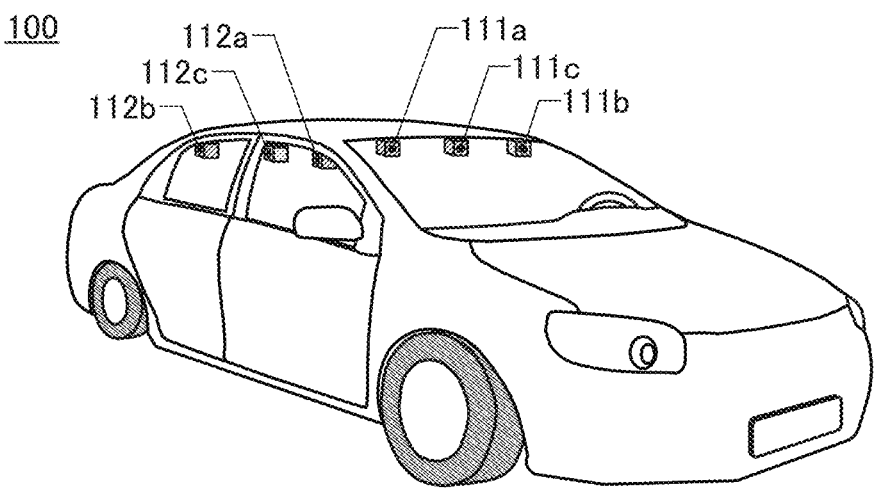

In addition, by increasing the number of imaging devices used, the accuracy in detecting the position, the speed, and the like of an object approaching the car 100 can be further improved. FIG. 3(B) and FIG. 3(C) each illustrate an example in which an imaging device 111*c* is provided between the imaging device 111*a* and the imaging device 111*b* and an example in which an imaging device 112*c* is provided between the imaging device 112*a* and the imaging device 112*b*.

In the example shown in this embodiment, a plurality of imaging devices is provided for one direction; however, one embodiment of the present invention is not limited thereto. Depending on the purpose or usage, it may be possible to provide one imaging device for one direction.

<<Operation Example of Occupant Protection Device 110>>

Next, an operation example of the occupant protection device 110 will be described with reference to drawings.

Figure 4:
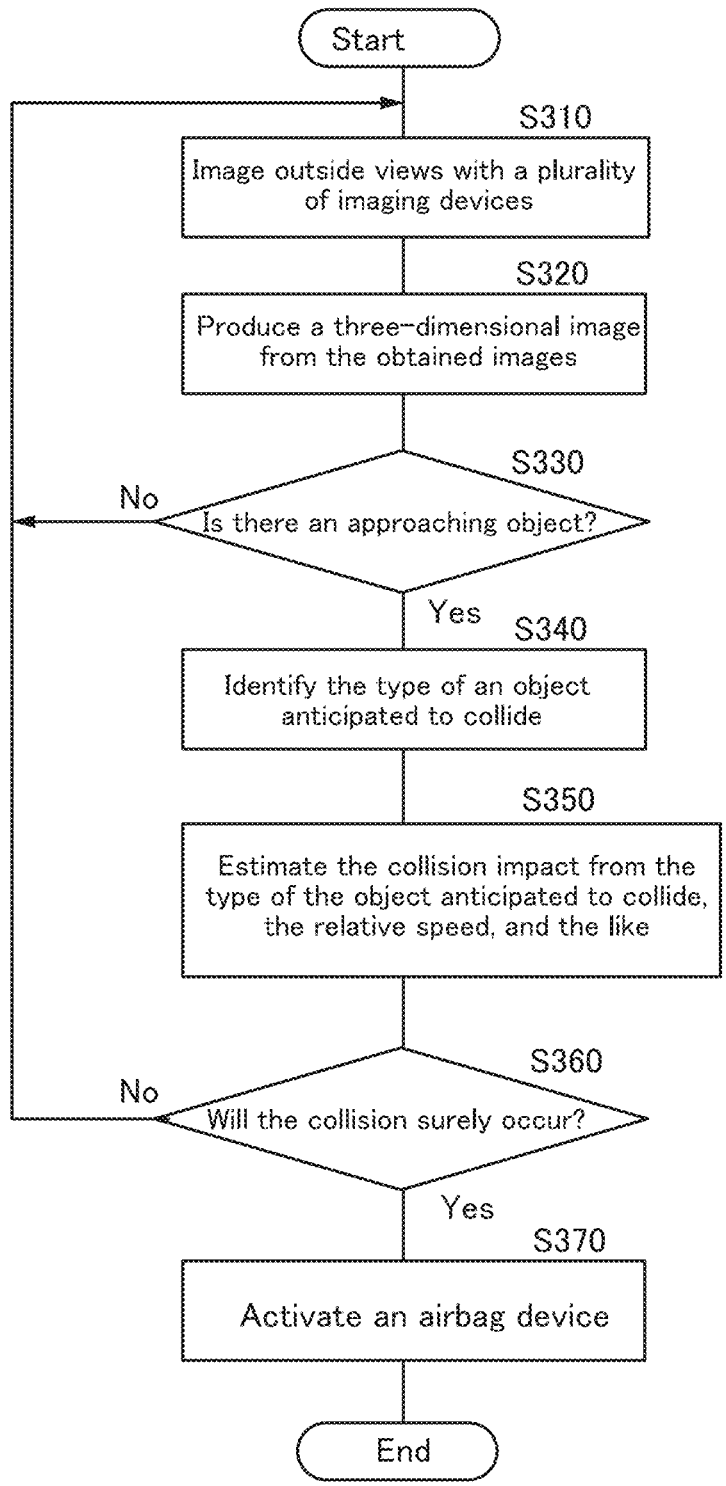
FIG. 4 A flow chart illustrating an operation example of an occupant protection device.

FIG. 4 is a flow chart illustrating the operation of the occupant protection device 110. First, outside views are imaged by the plurality of imaging devices which take images in specific directions (Step S310). The taken images are each transmitted to the control device 120. Using these images and the distance L, the control device 120 synthesizes a three-dimensional image by a triangulation method or the like (Step S320). From the above synthesized three-dimensional image, the control device 120 judges whether there is an object approaching the car 100 (Step S330). In the case where there is no object approaching the car 100, the operation flow returns to Step S310 to synthesize a new three-dimensional image.

In the case where there is an object approaching the car 100, the object is recognized as an object anticipated to collide. Then, the shape of the object anticipated to collide is checked against a database to identify the type of the object anticipated to collide (Step S340). For example, the object anticipated to collide is identified as an animal, a human, a two-wheeled vehicle, a small-size car, a large-size car, a wall, or a telephone pole. Depending on the type of the object anticipated to collide, the object anticipated to collide has a different collision impact on the car 100. Note that the type of the object anticipated to collide can be identified more accurately by combining the three-dimensional image with an electromagnetic sensor, an ultrasonic sensor, an infrared sensor, and/or the like.

Subsequently, the control device 120 estimates the collision impact from the type of the object anticipated to collide identified above and the relative speed (Step S350).

Subsequently, from the distance between the car 100 and the object anticipated to collide and a change in relative speed, the control device 120 judges whether the object anticipated to collide will collide with the car 100 or not (Step S360). In the case where the possibility of the collision is judged to be low, the operation flow returns to Step S310. In the case where the possibility of the collision is judged to be high, the control device 120 transmits, to the airbag device, a signal for activating the airbag device to operate the airbag device (Step S370).

The ultimate pressure in the airbag is determined in accordance with the collision impact estimated above. Proper control of the pressure in the airbag enables optimal occupant protection. Alternatively, the impact right after the collision may be detected by an acceleration sensor or the like to adjust the pressure in the airbag. Moreover, since the airbag device can be activated before the collision, the occupant can be protected without delay.

Furthermore, one embodiment of the present invention allows enough time from the activation of the airbag device to a collision. Therefore, before the collision, the airbag can be inflated by a mechanical method, e.g., by a pump; at or after the collision, the airbag can be abruptly inflated by an inflator.

Furthermore, a plurality of inflators may be provided in the airbag device; for example, the pressure, the inflation speed, and the like of the airbag may be adjusted by sequentially operating the inflators. In the case where a plurality of inflators is provided in the airbag device, the explosive forces of the inflators may be the same as or different from each other.

When a plurality of inflators is provided in the airbag device, the explosive usage per inflator can be reduced, whereby the possibility of a second accident due to the operation of the airbag device can be reduced. The explosion sound caused by the operation of the inflator can also be reduced, which can ease psychological stress on the occupant.

Moreover, in the airbag device on which a plurality of inflators is mounted, even when one of the inflators malfunctions, the other inflators can ensure the operation of the airbag device. Thus, the redundancy of the airbag device can be increased. That is, the redundancy of the occupant protection device can be increased. According to one embodiment of the present invention, a highly reliable occupant protection device which surely operates can be provided.

Furthermore, when the above-described method in which the airbag is inflated by a mechanical method, e.g., by a pump before a collision is employed, in the case where a collision is narrowly avoided or in the case of a minor collision for which the inflator does not need to be operated, the airbag can be stored for reuse. Also in the airbag device on which a plurality of inflators is mounted, in the case where an inflator remains unused after the operation of the airbag device, the airbag can be stored for reuse. Since there is no need of replacement of the airbag device, the maintenance cost of the car 100 can be reduced.

Furthermore, the collision impact may be estimated using the imaging devices before the collision, and after the collision is detected, the airbag may be inflated at a pressure, an inflation speed, and the like corresponding to the estimated impact. At this time, the plurality of inflators may be operated either simultaneously or sequentially.

Figure 5:
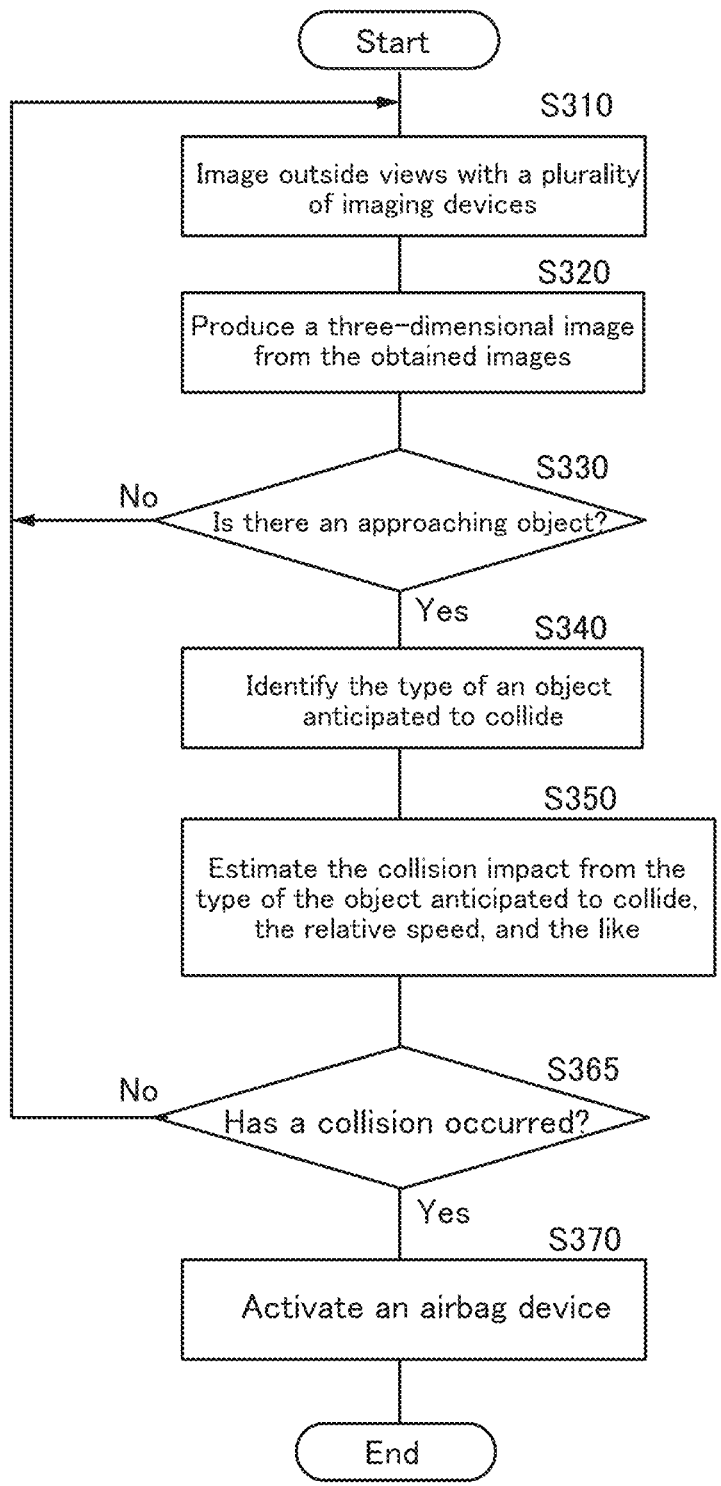
FIG. 5 A flow chart illustrating an operation example of an occupant protection device.

FIG. 5 is a flow chart illustrating the operation of the occupant protection device 110 in this case. Up to Step S350, the operation flow in FIG. 5 is similar to that in FIG. 4. Next, it is judged whether the object anticipated to collide has collided with the car 100 or not (Step S365). In the case where a judgment is made that no collision has occurred, the operation flow returns to Step S310. In the case where a judgment is made that a collision has occurred, the control device 120 transmits, to the airbag device, a signal for activating the airbag device to operate the airbag device (Step S370).

Operation Example 1

Figure 7:
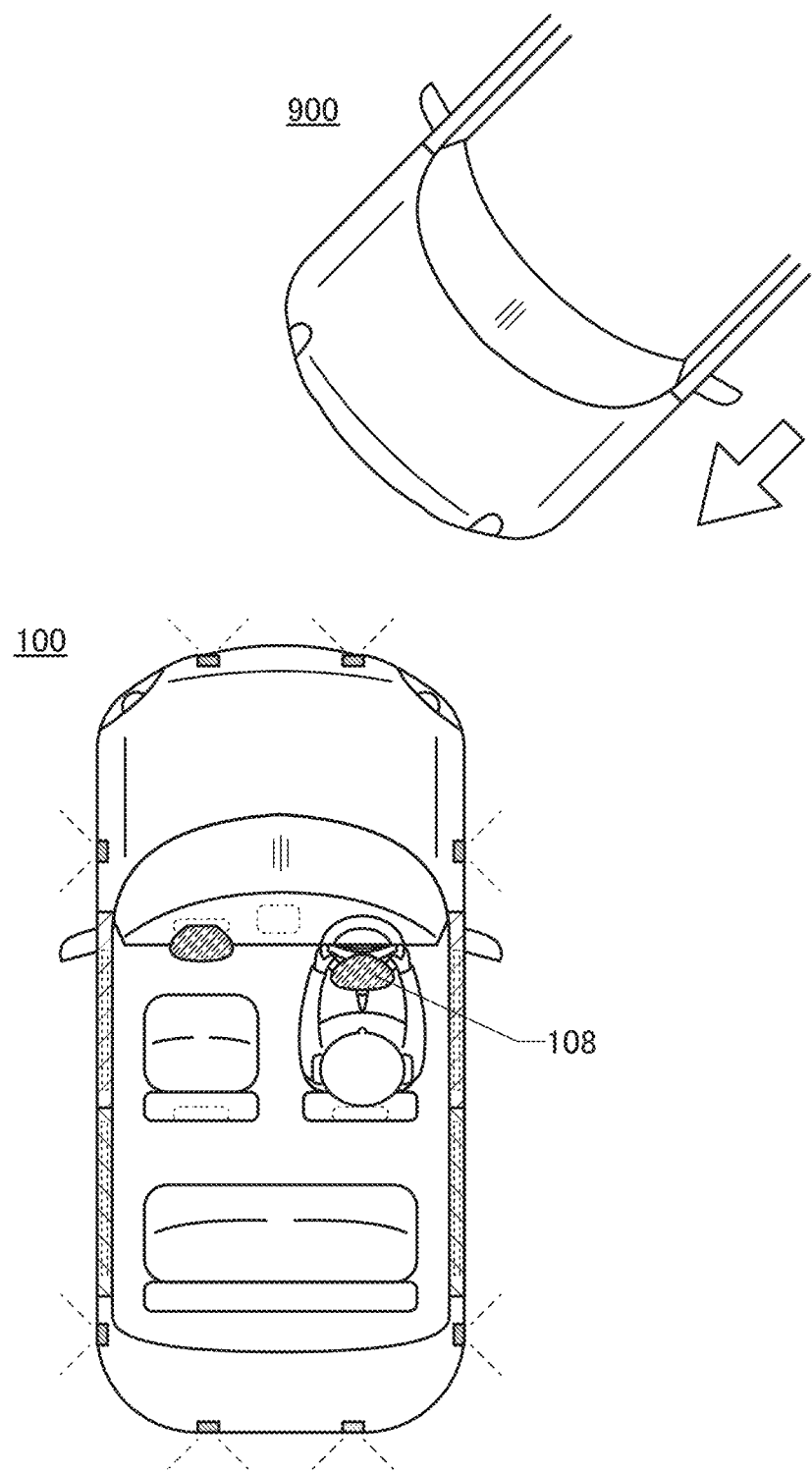
FIG. 7 A view illustrating an operation example of an occupant protection device.
Figure 8:
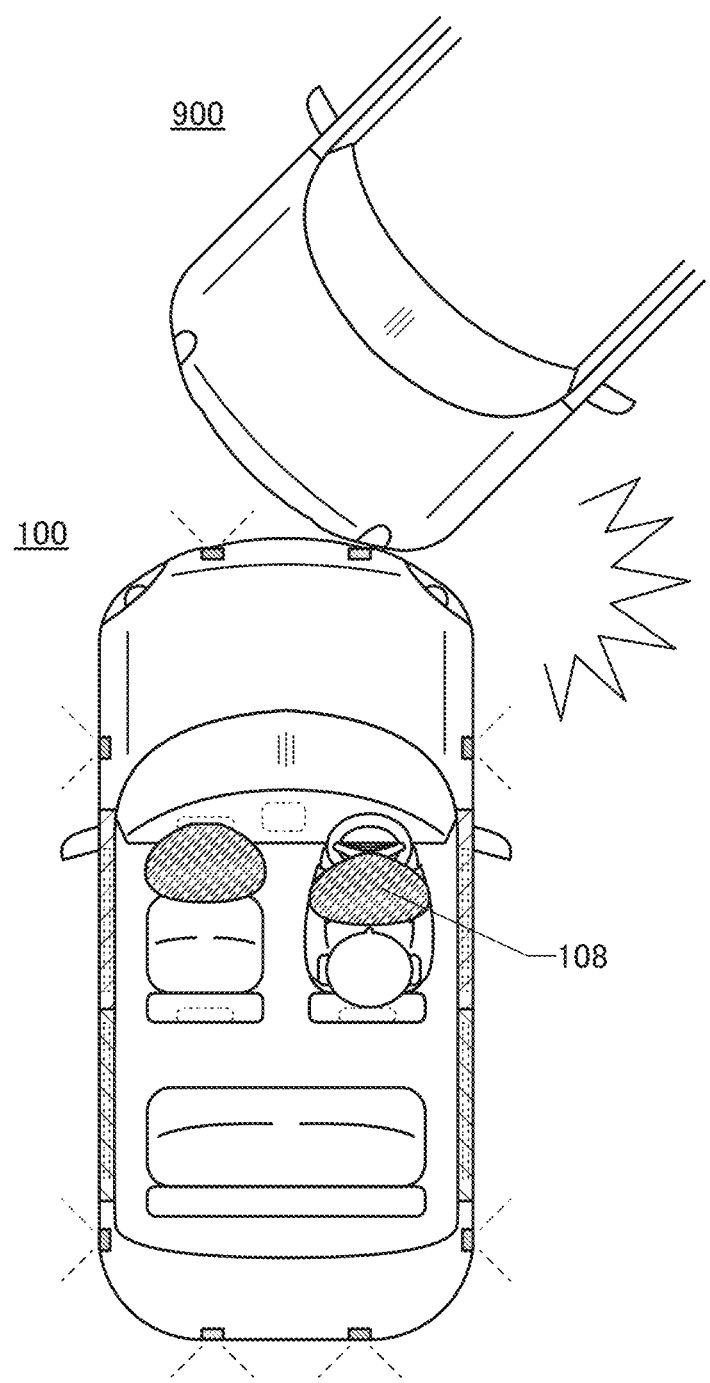
FIG. 8 A view illustrating an operation example of an occupant protection device.

An operation example of the occupant protection device 110 in the case where a car 900 collides with the front of the car 100 will be described with reference to FIG. 6 to FIG. 8.

First, from images taken by the imaging device 111a and the imaging device 111b, the control device 120 detects the car 900 approaching the car 100 (see FIG. 6). Subsequently, the control device 120 presumes the type of the car 900 to be an automobile from the shape of the car 900. Furthermore, the collision impact is estimated from the type of the car 900, the relative speed of the car 100 to the car 900, and the like.

When the collision is judged to be inevitable, the control device 120 activates the airbag device 131 and the airbag device 132 before the collision. Then, their respective airbags 108 start to inflate (see FIG. 7). Immediately after the collision, the inflation of the respective airbags 108 is terminated (see FIG. 8). The pressure in the respective airbags 108 is determined by the estimated impact.

In this manner, the occupant can be protected from the impact of a car collision without delay.

Operation Example 2

Figure 10:
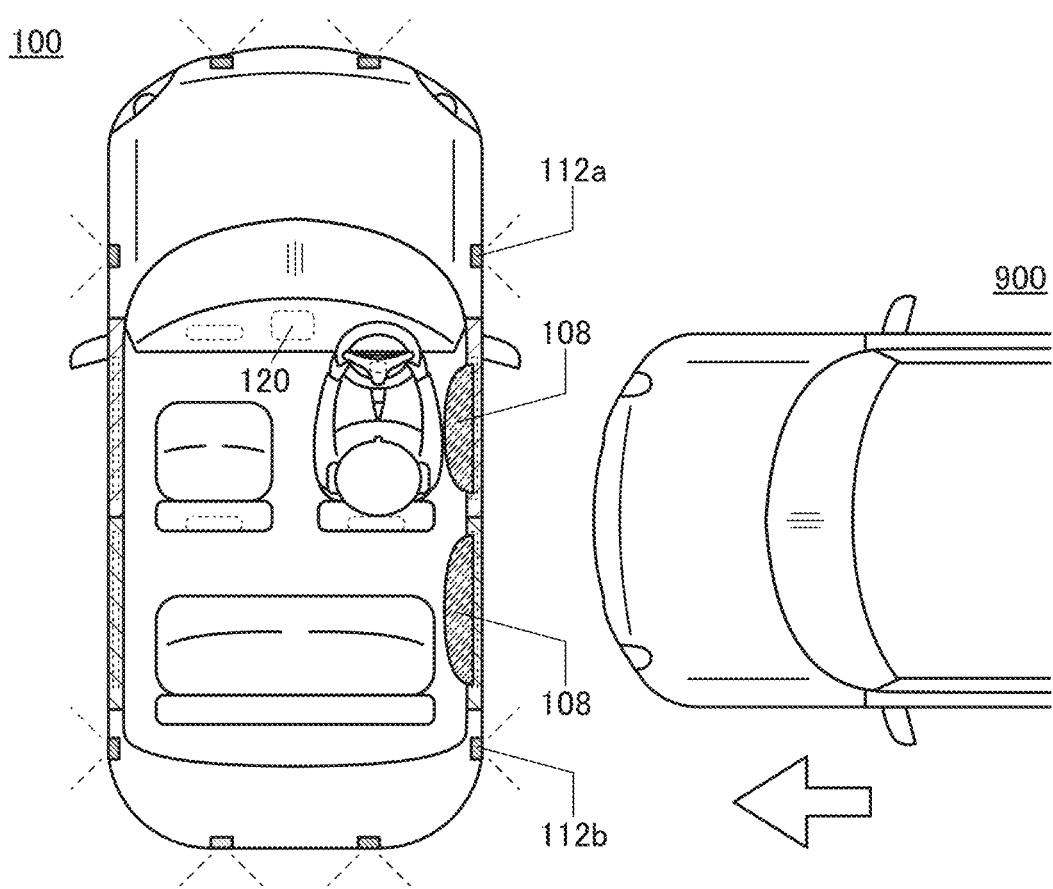
FIG. 10 A view illustrating an operation example of an occupant protection device.
Figure 11:
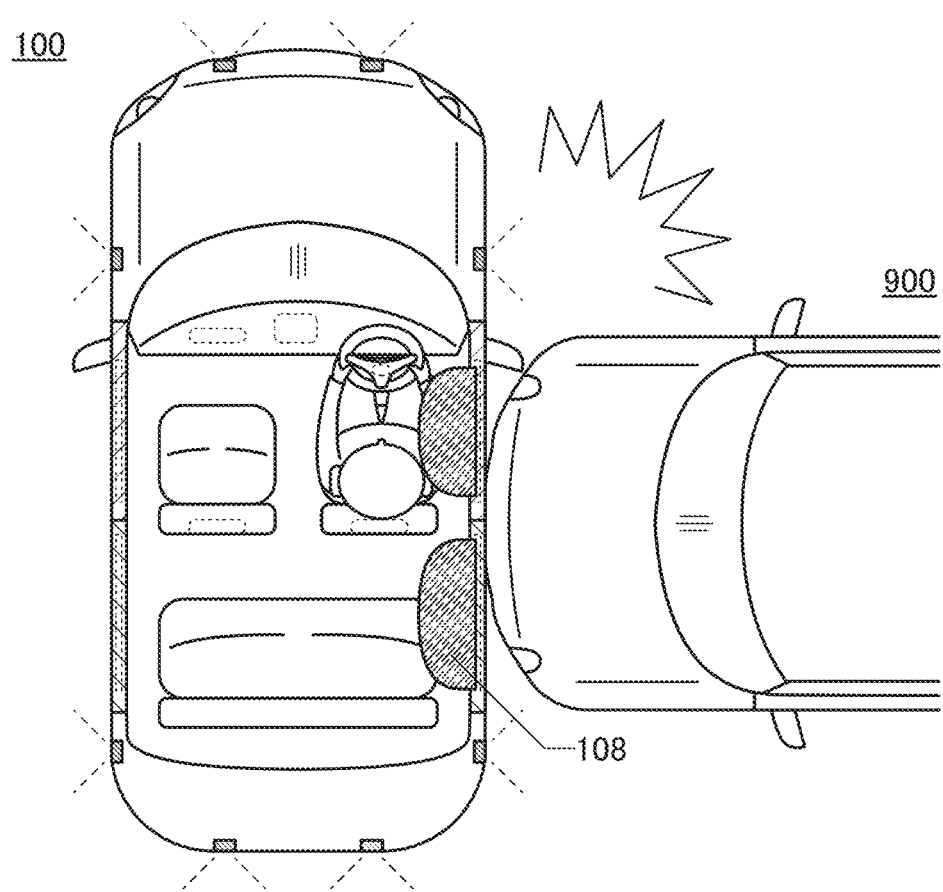
FIG. 11 A view illustrating an operation example of an occupant protection device.

An operation example of the occupant protection device 110 in the case where the car 900 collides with the right side of the car 100 will be described with reference to FIG. 9 to FIG. 11.

Figure 9:
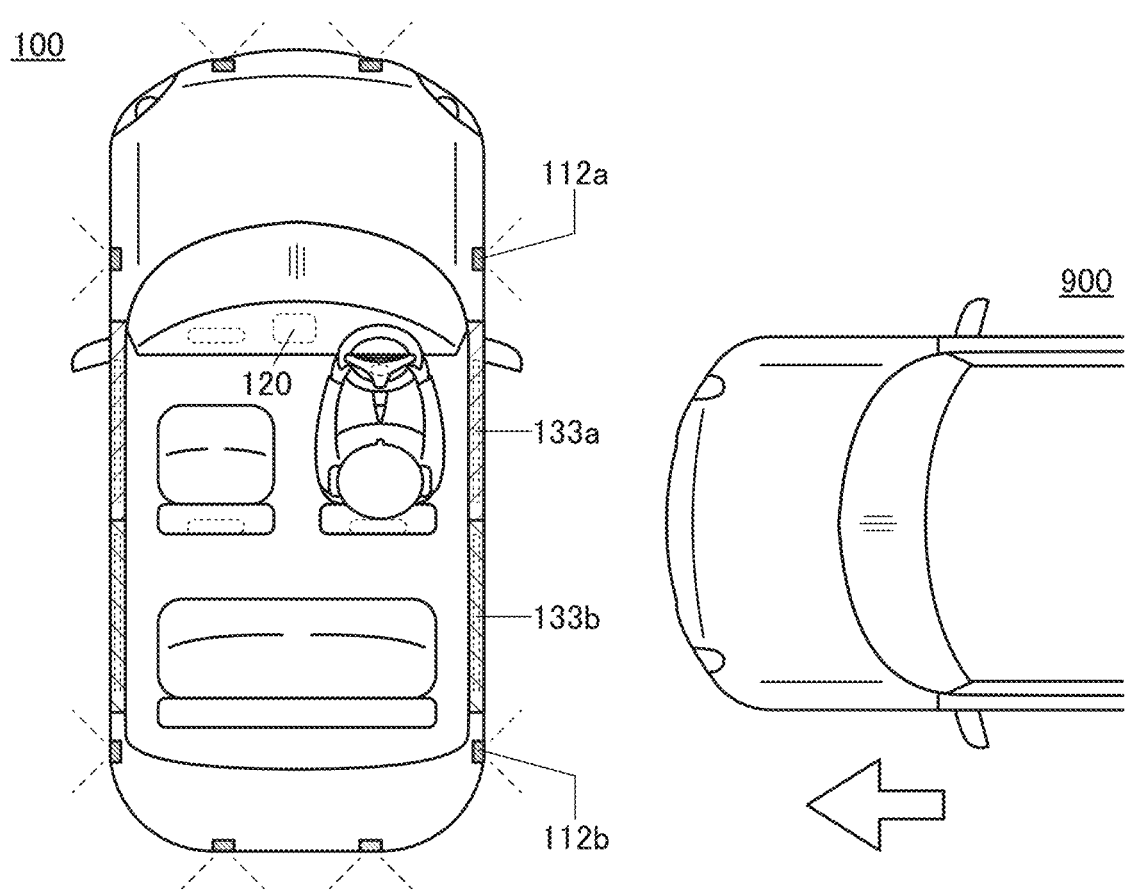
FIG. 9 A view illustrating an operation example of an occupant protection device.

First, from images taken by the imaging device 112a and the imaging device 112b, the control device 120 detects the car 900 approaching the car 100 (see FIG. 9). Subsequently, the control device 120 presumes the type of the car 900 to be an automobile from the shape of the car 900. Furthermore, the collision impact is estimated from the type of the car 900, the relative speed of the car 100 to the car 900, and the like.

When the collision is judged to be inevitable, the control device 120 activates the airbag device 133a and the airbag device 133b before the collision. Then, their respective airbags 108 start to inflate (see FIG. 10). Immediately after the collision, the inflation of both of the airbags 108 is terminated (see FIG. 11). The pressure in the respective airbags 108 at this time is determined by the estimated impact.

In this manner, the occupant can be protected from the impact of a car collision without delay.

Operation Example 3

Figure 13:
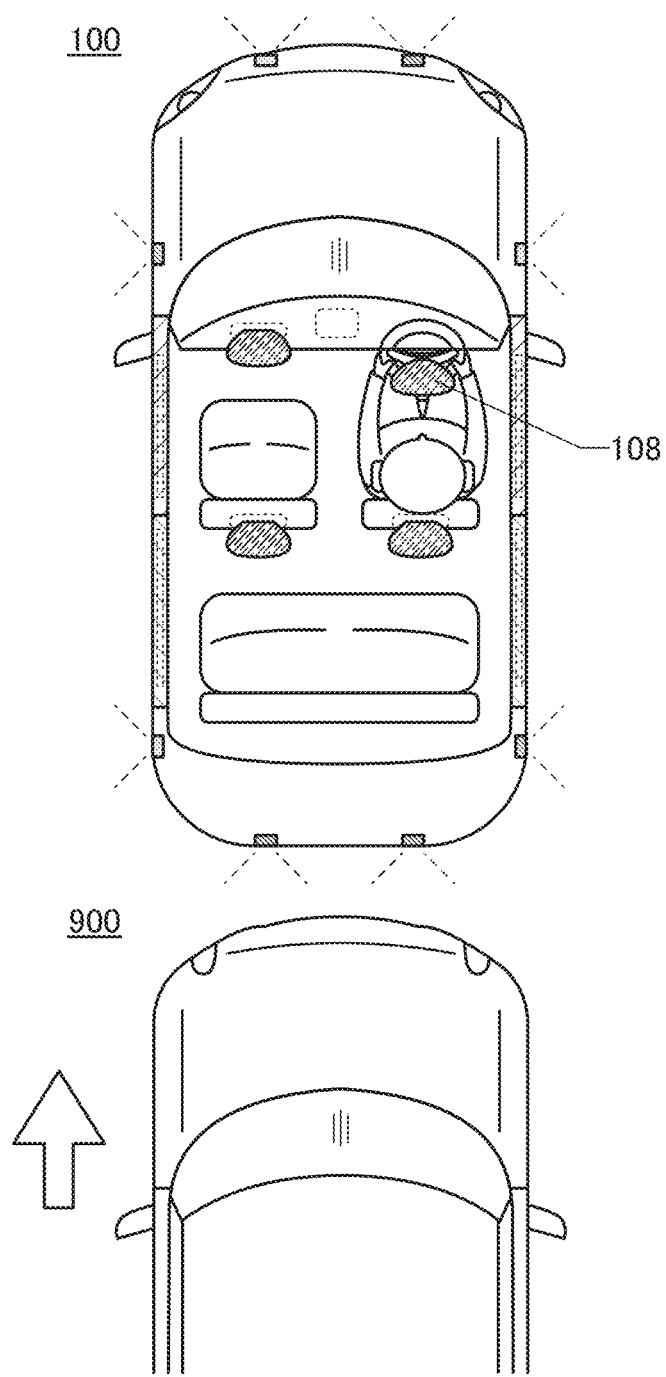
FIG. 13 A view illustrating an operation example of an occupant protection device.
Figure 14:
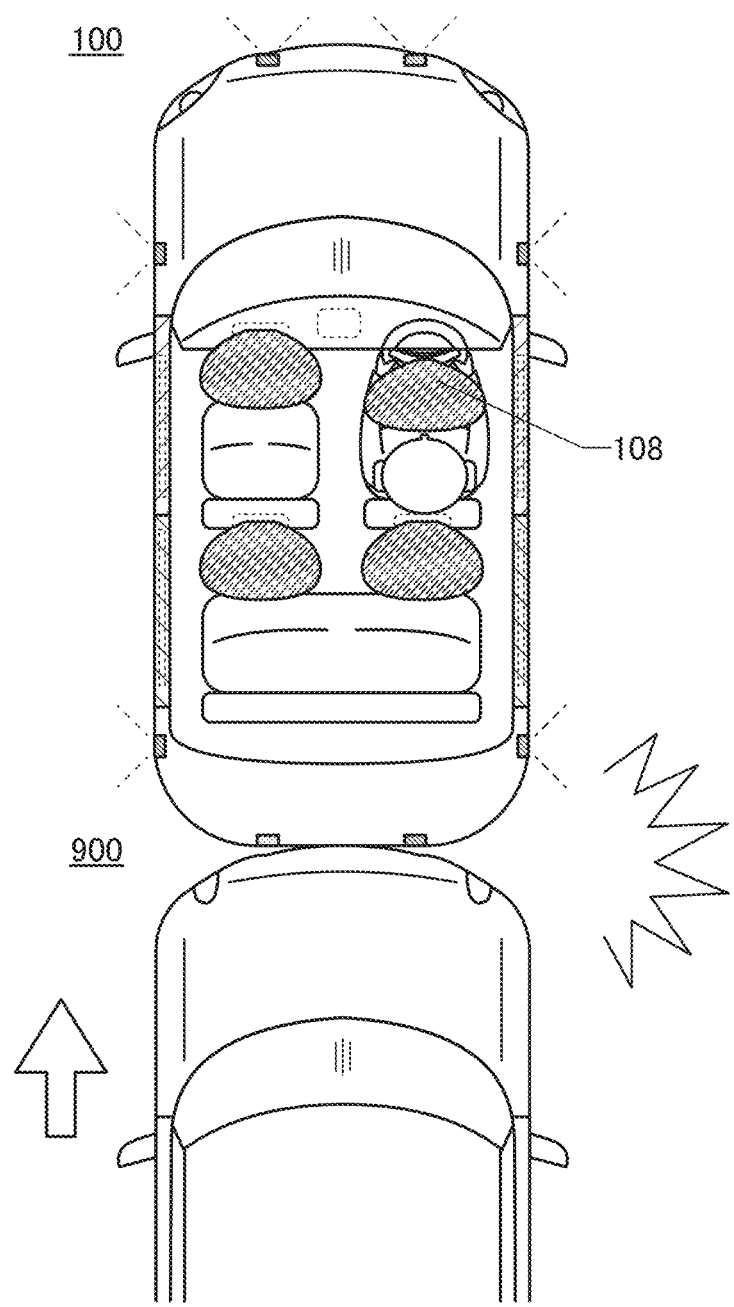
FIG. 14 A view illustrating an operation example of an occupant protection device.

An operation example of the car occupant protection device 110 in the case where the car 900 collides with the back of the car 100 will be described with reference to FIG. 12 to FIG. 14.

First, from images taken by the imaging device 114a and the imaging device 114b, the control device 120 detects the car 900 approaching the car 100 (see FIG. 12). Subsequently, the control device 120 presumes the type of the car 900 to be an automobile from the shape of the car 900. Furthermore, the collision impact is estimated from the type of the car 900, the relative speed of the car 100 to the car 900, and the like.

When the collision is judged to be inevitable, the control device 120 activates the airbag device 131, the airbag device 132, an airbag device 135a, and an airbag device 135b before the collision. Then, their respective airbags 108 start to inflate (see FIG. 13). Immediately after the collision, the inflation of the respective airbags 108 is terminated (see FIG. 14). The pressure in the respective airbags 108 at this time is determined by the estimated impact.

In this manner, the occupant can be protected from the impact of a car collision without delay.

Operation Example 4

An operation example of the occupant protection device 110 in the case where the car 900 collides with the front of the car 100 will be described with reference to FIG. 15 to FIG. 17.

Figure 15:
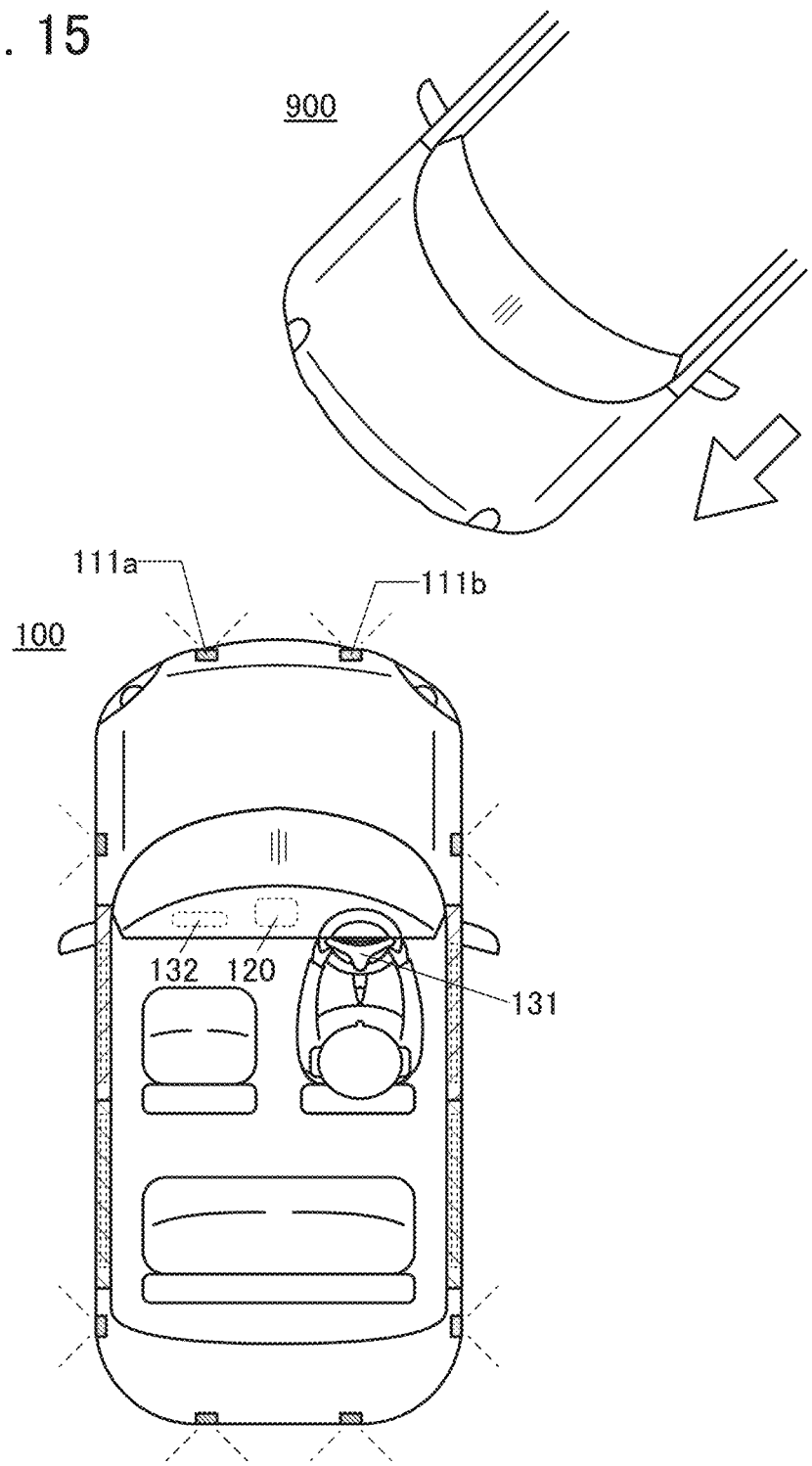
FIG. 15 A view illustrating an operation example of an occupant protection device.

First, from images taken by the imaging device 111a and the imaging device 111b, the control device 120 detects the car 900 approaching the car 100 (see FIG. 15). Subsequently, the control device 120 presumes the type of the car 900 to be an automobile from the shape of the car 900. Furthermore, the collision impact is estimated from the type of the car 900, the relative speed of the car 100 to the car 900, and the like.

Here, the airbag device 131 and the airbag device 132 each include a plurality of inflators. In addition, from the above-described estimation, the control device 120 has made a judgment that two-step operation is the most appropriate.

Figure 16:
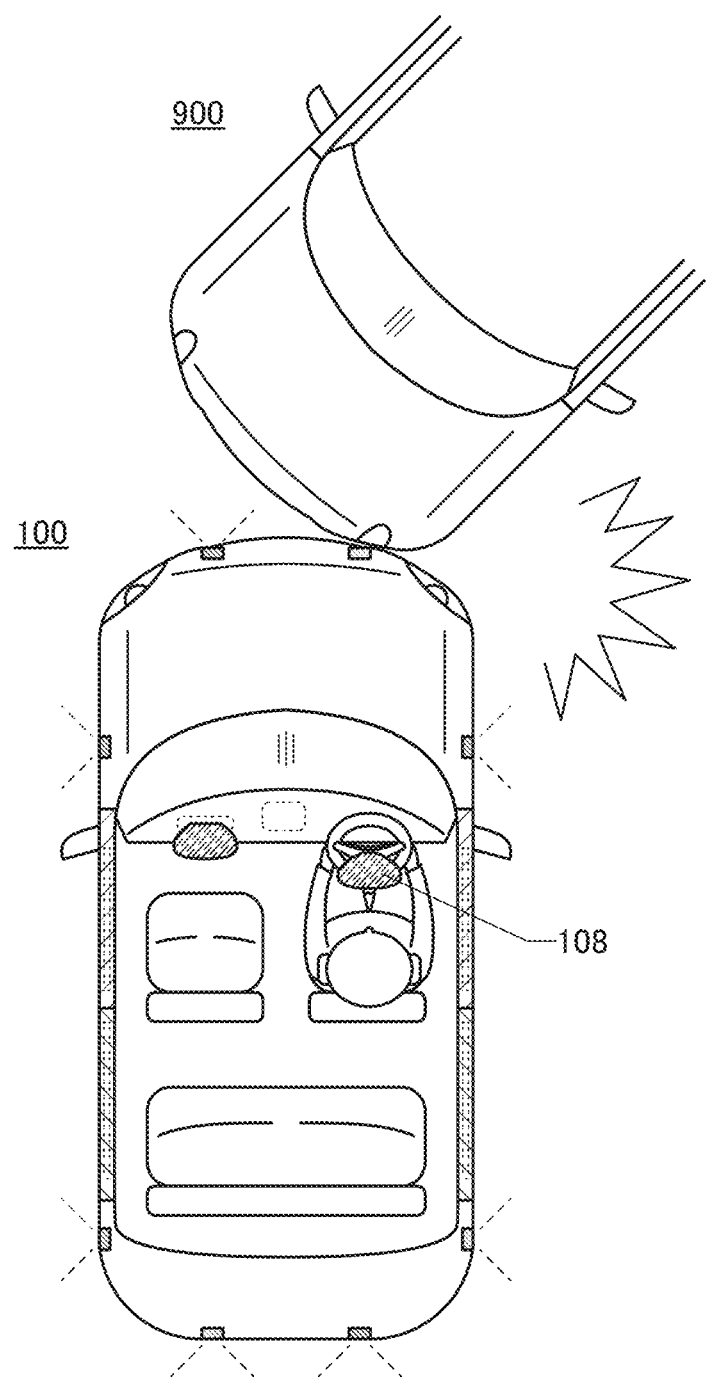
FIG. 16 A view illustrating an operation example of an occupant protection device.
Figure 17:
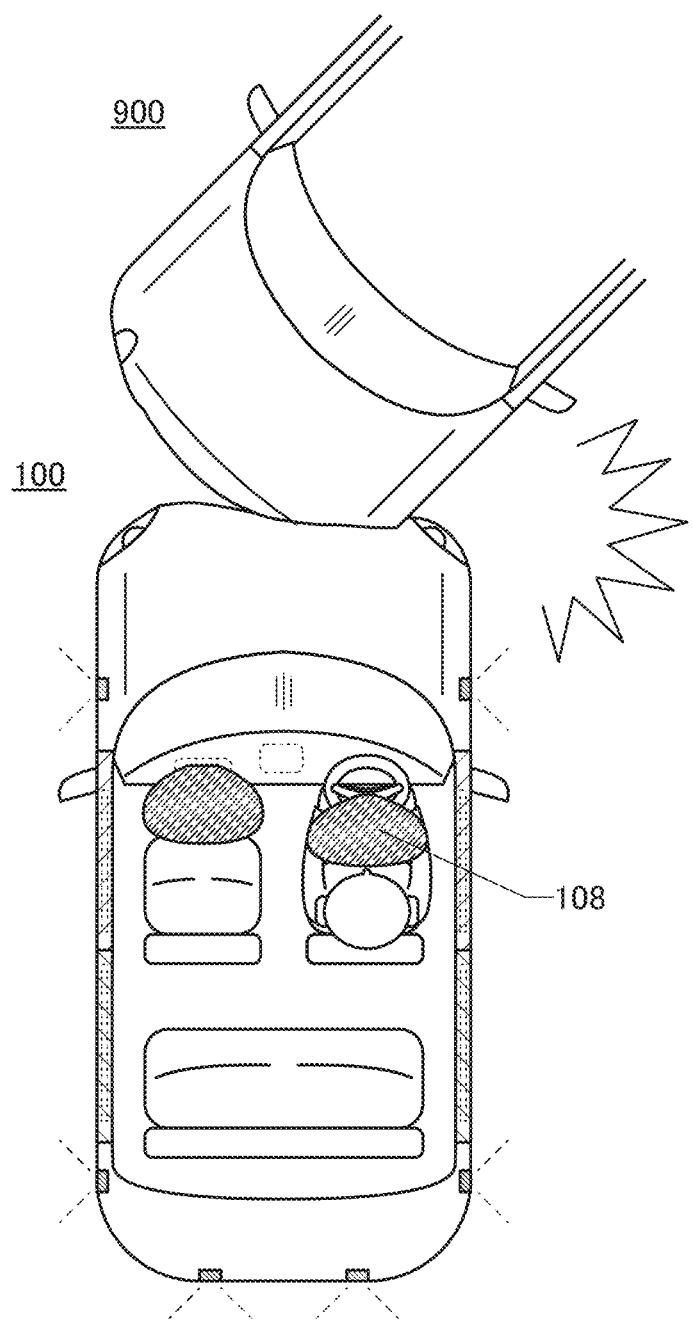
FIG. 17 A view illustrating an operation example of an occupant protection device.

On detecting a collision between the car 100 and the car 900, the control device 120 operates a first inflator included in the airbag device 131 and a first inflator included in the airbag device 132 (see FIG. 16).

Subsequently, the control device 120 operates a second inflator included in the airbag device 131 and a second inflator included in the airbag device 132 (see FIG. 17).

By inflating the airbags 108 in a plurality of steps, the internal pressure and the inflation speed of the airbags 108 can be optimized. This enables optimal occupant protection.

Note that in accordance with the estimated impact, the collision angle between the subject car and an object anticipated to collide, and the like, the control device 120 can determine which airbag device to operate. For example, in the case of a collision on the right side of the car 100, in addition to the airbag device 133a and the airbag device 133b, the airbag device 131 or the airbag device 132 can also be operated.

Furthermore, an airbag device whose airbag deploys toward the ceiling or the floor may be provided in the car 100 and may be operated in accordance with the estimated impact, the collision angle between the subject car and an object anticipated to collide, and the like. For example, in the case where the control device 120 detects overturn of the car 100 or a possibility of overturn, the airbag may deploy toward the ceiling or the floor.

Furthermore, a sensor for estimating the presence or absence of an occupant, his or her seated condition, height, weight, and the like may be installed in the car to determine which airbag device to operate, the internal pressure and the inflation speed of a deploying airbag, and the like.

This embodiment can be implemented in an appropriate combination with any of the structures described in the other embodiments.

Embodiment 2

In this embodiment, an imaging device 115 which can be used as the imaging device shown in Embodiment 1 will be described with reference to drawings.

<<Configuration Example of Imaging Device 115>>

Figure 18A:
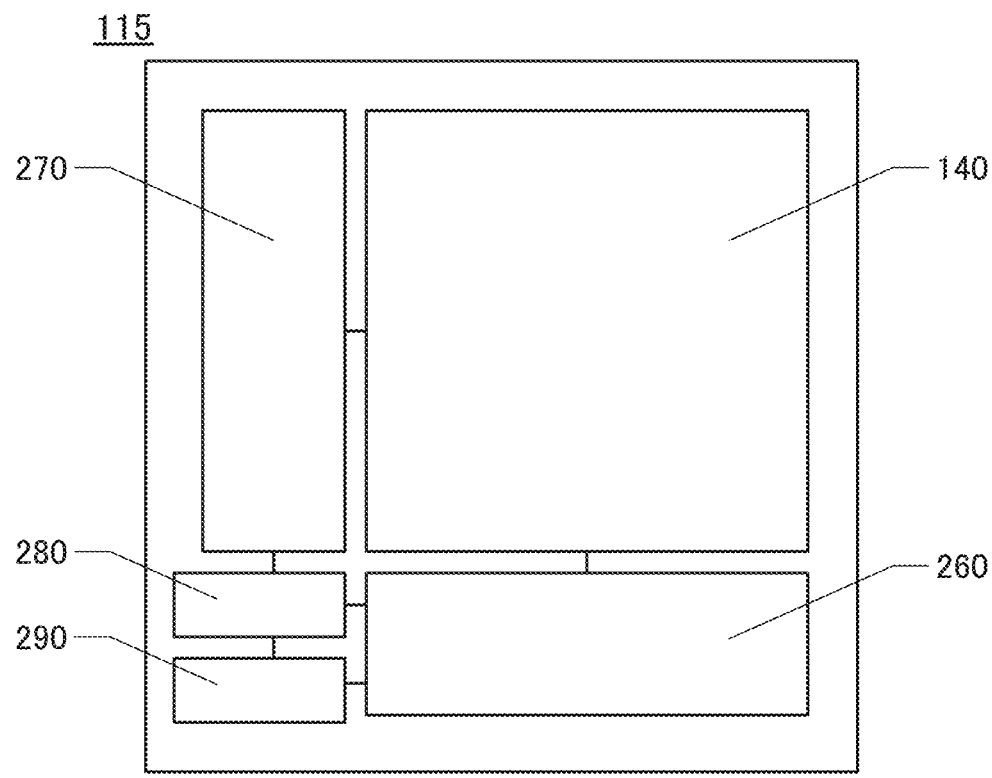
FIGS. 18A-18B Diagrams illustrating a configuration example of an imaging device.

FIG. 18(A) is a plan view illustrating a configuration example of the imaging device 115. The imaging device 115 includes a pixel portion 140, a first circuit 260, a second circuit 270, a third circuit 280, and a fourth circuit 290. Note that in this specification and the like, the first circuit 260 to the fourth circuit 290 and the like may be referred to as "peripheral circuit" or "driver circuit". For example, the first circuit 260 can be regarded as part of the peripheral circuit.

Figure 18B:
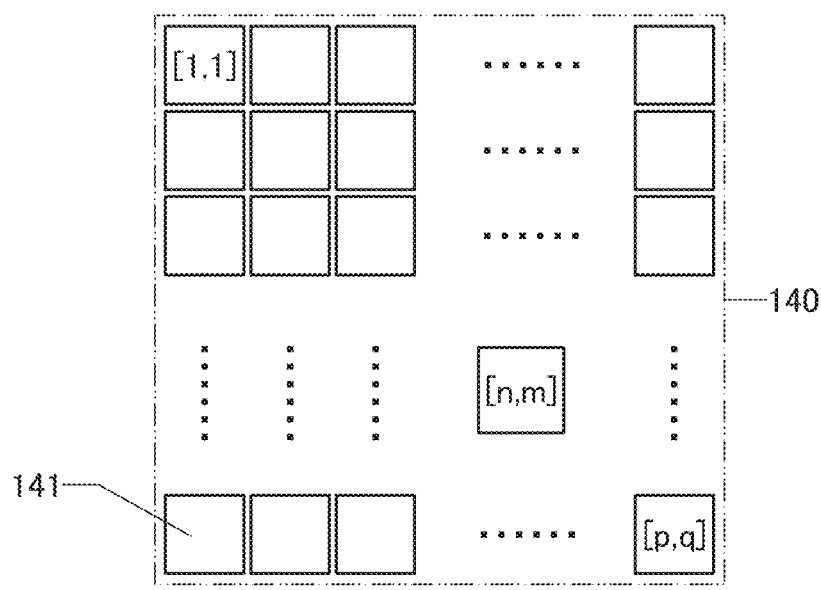

FIG. 18(B) is a diagram illustrating a configuration example of the pixel portion 140. The pixel portion 140 includes a plurality of pixels 141 (imaging elements) arranged in a matrix with p columns and q rows (p and q are each a natural number greater than or equal to 2). Note that in FIG. 18(B), n is a natural number greater than or equal to 1 and less than or equal to p, and m is a natural number greater than or equal to 1 and less than or equal to q.

For example, with the pixels 141 arranged in a 1920×1080 matrix, the imaging device 115 can take an image with so-called "full high definition" (also referred to as "2K resolution", "2K1K", "2K", or the like). Furthermore, for example, with the pixels 141 arranged in a 4096×2160 matrix, the imaging device 115 can take an image with so-called "ultra-high definition" (also referred to as "4K resolution", "4K2K", "4K", or the like). Furthermore, for example, with the pixels 141 arranged in a 8192×4320 matrix, the imaging device 115 can take an image with so-called "super high definition" (also referred to as "8K resolution", "8K4K", "8K", or the like). With a larger number of pixels 141, the imaging device 115 can take an image with 16K or 32K resolution.

The first circuit 260 and the second circuit 270 are connected to the plurality of pixels 141 and have a function of supplying signals for driving the plurality of pixels 141. The first circuit 260 may further have a function of processing an analog signal output from the pixels 141. Furthermore, the third circuit 280 may have a function of controlling the operation timing of the peripheral circuit, e.g., a function of generating a clock signal. It may further have a function of converting the frequency of a clock signal supplied from the outside. Moreover, the third circuit 280 may have a function of supplying a reference potential signal (e.g., a ramp wave signal).

Figure 19:
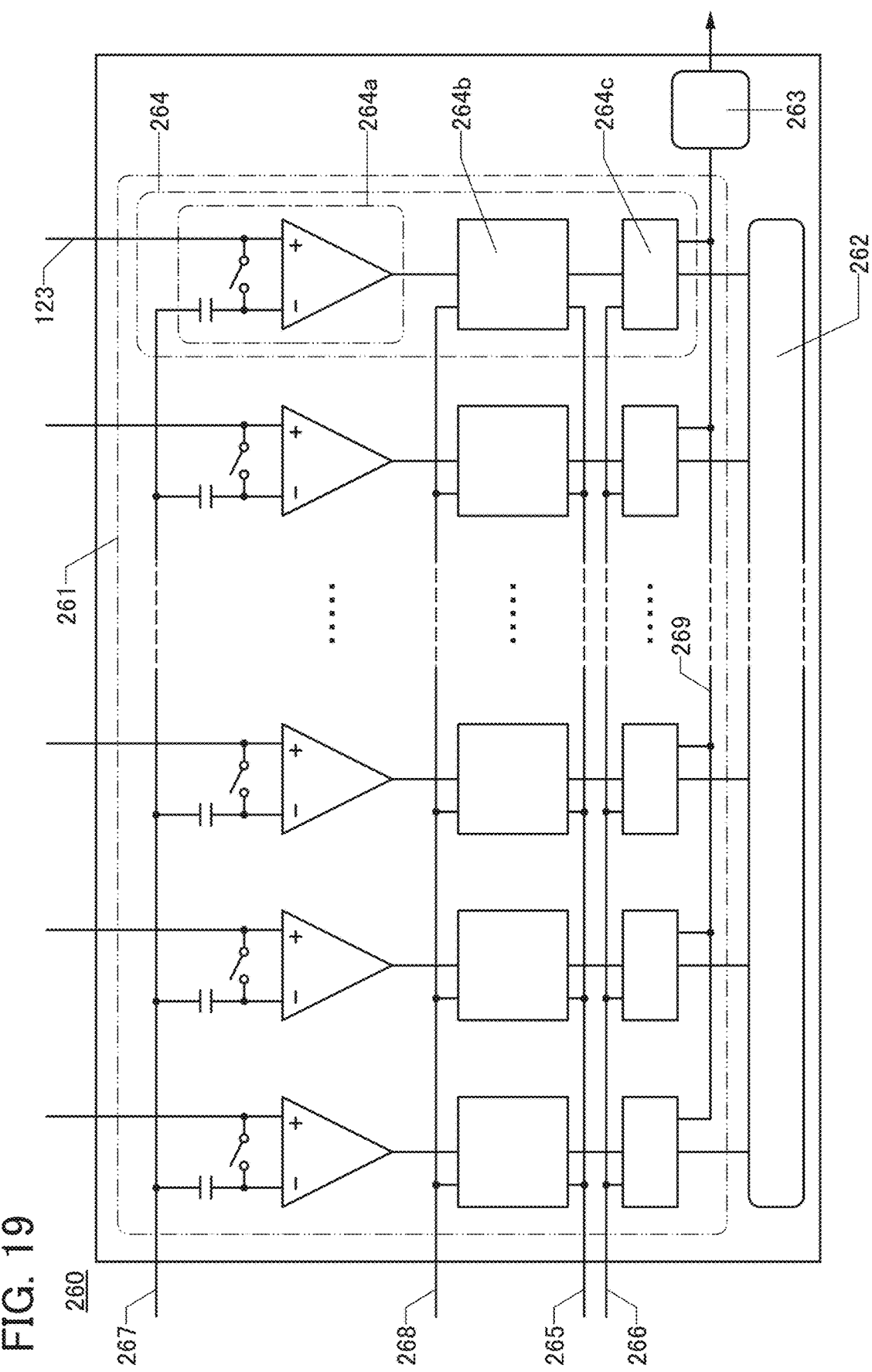
FIG. 19 A diagram illustrating a configuration example of a peripheral circuit.

FIG. 19 illustrates a configuration example of the first circuit 260. The first circuit 260 illustrated as an example in FIG. 19 includes a signal processing circuit 261, a column driver circuit 262, and an output circuit 263. The signal processing circuit 261 includes a circuit 264 provided in each column. Furthermore, the circuit 264 includes a circuit 264*a* that can remove noise by a CDS (Correlated Double Sampling) method (also referred to as "CDS circuit"), a counter circuit 264*b*, and a latch circuit 264*c*. Furthermore, the circuit 264 has an analog-digital conversion function. The signal processing circuit 261 can function as a column-parallel (column type) analog-digital conversion device.

The circuit 264*a* includes a comparator, a switch, and a capacitor. Two input terminals of the comparator are connected to each other via the switch. Note that a transistor, a MEMS (Micro Electro Mechanical Systems) element, or the like may be used as the switch. Furthermore, one terminal of the comparator is connected to a wiring 267 via the capacitor. The other terminal of the comparator is connected to a wiring 123 provided in each column. Note that the other terminal of the comparator and the wiring 123 may be connected to each other via a capacitor.

The circuit 264*a* has a function of comparing the potential of an analog signal (imaging data) input from the wiring 123 with that of a reference potential signal (e.g., a ramp wave signal) input from the wiring 267 and outputting an H potential or an L potential. A clock signal from a wiring 268 and the H potential or the L potential output from the circuit 264*a* are input to the counter circuit 264*b*. The counter circuit 264*b* measures the length of a period in which the H potential or the L potential is input and outputs the measurement result to the latch circuit 264*c* as a digital signal with an N-bit digital value. In addition, a set signal or a reset signal is input from a wiring 265 to the counter circuit 264*b*. The latch circuit 264*c* has a function of holding the digital signal. In addition, a set signal or a reset signal is input from a wiring 266 to the latch circuit 264*c*.

The column driver circuit 262 is also referred to as a column selection circuit, a horizontal driver circuit, or the like. The column driver circuit 262 generates a selection signal for selecting a column from which the imaging data held in the latch circuit 264*c* is to be read. The column driver circuit 262 can be formed using a shift register or the like. Columns are sequentially selected by the column driver circuit 262, and the imaging data output from the latch circuits 264*c* in the selected columns is input to the output circuit 263 through a wiring 269. The wiring 269 can function as a horizontal transfer line.

The imaging data input to the output circuit 263 is processed in the output circuit 263 and output to the outside of the imaging device 115. The output circuit 263 can be formed using a buffer circuit, for example. Furthermore, the output circuit 263 may have a function of capable of controlling the timing at which a signal is output to the outside of the imaging device 115.

Furthermore, the second circuit 270 has a function of generating and outputting a selection signal for selecting the pixel 141 from which a signal is to be read. Note that the second circuit 270 may also be referred to as a row selection circuit or a vertical driver circuit. In this manner, imaging data that is an analog signal can be converted to a digital signal with an N-bit digital value to be output to the outside.

The peripheral circuit includes at least one of a logic circuit, a switch, a buffer, an amplifier circuit, and a converter circuit. Furthermore, transistors or the like used for the peripheral circuit may be formed using part of a semiconductor that is formed to manufacture a pixel driver circuit 112 described later. Furthermore, a semiconductor device such as an IC chip may be used as part or the whole of the peripheral circuit.

Note that in the peripheral circuit, at least one of the first circuit 260 to the fourth circuit 290 may be omitted. For example, one of the first circuit 260 and the fourth circuit 290 may be omitted by adding a function of the one of the first circuit 260 and the fourth circuit 290 to the other of the first circuit 260 and the fourth circuit 290. As another example, one of the second circuit 270 and the third circuit 280 may be omitted by adding a function of the one of the second circuit 270 and the third circuit 280 to the other of the second circuit 270 and the third circuit 280. As another example, when one of the first circuit 260 to the fourth circuit 290 additionally has functions of the other circuits in the peripheral circuit, the other circuits in the peripheral circuit may be omitted.

Figure 20A:
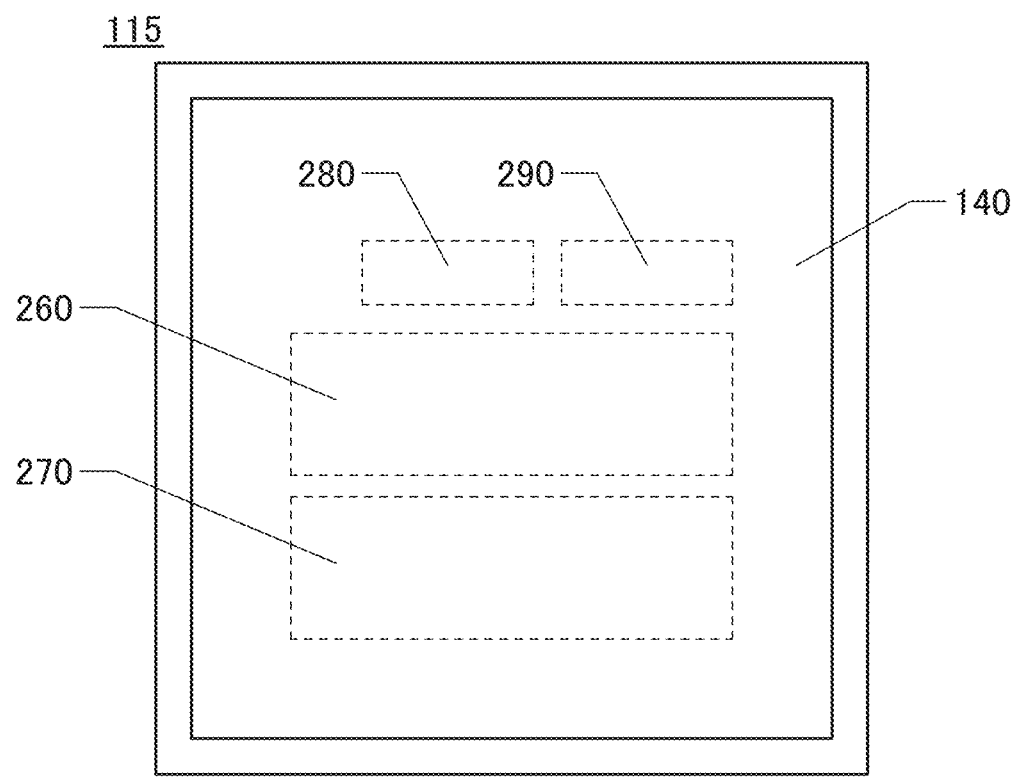
FIGS. 20A-20B Diagrams illustrating a configuration example of an imaging device.
Figure 20B:
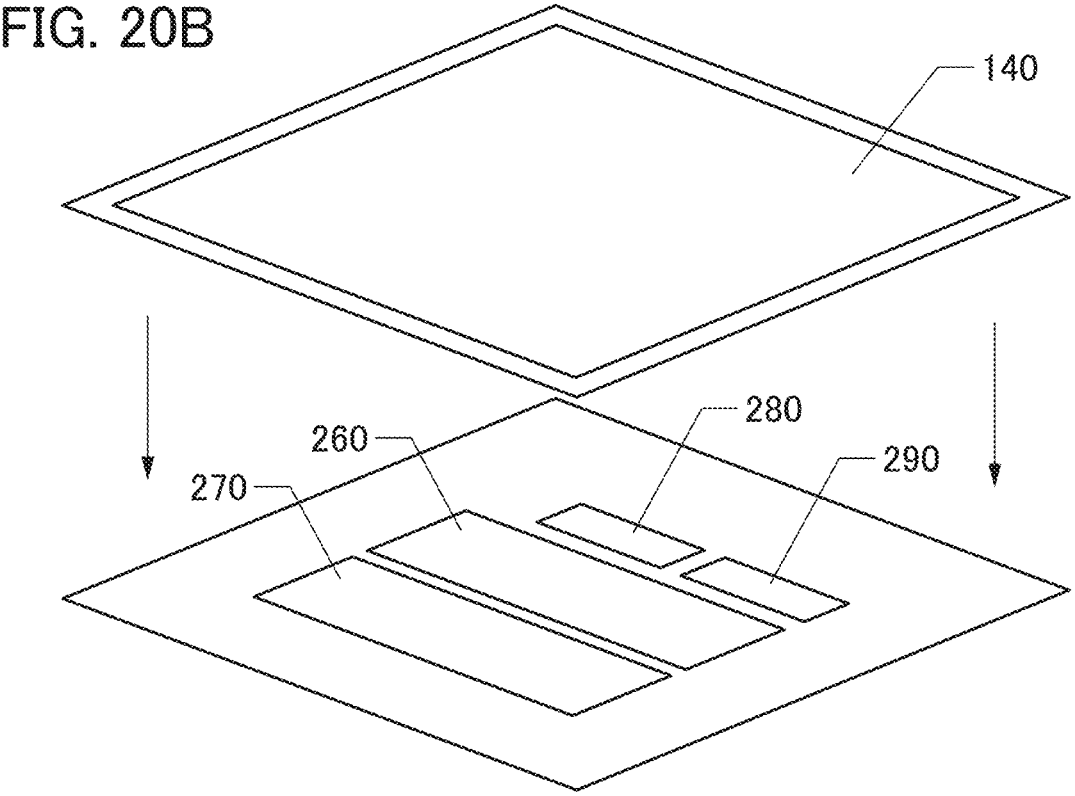

Furthermore, as illustrated in FIG. 20, the pixel portion 140 may be provided above the first circuit 260 to the fourth circuit 290 so as to overlap with them. FIG. 20(A) is a top view of the imaging device 115 in which the pixel portion 140 is formed above the first circuit 260 to the fourth circuit 290 so as to overlap with them. Furthermore, FIG. 20(B) is a perspective view for explaining the configuration of the imaging device 115 illustrated in FIG. 20(A).

By providing the pixel portion 140 above the first circuit 260 to the fourth circuit 290 so as to overlap with them, the area occupied by the pixel portion 140 with respect to the size of the imaging device 115 can be increased. Accordingly, the light sensitivity of the imaging device 115 can be improved. Furthermore, the dynamic range of the imaging device 115 can be improved. Furthermore, the resolution of the imaging device 115 can be improved. Furthermore, the quality of an image captured by the imaging device 115 can be raised. Furthermore, the integration degree of the imaging device 115 can be improved.

<<Circuit Configuration Example of Pixel 141>>

Figure 21A:
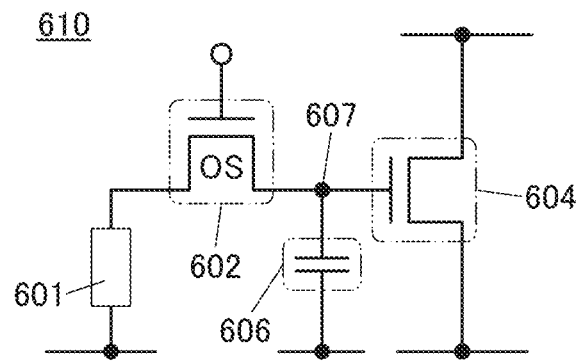
FIGS. 21A-21C Diagrams illustrating circuit configuration examples.
Figure 21B:
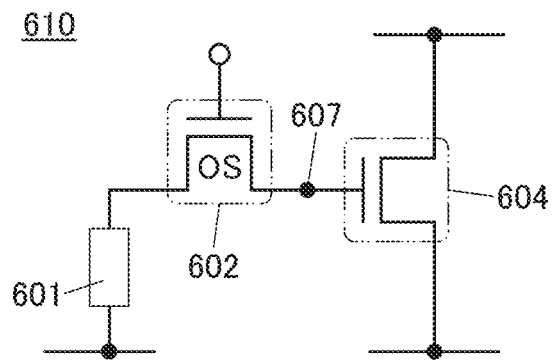
Figure 21C:
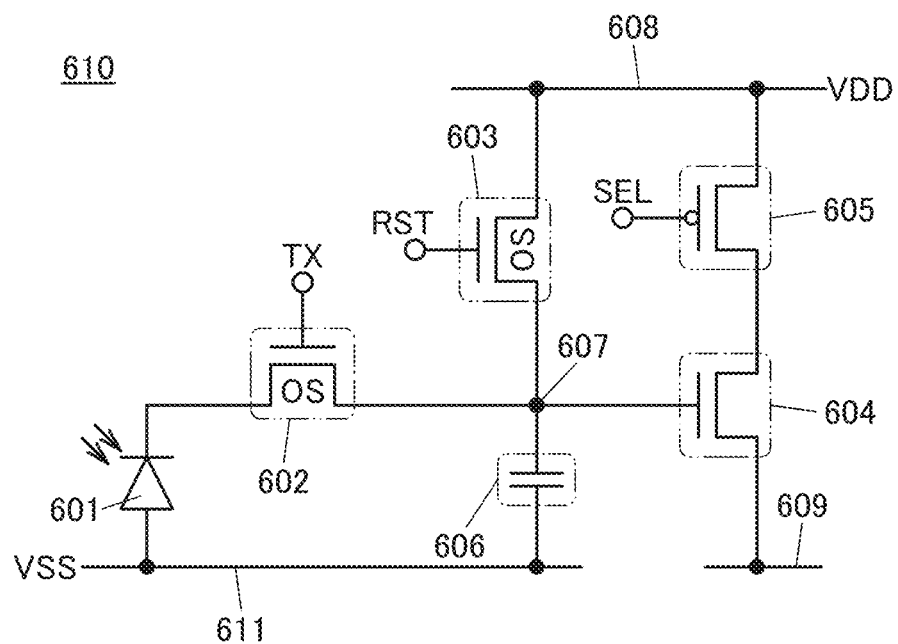

FIG. 21(A) to FIG. 21(C) each illustrate a circuit 610 as an example of a circuit that can be used as the pixel 114.

Note that the term "over" or "under" in this specification and the like does not necessarily mean that a component is placed directly over or directly under and in direct contact with another component. For example, the expression "an electrode B over an insulating layer A" does not necessarily mean that the electrode B is formed over and in direct contact with the insulating layer A and does not exclude the case where another component is provided between the insulating layer A and the electrode B.

Furthermore, functions of a source and a drain may be interchanged with each other depending on operation conditions or the like, for example, in the case where a transistor having opposite polarity is employed or in the case where the direction of current flow is changed in circuit operation. Thus, it is difficult to define which is a source or a drain. Accordingly, the terms "source" and "drain" used in this specification can be interchanged with each other.

Furthermore, a voltage refers to a potential difference between a given potential and a reference potential (e.g., a ground potential or a source potential) in many cases. Thus, a voltage can also be referred to as a potential.

Example 1 of Pixel Circuit

The circuit 610 illustrated in FIG. 21(A) includes a photoelectric conversion element 601, a transistor 602, a transistor 604, and a capacitor 606. One of a source and a drain of the transistor 602 is electrically connected to the photoelectric conversion element 601, and the other of the source and the drain of the transistor 602 is electrically connected to a gate of the transistor 604 through a node 607.

A transistor in which an oxide semiconductor is used for a semiconductor layer in which a channel is formed (also referred to as "OS transistor") is preferably used as the transistor 602.

In an OS transistor, a current that flows between a source and a drain when the transistor is in an off state (also referred to as "off-state current") can be extremely low; thus, the capacitor 606 can be small. Alternatively, the capacitor 606 can be omitted as illustrated in FIG. 21(B). Furthermore, when an OS transistor is used as the transistor 602, the potential of the node 607 is less likely to fluctuate. Thus, an imaging device which is less likely to be affected by noise can be provided.

Note that an OS transistor may be used as the transistor 602. Note that in the circuit diagrams of this specification and the like, "OS" is sometimes added to the circuit symbol of a transistor to show that an OS transistor is preferably used as the transistor.

A diode element in which a PN junction or a PIN junction is formed in a silicon substrate can be used as the photoelectric conversion element 601. Alternatively, a PIN diode element or the like in which an amorphous silicon film, a microcrystalline silicon film, or the like is used may be used. Alternatively, a diode-connected transistor may be used. Alternatively, a variable resistor or the like utilizing a photoelectric effect may be formed using silicon, germanium, selenium, or the like.

Furthermore, the photoelectric conversion element may be formed using a material capable of generating a charge by absorbing a radiation. Examples of the material capable of generating a charge by absorbing a radiation include lead iodide, mercury iodide, gallium arsenide, CdTe, and CdZn.

Example 2 of Pixel Circuit

FIG. 21(C) illustrates the circuit 610 in which a photodiode is used as the photoelectric conversion element 601. The circuit 610 illustrated in FIG. 21(C) includes the photoelectric conversion element 601, the transistor 602, a transistor 603, the transistor 604, a transistor 605, and the capacitor 606. One of a source and a drain of the transistor 602 is electrically connected to a cathode of the photoelectric conversion element 601, and the other terminal is electrically connected to the node 607 (charge accumulation portion). An anode of the photoelectric conversion element 601 is electrically connected to a wiring 611. One of a source and a drain of the transistor 603 is electrically connected to the node 607, and the other terminal is electrically connected to a wiring 608. A gate of the transistor 604 is electrically connected to the node 607, one of a source and a drain is electrically connected to the node 607 and a wiring 609, and the other terminal is electrically connected to one of a source and a drain of the transistor 605. The other of the source and the drain of the transistor 605 is electrically connected to the wiring 608. One electrode of the capacitor 606 is electrically connected to the node 607, and the other electrode is electrically connected to the wiring 611.

The transistor 602 can function as a transfer transistor. A gate of the transistor 602 is supplied with a transfer signal TX. The transistor 603 can function as a reset transistor. A gate of the transistor 603 is supplied with a reset signal RST. The transistor 604 can function as an amplifier transistor. The transistor 605 can function as a selection transistor. A gate of the transistor 605 is supplied with a selection signal SEL. Moreover, VDD is supplied to the wiring 608, and VSS is supplied to the wiring 611.

Next, the operation of the circuit 610 illustrated in FIG. 21(C) will be described. First, the transistor 603 is turned on, so that VDD is supplied to the node 607 (reset operation). Then, the transistor 603 is turned off, so that VDD is held at the node 607. Next, the transistor 602 is turned on, so that the potential of the node 607 is changed in accordance with the amount of light received by the photoelectric conversion element 601 (accumulation operation). After that, the transistor 602 is turned off, so that the potential of the node 607 is held. Next, the transistor 605 is turned on, so that a potential corresponding to the potential of the node 607 is output from the wiring 609 (selection operation). By measuring the potential of the wiring 609, the amount of light received by the photoelectric conversion element 601 can be determined.

OS transistors are preferably used as the transistor 602 and the transistor 603. Since the off-state current of an OS transistor can be extremely low as described above, the capacitor 606 can be small. Alternatively, the capacitor 606 can be omitted. Furthermore, when OS transistors are used as the transistor 602 and the transistor 603, the potential of the node 607 is less likely to fluctuate. Thus, an imaging device which is less likely to be affected by noise can be provided.

<<Global Shutter System, Rolling Shutter System>>

In this manner, the imaging device 115 performs imaging by controlling the whole pixel portion 140 in which the reset operation, the accumulation operation, and the selection operation of every pixel 141 are repeatedly performed. As imaging methods in which the whole pixel portion 140 is controlled, a global shutter system and a rolling shutter system are known.

In the global shutter system, the reset operation and the accumulation operation are performed substantially at the same time in all the pixels 141, and then, a read operation is sequentially performed row by row. Therefore, a favorable image with little distortion can be obtained even in the case of a moving object.

In the rolling shutter system, in contrast, the accumulation operation is not performed at the same time in all the pixels 141 but is sequentially performed row by row. Thus, since the timing of imaging in the first row is different from that in the last row, simultaneous imaging in all the pixels 141 is not ensured. Consequently, an image with large distortion is obtained in the case of a moving object.

To achieve the global shutter system, the potential of the charge accumulation portion needs to be held for a long time until sequential reading of signals from the pixels is terminated. When OS transistors are used as the transistor 602 and the transistor 603, for example, the potential of the charge accumulation portion can be held for a long time. In contrast, in the case where transistors whose channel formation regions are formed using silicon or the like are used as the transistor 602 and the transistor 603, for example, the potential of the charge accumulation portion cannot be held for a long time because of their high off-state current, which makes it difficult to use the global shutter system.

As described above, the use of the OS transistor for the pixel 141 makes it easy to realize the global shutter system.

This embodiment can be implemented in an appropriate combination with any of the structures described in the other embodiments.

Embodiment 3

Figure 22:
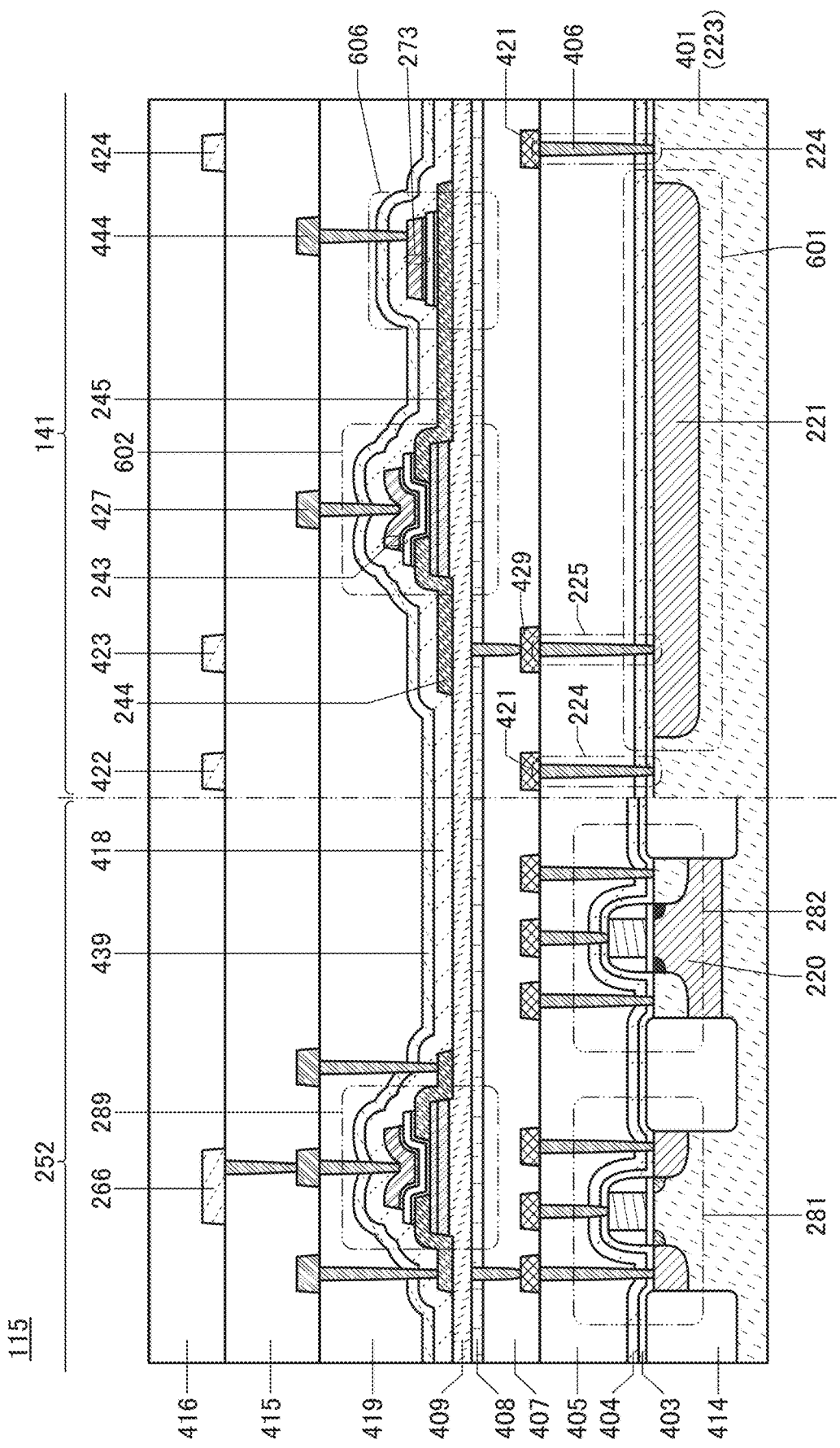
FIG. 22 A view illustrating a structure example of an imaging device.
Figure 23A:
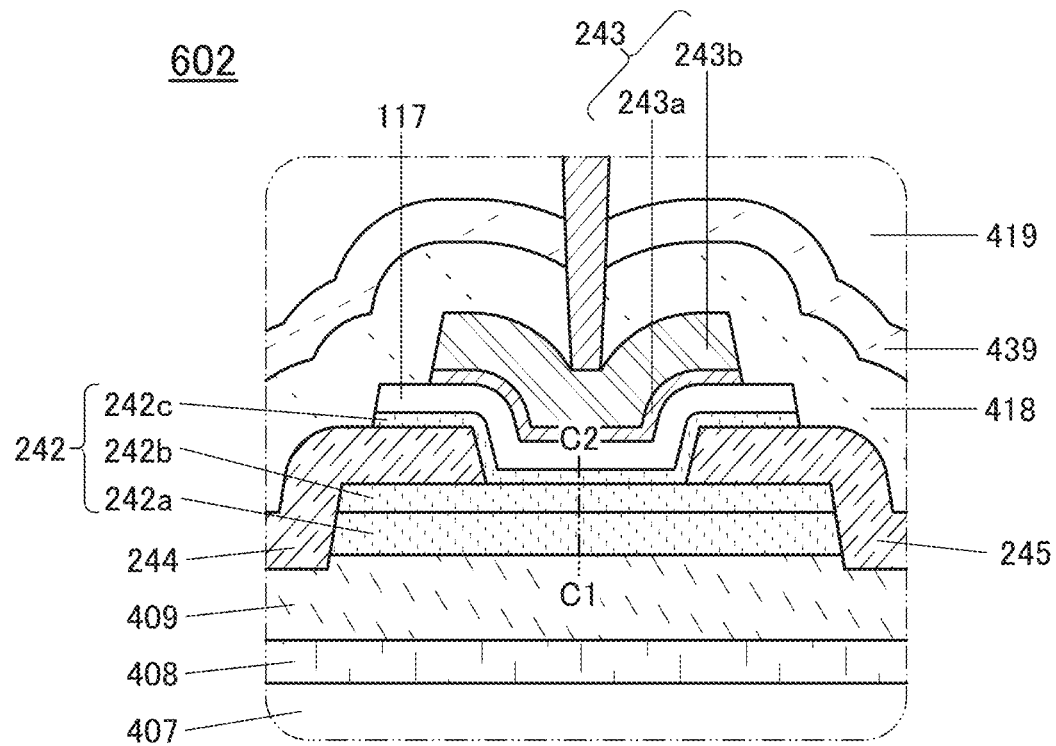
FIGS. 23A-23B Views illustrating examples of a transistor and a capacitor.
Figure 23B:
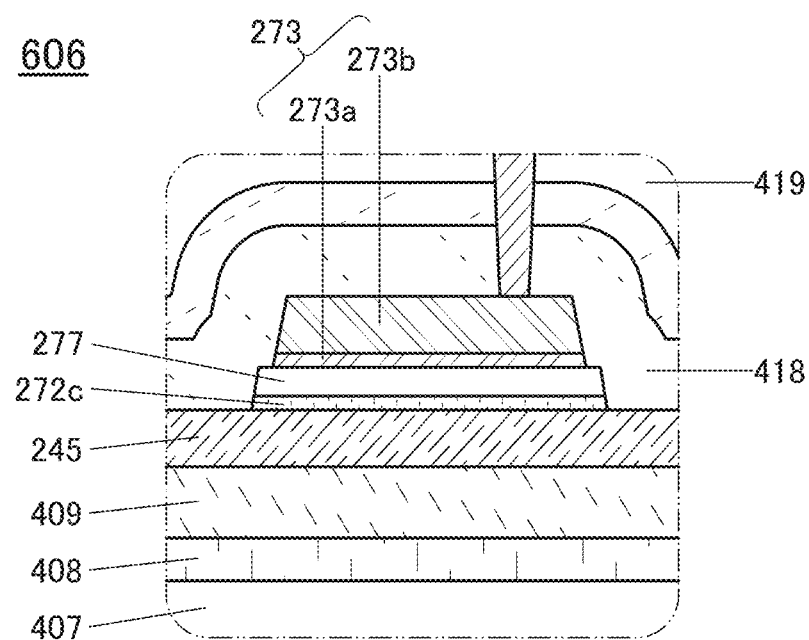
Figure 25A:
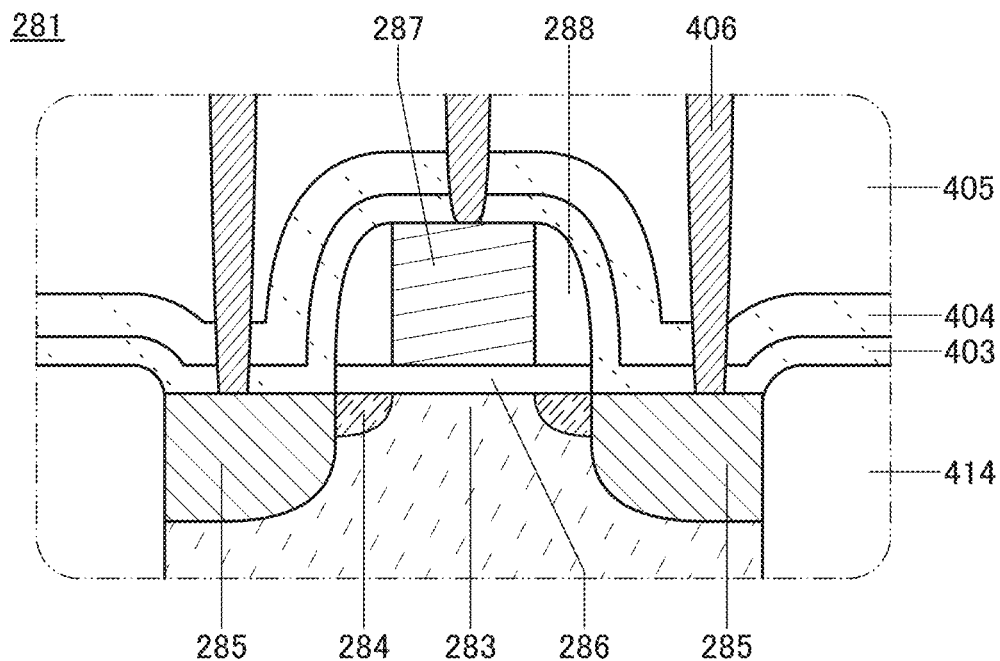
FIGS. 25A-25B Views illustrating examples of transistors.
Figure 25B:
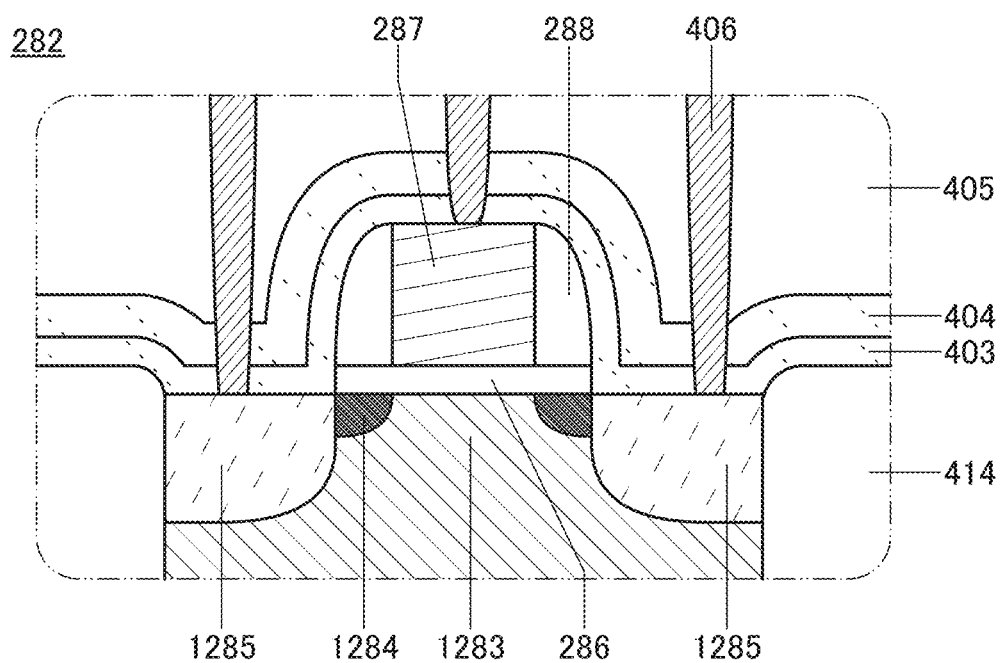

In this embodiment, an example of the case where the imaging device 115 shown in the above embodiment includes a CMOS image sensor that is a kind of solid-state imaging device will be described with reference to drawings. FIG. 22 shows a cross-sectional view of part of the pixel 141 included in the imaging device 115 and a cross-sectional view of a peripheral circuit region 252 which is part of the peripheral circuit. Furthermore, FIG. 23(A) shows an enlarged view of the transistor 602. Similarly, FIG. 23(B) shows an enlarged view of the capacitor 606. Similarly, FIG. 25(A) shows an enlarged view of a transistor 281. Similarly, FIG. 25(B) shows an enlarged view of a transistor 282. Note that the structure of the transistor 602 shown in this embodiment can be used for the other transistors shown in the above embodiment.

In the imaging device 115 described as an example in this embodiment, an n-type semiconductor is used for a substrate 401. Furthermore, a p-type semiconductor 221 of the photoelectric conversion element 601 is provided in the substrate 401. Furthermore, part of the substrate 401 functions as an n-type semiconductor 223 of the photoelectric conversion element 601.

In addition, the transistor 281 is provided on the substrate 401. The transistor 281 can function as a p-channel transistor. Furthermore, a p-type semiconductor well 220 is provided in part of the substrate 401. The well 220 can be provided by a method similar to that for forming the p-type semiconductor 221. The well 220 and the p-type semiconductor 221 can be formed at the same time. Furthermore, the transistor 282 is provided on the well 220. The transistor 282 can function as an n-channel transistor. Channels of the transistor 281 and the transistor 282 are formed in the substrate 401.

Furthermore, an insulating layer 403 is formed over the photoelectric conversion element 601, the transistor 281, and the transistor 282, and an insulating layer 404 is formed over the insulating layer 403.

The insulating layer 403 can be formed as a single layer or a stack containing an oxide material such as aluminum oxide, magnesium oxide, silicon oxide, silicon oxynitride, gallium oxide, germanium oxide, yttrium oxide, zirconium oxide, lanthanum oxide, neodymium oxide, hafnium oxide, or tantalum oxide, a nitride material such as silicon nitride, silicon nitride oxide, aluminum nitride, or aluminum nitride oxide, or the like. The insulating layer 403 can be formed by a sputtering method, a CVD method, a thermal oxidation method, a coating method, a printing method, or the like.

The insulating layer 404 can be formed using a material and a method similar to those of the insulating layer 403. Note that the insulating layer 403 and the insulating layer 404 are preferably formed using an insulating material that has a function of preventing diffusion of impurities such as oxygen, hydrogen, water, alkali metal, and alkaline earth metal. Note that either the insulating layer 403 or the insulating layer 404 may be omitted or another insulating layer may be stacked thereover.

Furthermore, in the imaging device 115 shown in this embodiment, an insulating layer 405 having a flat surface is provided over the insulating layer 404. The insulating layer 405 can be formed using a material and a method similar to those of the insulating layer 403. It is also possible to use a low-dielectric constant material (a low-k material), a siloxane-based resin, PSG (phosphosilicate glass), BPSG (borophosphosilicate glass), or the like for the insulating layer 405. In addition, the surface of the insulating layer 405 may be subjected to chemical mechanical polishing (CMP) treatment (hereinafter also referred to as "CMP treatment"). The CMP treatment can reduce unevenness of a surface of a material and improve coverage with an insulating layer or a conductive layer formed later.

In addition, an opening 224 is formed in regions of the insulating layers 403 to 405 which overlap with the substrate 401 (the n-type semiconductor 223), and an opening 225 is formed in regions of the insulating layers 403 to 405 which overlap with the p-type semiconductor 221. Furthermore, contact plugs 406 are formed in the opening 224 and the opening 225. The contact plugs 406 are formed by filling the openings provided in the insulating layers with a conductive material. As the conductive material, for example, a conductive material with high embeddability, such as tungsten or polysilicon, can be used. Furthermore, although not illustrated, the side surface and the bottom surface of the material can be covered with a barrier layer (a diffusion prevention layer), namely a titanium layer, a titanium nitride layer, a stack of these layers, or the like. In this case, the barrier film may be regarded as part of the contact plug. Note that regarding the opening 224 and the opening 225, there is no particular limitation on the number and arrangement. Thus, an imaging device with high layout flexibility can be provided.

Furthermore, a wiring 421 and a wiring 429 are formed over the insulating layer 405. The wiring 421 is electrically connected to the n-type semiconductor 223 via the contact plug 406 provided in the opening 224. Similarly, the wiring 429 is electrically connected to the p-type semiconductor 221 via the contact plug 406 provided in the opening 225.

Furthermore, an insulating layer 407 is formed to cover the wiring 421 and the wiring 429. The insulating layer 407 can be formed using a material and a method similar to those of the insulating layer 405. In addition, a surface of the insulating layer 407 may be subjected to CMP treatment. The CMP treatment can reduce unevenness of a surface of a material and improve coverage with an insulating layer or a conductive layer formed later.

The wiring 421 and the wiring 429 can each have a single-layer structure or a stacked-layer structure formed using a metal such as aluminum, titanium, chromium, nickel, copper, yttrium, zirconium, molybdenum, manganese, silver, tantalum, or tungsten or an alloy containing it as a main component. Examples include a single-layer structure of a copper film containing manganese, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film is formed, an aluminum film or a copper film is stacked over the titanium film or the titanium nitride film, and another titanium film or another titanium nitride film is formed thereover, a three-layer structure in which a molybdenum film or a molybdenum nitride film is formed, an aluminum film or a copper film is stacked over the molybdenum film or the molybdenum nitride film, and another molybdenum film or another molybdenum nitride film is formed thereover, and a three-layer structure in which a copper film is stacked over a tungsten film and another tungsten film is formed thereover. Furthermore, an alloy film or a nitride film in which aluminum is combined with one or more elements selected from titanium, tantalum, tungsten, molybdenum, chromium, neodymium, and scandium may be used.

Note that a conductive material containing oxygen, such as indium tin oxide (ITO), zinc oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added, or a conductive material containing nitrogen, such as titanium nitride or tantalum nitride, may be used. It is also possible to use a stacked-layer structure in which a material containing the above metal element is combined with the conductive material containing oxygen. It is also possible to use a stacked-layer structure in which a material containing the above metal element is combined with the conductive material containing nitrogen. It is also possible to use a stacked-layer structure in which a material containing the above metal element is combined with the conductive material containing oxygen and the conductive material containing nitrogen.

The transistor 602, a transistor 289, and the capacitor 606 are formed over the insulating layer 407 with an insulating layer 408 and an insulating layer 409 positioned therebetween. Besides the transistor 602, a non-illustrated transistor or the like can also be formed over the insulating layer 407 with the insulating layer 408 and the insulating layer 409 positioned therebetween. Note that in the example shown in this embodiment, the transistor 602, the transistor 289, and the like are each a top-gate transistor; however, a bottom-gate transistor may also be used.

Alternatively, an inverted staggered transistor or a forward staggered transistor can also be used as the transistors. It is also possible to use a dual-gate transistor, in which a semiconductor layer in which a channel is formed is interposed between two gate electrodes. Furthermore, the transistors are not limited to the ones having a single-gate structure; a multi-gate transistor having a plurality of channel formation regions, such as a double-gate transistor, may be used.

Furthermore, as the transistors, transistors with a variety of structures, such as a planar type, a FIN type, and a TRI-GATE type, can be used.

The above transistors may have similar structures or different structures. The transistor size (e.g., the channel length and the channel width) or the like of each transistor may be adjusted as appropriate. In the case where all of the plurality of transistors included in the imaging device 115 have the same structure, the transistors can be manufactured concurrently in the same process.

The transistor 602 includes an electrode 243 that can function as a gate electrode, an electrode 244 that can function as one of a source electrode and a drain electrode, an electrode 245 that can function as the other of the source electrode and the drain electrode, an insulating layer 117 that can function as a gate insulating layer, and a semiconductor layer 242 (see FIG. 23(A)).

Note that in FIG. 22, the electrode 245 is formed to be used not only as the electrode 245 that functions as the other of the source electrode and the drain electrode of the transistor 602 but also as an electrode that can function as one electrode of the capacitor 606. However, one embodiment of the present invention is not limited thereto. The electrode that functions as the other of the source electrode and the drain electrode of the transistor 602 and the electrode that can function as the one electrode of the capacitor 606 may be formed using different electrodes.

Furthermore, the capacitor 606 has a structure in which the electrode 245 that can function as the one electrode of the capacitor 606 and an electrode 273 that can function as the other electrode overlap with each other with an insulating layer 277 and a semiconductor layer 272c positioned therebetween (see FIG. 23(B)). In addition, the electrode 273 can be formed at the same time as the electrode 243. Furthermore, the insulating layer 277 and the semiconductor layer 272c can function as a dielectric. In addition, the insulating layer 277 can be formed at the same time as the insulating layer 117. In addition, the semiconductor layer 272c can be formed at the same time as a semiconductor layer 242c. Note that either the insulating layer 277 or the semiconductor layer 272c may be omitted.

The insulating layer 408 is preferably formed using an insulating material that has a function of preventing diffusion of impurities such as oxygen, hydrogen, water, alkali metal, and alkaline earth metal. Examples of the insulating material include silicon oxide, silicon oxynitride, silicon nitride, silicon nitride oxide, gallium oxide, hafnium oxide, yttrium oxide, aluminum oxide, and aluminum oxynitride. Note that when silicon nitride, gallium oxide, hafnium oxide, yttrium oxide, aluminum oxide, or the like is used as the insulating material, impurities diffused from the photoelectric conversion element 601 side can be prevented from reaching the semiconductor layer 242. Note that the insulating layer 408 can be formed by a sputtering method, a CVD method, an evaporation method, a thermal oxidation method, or the like. As the insulating layer 408, a single layer or a stack of any of these materials can be used.

The insulating layer 409 can be formed using a material and a method similar to those of the insulating layer 403. In addition, in the case where an oxide semiconductor is used for the semiconductor layer 242, an insulating layer containing oxygen in excess of oxygen in the stoichiometric composition is preferably used to form the insulating layer 409. From the insulating layer containing oxygen in excess of oxygen in the stoichiometric composition, part of the oxygen is released by heating. The insulating layer containing oxygen in excess of oxygen in the stoichiometric composition is an insulating layer of which the amount of released oxygen converted into oxygen atoms is greater than or equal to $1.0 \times 10^{18}$ atoms/cm$^3$, preferably greater than or equal to $3.0 \times 10^{20}$ atoms/cm$^3$ in TDS analysis in which heat treatment is performed such that the surface temperature of the insulating layer is higher than or equal to 100° C. and lower than or equal to 700° C., preferably higher than or equal to 100° C. and lower than or equal to 500° C. Moreover, the insulating layer containing oxygen in excess of oxygen in the stoichiometric composition can be formed by treatment for adding oxygen to the insulating layer. The treatment for adding oxygen can be performed by heat treatment in an oxygen atmosphere or performed with an ion implantation apparatus, an ion doping apparatus, or a plasma treatment apparatus. As a gas for adding oxygen, an oxygen gas of $^{16}O_2$, $^{18}O_2$, or the like, a nitrous oxide gas, an ozone gas, or the like can be used. Note that in this specification, the treatment for adding oxygen is also referred to as "oxygen doping treatment".

Semiconductor layers of the transistor 602, the transistor 289, and the like can be formed using a single crystal semiconductor, a polycrystalline semiconductor, a microcrystalline semiconductor, a nanocrystalline semiconductor, a semi-amorphous semiconductor, an amorphous semiconductor, or the like. For example, amorphous silicon or microcrystalline germanium can be used. Alternatively, a compound semiconductor such as silicon carbide, gallium arsenide, an oxide semiconductor, or a nitride semiconductor, an organic semiconductor, or the like can be used.

In this embodiment, an oxide semiconductor is used for the semiconductor layer 242. In addition, the semiconductor layer 242 may be a single layer or a stack of a plurality of layers. Note that in the case where the semiconductor layer 242 is a stack of a plurality of layers, semiconductor materials of the same kind may be stacked, or different kinds of semiconductor materials may be stacked. In this embodiment, the case where the semiconductor layer 242 is a stack of a semiconductor layer 242a, a semiconductor layer 242b, and the semiconductor layer 242c will be described.

In this embodiment, the semiconductor layer 242a, the semiconductor layer 242b, and the semiconductor layer 242c are formed using a material containing In and/or Ga. Typical examples are an In—Ga oxide (an oxide containing In and Ga), an In—Zn oxide (an oxide containing In and Zn), and an In-M-Zn oxide (an oxide containing In, an element M, and Zn; the element M is one or more kinds of elements selected from Al, Ti, Ga, Y, Zr, La, Ce, Nd, and Hf and refers to a metal element whose bonding strength with oxygen is higher than that of In).

The semiconductor layer 242a and the semiconductor layer 242c are preferably formed using a material containing one or more kinds of metal elements that are the same as metal elements contained in the semiconductor layer 242b. With the use of such a material, interface states can be prevented from being generated at an interface between the semiconductor layer 242a and the semiconductor layer 242b and an interface between the semiconductor layer 242c and the semiconductor layer 242b. Accordingly, carriers are unlikely to be scattered or captured at the interfaces, which results in an improvement in the field-effect mobility of the transistor. Furthermore, variation in the threshold voltage of the transistor can be reduced. Thus, a semiconductor device having favorable electrical characteristics can be obtained.

The semiconductor layer 242a and the semiconductor layer 242c each have a thickness greater than or equal to 3 nm and less than or equal to 100 nm, preferably greater than or equal to 3 nm and less than or equal to 50 nm. In addition, the semiconductor layer 242b has a thickness greater than or equal to 3 nm and less than or equal to 200 nm, preferably greater than or equal to 3 nm and less than or equal to 100 nm, further preferably greater than or equal to 3 nm and less than or equal to 50 nm.

Furthermore, when the semiconductor layer 242b is an In-M-Zn oxide and the semiconductor layer 242a and the semiconductor layer 242c are each also an In-M-Zn oxide, the semiconductor layer 242a and the semiconductor layer 242c each contain In, M, and Zn at $x_1:y_1:z_1$ [atomic ratio] and the semiconductor layer 242b contains In, M, and Zn at $x_2:y_2:z_2$ [atomic ratio]. In this case, the semiconductor layer 242a, the semiconductor layer 242c, and the semiconductor layer 242b are selected such that $y_1/x_1$ is larger than $y_2/x_2$. It is preferable that the semiconductor layer 242a, the semiconductor layer 242c, and the semiconductor layer 242b are selected such that $y_1/x_1$ is 1.5 times or more of $y_2/x_2$. It is further preferable that the semiconductor layer 242a, the semiconductor layer 242c, and the semiconductor layer 242b are selected such that $y_1/x_1$ is twice or more of $y_2/x_2$. It is still further preferable that the semiconductor layer 242a, the semiconductor layer 242c, and the semiconductor layer 242b are selected such that $y_1/x_1$ is three times or more of $y_2/x_2$. At this time, $y_1$ is preferably larger than or equal to $x_1$ in the semiconductor layer 242b, in which case the transistor can have stable electrical characteristics. However, when $y_1$ is three times or more of $x_1$, the field-effect mobility of the transistor is reduced; therefore, $y_1$ is preferably smaller than three times $x_1$. When the semiconductor layer 242a and the semiconductor layer 242c each have the above composition, the semiconductor layer 242a and the semiconductor layer 242c can each be a layer in which oxygen vacancies are less likely to be generated than in the semiconductor layer 242b.

Note that when the semiconductor layer 242a and the semiconductor layer 242c are each an In-M-Zn oxide, the content percentages of In and the element M, excluding Zn and O, are as follows: preferably, the content percentage of In is lower than 50 atomic % and that of the element M is higher than or equal to 50 atomic %; further preferably, the content percentage of In is lower than 25 atomic % and that of the element M is higher than or equal to 75 atomic %. Furthermore, when the semiconductor layer 242b is an In-M-Zn oxide, the content percentages of In and the element M, excluding Zn and O, are as follows: preferably, the content percentage of In is higher than or equal to 25 atomic % and that of the element M is lower than 75 atomic %; further preferably, the content percentage of In is higher than or equal to 34 atomic % and that of the element M is lower than 66 atomic %.

For example, an In—Ga—Zn oxide which is formed using a target having an atomic ratio of In:Ga:Zn=1:3:2, 1:3:4, 1:3:6, 1:6:4, 1:9:6, or the like, an In—Ga oxide which is formed using a target having an atomic ratio of In:Ga=1:9 or the like, or gallium oxide can be used for the semiconductor layer 242a which contains In or Ga and the semiconductor layer 242c which contains In or Ga. Furthermore, an In—Ga—Zn oxide which is formed using a target having an atomic ratio of In:Ga:Zn=3:1:2, 1:1:1, 5:5:6, 4:2:4.1, or the like can be used for the semiconductor layer 242b. Note that the atomic ratios of the semiconductor layer 242a, the semiconductor layer 242b, and the semiconductor layer 242c may each have variation within an error range of ±20% of the above atomic ratio.

To give stable electrical characteristics to the transistor in which the semiconductor layer 242b is used, the semiconductor layer 242b is preferably highly purified and made intrinsic by reducing impurities and oxygen vacancies therein so that the semiconductor layer 242b can be regarded as an intrinsic or substantially intrinsic oxide semiconductor layer. Furthermore, the semiconductor layer 242b is preferably a semiconductor layer in which at least the channel formation region can be regarded as intrinsic or substantially intrinsic.

Note that the substantially intrinsic oxide semiconductor layer refers to an oxide semiconductor layer in which the carrier density is lower than $8\times10^{11}/cm^3$ or lower than $1\times10^{11}/cm^3$ and higher than or equal to $1\times10^{-9}/cm^3$.

[Energy Band Structure of Oxide Semiconductor]

Figure 24:
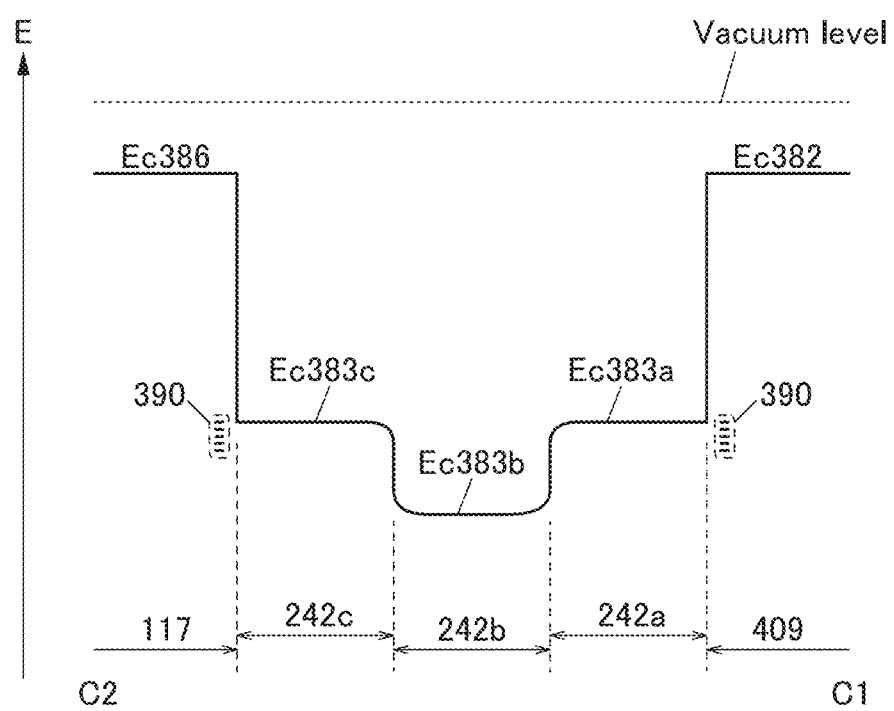
FIG. 24 A diagram illustrating an energy band structure.

Here, the function and effect of the semiconductor layer 242 that is a stack of the semiconductor layer 242a, the semiconductor layer 242b, and the semiconductor layer 242c will be described with reference to an energy band structure diagram illustrated in FIG. 24. FIG. 24 is an energy band structure diagram of a portion indicated by dashed-dotted line C1-C2 in FIG. 23(A). FIG. 24 illustrates the energy band structure of the channel formation region of the transistor 602.

In FIG. 24, Ec382, Ec383a, Ec383b, Ec383c, and Ec386 denote the energy of the conduction band minimum of the insulating layer 409, that of the semiconductor layer 242a, that of the semiconductor layer 242b, that of the semiconductor layer 242c, and that of the insulating layer 117, respectively.

Here, an energy difference between the vacuum level and the conduction band minimum (also referred to as "electron affinity") corresponds to a value obtained by subtracting an energy gap from an energy difference between the vacuum level and the valence band maximum (also referred to as an ionization potential). Note that the energy gap can be measured with a spectroscopic ellipsometer (UT-300; HORIBA JOBIN YVON S.A.S.). In addition, the energy difference between the vacuum level and the valence band maximum can be measured with an ultraviolet photoelectron spectroscopy (UPS) device (VersaProbe; ULVAC-PHI, Inc.).

Note that an In—Ga—Zn oxide formed using a target with an atomic ratio of In:Ga:Zn=1:3:2 has an energy gap of approximately 3.5 eV and an electron affinity of approximately 4.5 eV. In addition, an In—Ga—Zn oxide formed using a target with an atomic ratio of In:Ga:Zn=1:3:4 has an energy gap of approximately 3.4 eV and an electron affinity of approximately 4.5 eV. In addition, an In—Ga—Zn oxide formed using a target with an atomic ratio of In:Ga:Zn=1:3:6 has an energy gap of approximately 3.3 eV and an electron affinity of approximately 4.5 eV. In addition, an In—Ga—Zn oxide formed using a target with an atomic ratio of In:Ga:Zn=1:6:2 has an energy gap of approximately 3.9 eV and an electron affinity of approximately 4.3 eV. In addition, an In—Ga—Zn oxide formed using a target with an atomic ratio of In:Ga:Zn=1:6:8 has an energy gap of approximately 3.5 eV and an electron affinity of approximately 4.4 eV. In addition, an In—Ga—Zn oxide formed using a target with an atomic ratio of In:Ga:Zn=1:6:10 has an energy gap of approximately 3.5 eV and an electron affinity of approximately 4.5 eV. In addition, an In—Ga—Zn oxide formed using a target with an atomic ratio of In:Ga:Zn=1:1:1 has an energy gap of approximately 3.2 eV and an electron affinity of approximately 4.7 eV. In addition, an In—Ga—Zn oxide formed using a target with an atomic ratio of In:Ga:Zn=3:1:2 has an energy gap of approximately 2.8 eV and an electron affinity of approximately 5.0 eV.

Since the insulating layer 409 and the insulating layer 117 are insulators, Ec382 and Ec386 are closer to the vacuum level (each have a smaller electron affinity) than Ec383a, Ec383b, and Ec383c.

Furthermore, Ec383a is closer to the vacuum level than Ec383b. Specifically, Ec383a is preferably closer to the vacuum level than Ec383b by 0.05 eV or more, 0.07 eV or more, 0.1 eV or more, or 0.15 eV or more and 2 eV or less, 1 eV or less, 0.5 eV or less, or 0.4 eV or less.

Furthermore, Ec383c is closer to the vacuum level than Ec383b. Specifically, Ec383c is preferably closer to the vacuum level than Ec383b by 0.05 eV or more, 0.07 eV or more, 0.1 eV or more, or 0.15 eV or more and 2 eV or less, 1 eV or less, 0.5 eV or less, or 0.4 eV or less.

Furthermore, mixed regions are formed in the vicinity of the interface between the semiconductor layer 242a and the semiconductor layer 242b and in the vicinity of the interface between the semiconductor layer 242b and the semiconductor layer 242c; thus, the energy of the conduction band minimum continuously changes. In other words, no or few states exist at these interfaces.

Accordingly, electrons transfer mainly through the semiconductor layer 242b in the stacked-layer structure having the energy band structure. Therefore, even when a state exists at an interface between the semiconductor layer 242a and the insulating layer 409 or an interface between the semiconductor layer 242c and the insulating layer 117, the state hardly influences the electron transfer. In addition, no or few states exist at the interface between the semiconductor layer 242a and the semiconductor layer 242b and the interface between the semiconductor layer 242c and the semiconductor layer 242b; thus, the electron transfer is not interrupted in these regions. Accordingly, with the above stacked-layer structure of the oxide semiconductors, the transistor 602 can have high field-effect mobility.

Note that, as illustrated in FIG. 24, trap states 390 due to impurities or defects might be formed in the vicinity of the interface between the semiconductor layer 242a and the insulating layer 409 and the interface between the semiconductor layer 242c and the insulating layer 117; however, the semiconductor layer 242b can be separated from the trap states owing to the existence of the semiconductor layer 242a and the semiconductor layer 242c.

Furthermore, for example, a top surface and a side surface of the semiconductor layer 242b formed over the semiconductor layer 242a may be covered with the semiconductor layer 242c. In this manner, the semiconductor layer 242b is covered with the semiconductor layer 242a and the semiconductor layer 242c, whereby the influence of the above trap states can be further reduced.

However, in the case where an energy difference between Ec383a or Ec383c and Ec383b is small, an electron in the semiconductor layer 242b might reach the trap state by passing over the energy difference. Since the electron is trapped at the trap state, a negative fixed charge is generated at the interface with the insulating layer, causing the threshold voltage of the transistor to be shifted in the positive direction.

Therefore, the energy difference between Ec383a and Ec383b and that between Ec383c and Ec383b are each preferably 0.1 eV or more, further preferably 0.15 eV or more, in which case a change in the threshold voltage of the transistor can be reduced and the transistor can have favorable electrical characteristics.

Furthermore, the bandgaps of the semiconductor layer 242a and the semiconductor layer 242c are preferably wider than the bandgap of the semiconductor layer 242b.

According to one embodiment of the present invention, a transistor with small variation in electrical characteristics can be provided. Accordingly, a semiconductor device with small variation in electrical characteristics can be provided. According to one embodiment of the present invention, a transistor with favorable reliability can be provided. Accordingly, a semiconductor device with favorable reliability can be provided.

Moreover, an oxide semiconductor has a bandgap of 2 eV or more; therefore, a transistor in which an oxide semiconductor is used for a semiconductor layer in which a channel is formed can have an extremely low off-state current. Specifically, the off-state current per micrometer of channel width at room temperature can be lower than $1 \times 10^{-20}$ A, preferably lower than $1 \times 10^{-22}$ A, further preferably lower than $1 \times 10^{-24}$ A. That is, the on/off ratio can have 20 digits or more and 150 digits or less.

According to one embodiment of the present invention, a transistor with low power consumption can be provided. Accordingly, an imaging device or a semiconductor device with low power consumption can be provided.

Moreover, since an OS transistor has a very low off-state current, the use of an OS transistor as the transistor 602 enables a reduction in the size of the capacitor 606. Thus, the light-receiving area of the photoelectric conversion element 601 can be increased. Furthermore, the use of an OS transistor as the transistor 602 can lead to a reduction in unintended current (also referred to as "leakage current" or "leak current") that flows between the source and the drain. Accordingly, the power consumption of the imaging device 115 can be reduced. In addition, noise occurring at the electrode 244 and the electrode 245 can be reduced, whereby the quality of an image taken by the imaging device 115 can be improved. Furthermore, the imaging device 115 with high reliability can be provided.

According to one embodiment of the present invention, an imaging device or a semiconductor device with high light sensitivity can be provided. Furthermore, according to one embodiment of the present invention, an imaging device or a semiconductor device with a wide dynamic range can be provided.

Furthermore, since an oxide semiconductor has a wide bandgap, a semiconductor device in which an oxide semiconductor is used can be used in a wide range of ambient temperature. According to one embodiment of the present invention, an imaging device or a semiconductor device which can operate in a wide temperature range can be provided.

Note that the above-described three-layer structure is an example. For example, a two-layer structure in which either the semiconductor layer 242a or the semiconductor layer 242c is not formed may be employed.

[Oxide Semiconductor]

Here, an oxide semiconductor which can be used for the semiconductor layer 242 will be described in detail.

<Structure of Oxide Semiconductor>

The structure of an oxide semiconductor will be described below.

Oxide semiconductors are classified into a single crystal oxide semiconductor and a non-single crystal oxide semiconductor. Examples of a non-single crystal oxide semiconductor include a CAAC-OS (C Axis Aligned Crystalline Oxide Semiconductor), a polycrystalline oxide semiconductor, an nc-OS (nanocrystalline Oxide Semiconductor), an pseudo-amorphous oxide semiconductor (a-like OS: amorphous like Oxide Semiconductor), and an amorphous oxide semiconductor.

From another perspective, oxide semiconductors are classified into an amorphous oxide semiconductor and a crystalline oxide semiconductor. Examples of a crystalline oxide semiconductor include a single crystal oxide semiconductor, a CAAC-OS, a polycrystalline oxide semiconductor, and an nc-OS.

It is known that an amorphous structure is generally defined as being in a metastable state and unfixed, being isotropic and having no non-uniform structure, and so on. In other words, that structure has a flexible bond angle and a short-range order but does not have a long-range order.

Conversely, an inherently stable oxide semiconductor cannot be called a completely amorphous oxide semiconductor. Moreover, an oxide semiconductor that is not isotropic (e.g., the one with a periodic structure in a microscopic region) cannot be called a completely amorphous oxide semiconductor. Note that although having a periodic structure in a microscopic region, an a-like OS contains a void space (also referred to as a void) and has an unstable structure. For this reason, its physical properties are similar to those of an amorphous oxide semiconductor.

<CAAC-OS>

First, a CAAC-OS will be described.

A CAAC-OS is one of oxide semiconductors having a plurality of c-axis aligned crystal parts (also referred to as pellets).

In a combined analysis image (also referred to as a high-resolution TEM image) of a bright-field image and a diffraction pattern of a CAAC-OS, which is observed with a transmission electron microscope (TEM), a plurality of pellets can be recognized. On the other hand, in the high-resolution TEM image, a boundary between pellets, that is, a crystal grain boundary (also referred to as a grain boundary) cannot be clearly recognized. Thus, in the CAAC-OS, a reduction in electron mobility due to the crystal grain boundary is less likely to occur.

Figure 38A:
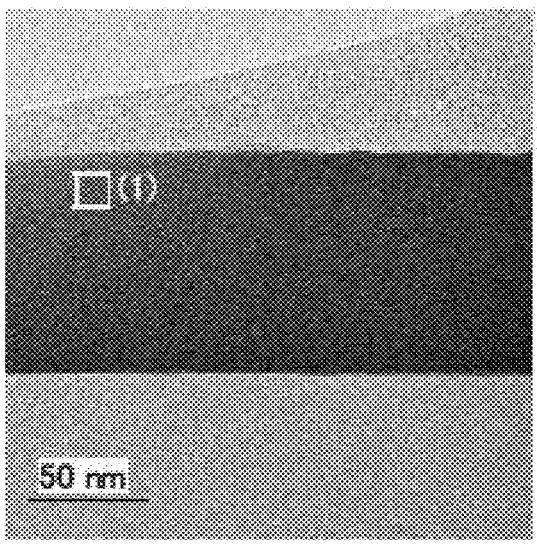
FIGS. 38A-38D Cs-corrected high-resolution cross-sectional TEM images of a CAAC-OS and a schematic cross-sectional view of the CAAC-OS.

A CAAC-OS observed with a TEM will be described below. FIG. 38(A) shows a high-resolution TEM image of a cross section of the CAAC-OS which was observed from a direction substantially parallel to a sample surface. For the observation of the high-resolution TEM image, a spherical aberration corrector function was used. The high-resolution TEM image obtained with the spherical aberration corrector function is particularly referred to as a Cs-corrected high-resolution TEM image. The Cs-corrected high-resolution TEM image can be obtained with, for example, an atomic resolution analytical electron microscope JEM-ARM200F manufactured by JEOL Ltd.

Figure 38B:
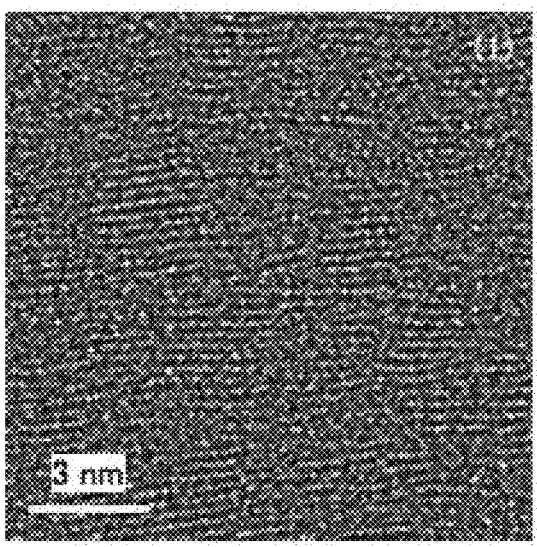

FIG. 38(B) shows an enlarged Cs-corrected high-resolution TEM image of a region (1) in FIG. 38(A). FIG. 38(B) indicates that metal atoms are arranged in a layered manner in a pellet. Each metal atom layer has a configuration reflecting unevenness of a surface over which a CAAC-OS film is formed (also referred to as a formation surface) or its top surface, and is parallel to the formation surface or the top surface of the CAAC-OS.

Figure 38C:
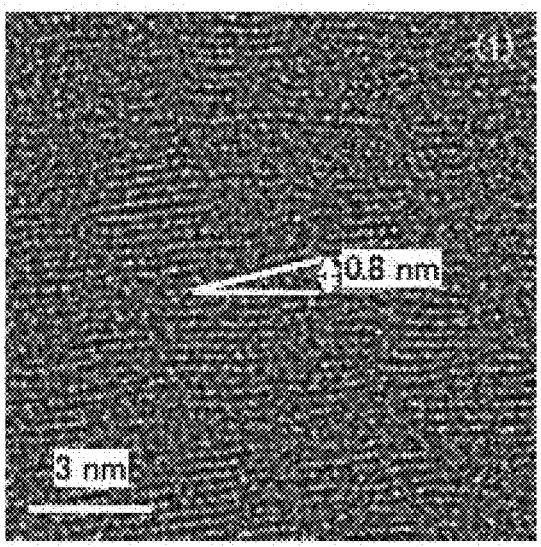

As shown in FIG. 38(B), the CAAC-OS has a characteristic atomic arrangement. The characteristic atomic arrangement is denoted by an auxiliary line in FIG. 38(C). FIG. 38(B) and FIG. 38(C) prove that the size of a pellet is greater than or equal to 1 nm or greater than or equal to 3 nm and that the space between pellets caused by the tilt is approximately 0.8 nm. Therefore, the pellet can also be referred to as a nanocrystal (nc). Furthermore, the CAAC-OS can also be referred to as an oxide semiconductor including CANC (C-Axis Aligned nanocrystals).

Figure 38D:
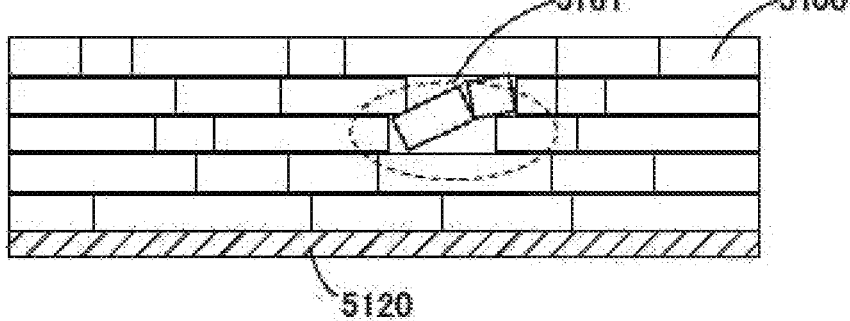

Here, according to the Cs-corrected high-resolution TEM images, the arrangement of pellets 5100 of a CAAC-OS over a substrate 5120 is schematically illustrated as a structure in which bricks or blocks are stacked (see FIG. 38(D)). The part in which the pellets are tilted as observed in FIG. 38(C) corresponds to a region 5161 shown in FIG. 38(D).

In addition, FIG. 39(A) shows a Cs-corrected high-resolution plan-view TEM image of a CAAC-OS observed from a direction substantially perpendicular to a sample surface. FIG. 39(B), FIG. 39(C), and FIG. 39(D) show an enlarged Cs-corrected high-resolution TEM image of a region (1), that of a region (2), and that of a region (3) in FIG. 39(A), respectively. FIG. 39(B), FIG. 39(C), and FIG. 39(D) indicate that metal atoms are arranged in a triangular, quadrangular, or hexagonal configuration in a pellet. However, there is no regularity of arrangement of metal atoms between different pellets.

Figure 40A:
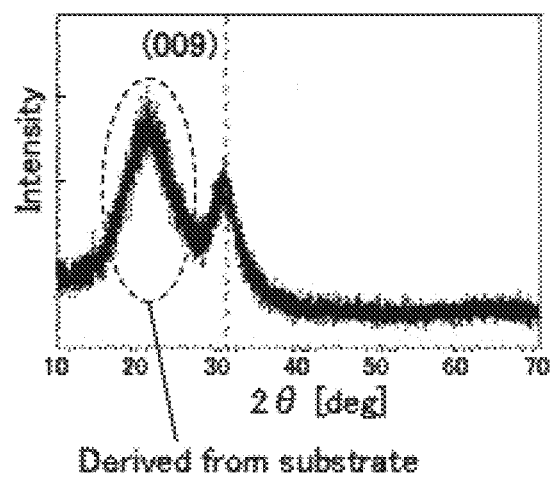
FIGS. 40A-40C Diagrams showing XRD structural analysis of a CAAC-OS and a single crystal oxide semiconductor.

Next, a CAAC-OS analyzed by X-ray diffraction (XRD) will be described. For example, when the structure of a CAAC-OS including an InGaZnO$_4$ crystal is analyzed by an out-of-plane method, a peak may appear at a diffraction angle (2θ) of around 31° as shown in FIG. 40(A). This peak is derived from the (009) plane of the InGaZnO$_4$ crystal, which can confirm that crystals in the CAAC-OS have c-axis alignment and that the c-axes are aligned in a direction substantially perpendicular to the formation surface or the top surface.

Note that in structural analysis of the CAAC-OS by an out-of-plane method, another peak may appear when 2θ is around 36°, in addition to the peak at 2θ of around 31°. The peak at 2θ of around 36° indicates that a crystal having no c-axis alignment is included in part of the CAAC-OS. It is preferable that in the CAAC-OS analyzed by an out-of-plane method, a peak appear when 2θ is around 31° and no peak appear when 2θ is around 36°.

Figure 40B:
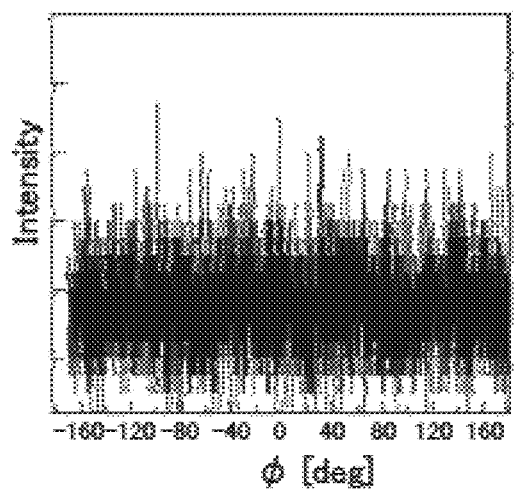
Figure 40C:
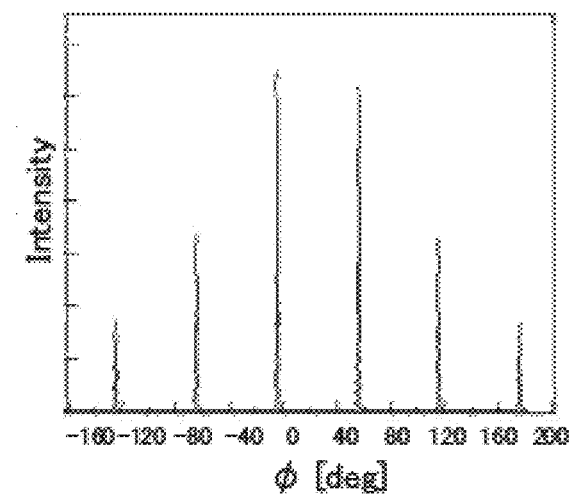

On the other hand, in structural analysis of the CAAC-OS by an in-plane method in which an X-ray is incident from a direction substantially perpendicular to the c-axis, a peak appears when 2θ is around 56°. This peak is derived from the (110) plane of the InGaZnO$_4$ crystal. In the case of the CAAC-OS, even when analysis (φ scan) is performed with 2θ fixed at around 56° while the sample is rotated using a normal vector of the sample surface as an axis (φ axis), no clear peak appears as shown in FIG. 40(B). In contrast, in the case where a single crystal oxide semiconductor of InGaZnO$_4$ is subjected to φ scan with 2θ fixed at around 56°, six peaks which are derived from crystal planes equivalent to the (110) plane are observed as shown in FIG. 40(C). Accordingly, the structural analysis using XRD can confirm that the a-axes and the b-axes are irregularly oriented in the CAAC-OS.

Figure 41A:
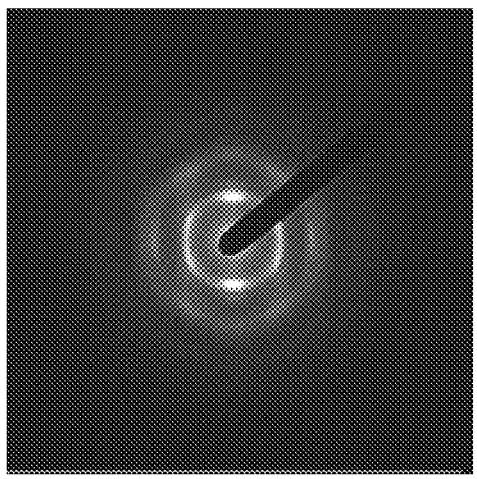
FIGS. 41A-41B Images showing electron diffraction patterns of a CAAC-OS.
Figure 41B:
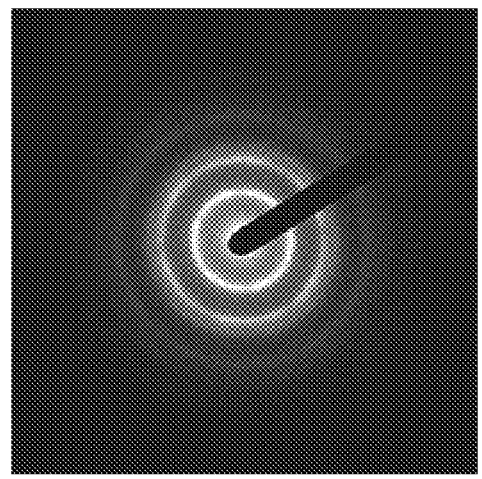

Next, a CAAC-OS analyzed by electron diffraction will be described. For example, when an electron beam with a probe diameter of 300 nm is incident on a CAAC-OS including an InGaZnO$_4$ crystal in a direction parallel to the sample surface, a diffraction pattern (also referred to as a selected-area transmission electron diffraction pattern) shown in FIG. 41(A) may be obtained. This diffraction pattern includes spots attributed to the (009) plane of the InGaZnO$_4$ crystal. Thus, the electron diffraction also indicates that pellets included in the CAAC-OS have c-axis alignment and that the c-axes are aligned in a direction substantially perpendicular to the formation surface or the top surface. Meanwhile, FIG. 41(B) shows a diffraction pattern obtained in such a manner that an electron beam with a probe diameter of 300 nm is incident on the same sample perpendicularly to the sample surface. In FIG. 41(B), a ring-like diffraction pattern can be recognized. Thus, the electron diffraction also indicates that the a-axes and the b-axes of the pellets included in the CAAC-OS do not have orientation. Note that the first ring in FIG. 41(B) is probably attributed to the (010) plane, the (100) plane, and the like of the InGaZnO$_4$ crystal. In addition, the second ring in FIG. 41(B) is probably attributed to the (110) plane and the like.

As described above, the CAAC-OS is an oxide semiconductor with high crystallinity. Entry of impurities, formation of defects, or the like might decrease the crystallinity of an oxide semiconductor. Conversely, the CAAC-OS can be regarded as an oxide semiconductor with few impurities and defects (e.g., oxygen vacancies).

Note that an impurity means an element other than the main components of an oxide semiconductor, such as hydrogen, carbon, silicon, or a transition metal element. For example, silicon, which is an element having higher bonding strength with oxygen than a metal element contained in an oxide semiconductor, extracts oxygen from the oxide semiconductor, which results in disorder of the atomic arrangement of the oxide semiconductor and a reduction in crystallinity. In addition, a heavy metal such as iron or nickel, argon, carbon dioxide, or the like has a large atomic radius (or molecular radius), and thus disturbs the atomic arrangement of the oxide semiconductor and decreases crystallinity.

The characteristics of an oxide semiconductor having impurities or defects might be changed by light, heat, or the like. For example, impurities contained in the oxide semiconductor might serve as carrier traps or carrier generation sources. Furthermore, oxygen vacancies in the oxide semiconductor might serve as carrier traps or serve as carrier generation sources when hydrogen is captured therein.

The CAAC-OS having few impurities and oxygen vacancies is an oxide semiconductor with low carrier density. Specifically, such an oxide semiconductor can have a carrier density lower than $8\times10^{11}/cm^3$, preferably lower than $1\times10^{11}/cm^3$, further preferably lower than $1\times10^{10}/cm^3$, and higher than or equal to $1\times10^{-9}/cm^3$. Such an oxide semiconductor is referred to as a highly purified intrinsic or substantially highly purified intrinsic oxide semiconductor. A CAAC-OS has a low impurity concentration and a low defect state density. That is, it can be referred to as an oxide semiconductor having stable characteristics.

<nc-OS>

Next, an nc-OS will be described.

A high-resolution TEM image of an nc-OS includes a region in which a crystal part can be recognized and a region in which no clear crystal part can be recognized. In most cases, the size of a crystal part included in the nc-OS is greater than or equal to 1 nm and less than or equal to 10 nm, or greater than or equal to 1 nm and less than or equal to 3 nm. Note that an oxide semiconductor including a crystal part whose size is greater than 10 nm and less than or equal to 100 nm is referred to as a microcrystalline oxide semiconductor in some cases. In a high-resolution TEM image of the nc-OS, for example, a crystal grain boundary cannot be clearly recognized in some cases. Note that there is a possibility that the origin of the nanocrystal is the same as that of a pellet in a CAAC-OS. Therefore, a crystal part of the nc-OS may be hereinafter referred to as a pellet.

In the nc-OS, a microscopic region (e.g., a region which is larger than or equal to 1 nm and smaller than or equal to 10 nm, in particular, a region which is larger than or equal to 1 nm and smaller than or equal to 3 nm) has a periodic atomic arrangement. Furthermore, there is no regularity of crystal orientation between different pellets in the nc-OS. Thus, the orientation of the whole film is not observed. Accordingly, in some cases, the nc-OS cannot be distinguished from an a-like OS or an amorphous oxide semiconductor, depending on an analysis method. For example, in the case where the nc-OS is analyzed by an out-of-plane method using an X-ray beam with a larger diameter than a pellet, a peak which indicates a crystal plane is not detected. Furthermore, a diffraction pattern like a halo pattern is observed when the nc-OS is subjected to electron diffraction using an electron beam with a larger probe diameter (e.g., 50 nm or larger) than a pellet. Meanwhile, spots are observed when the nc-OS is subjected to nanobeam electron diffraction using an electron beam with a probe diameter that is close to or smaller than the size of a pellet. In addition, when the nc-OS is subjected to nanobeam electron diffraction, regions with high luminance in a circular (ring) pattern are observed in some cases. Moreover, a plurality of spots is observed in a ring-like region in some cases.

Since there is no regularity of crystal orientation between pellets (nanocrystals) as described above, the nc-OS can also be referred to as an oxide semiconductor including RANC (Random Aligned nanocrystals) or an oxide semiconductor including NANC (Non-Aligned nanocrystals).

The nc-OS is an oxide semiconductor having higher regularity than an amorphous oxide semiconductor. Therefore, the nc-OS has a lower defect state density than the a-like OS and the amorphous oxide semiconductor. Note that no regularity of crystal orientation is observed between different pellets in the nc-OS. Therefore, the nc-OS has a higher defect state density than the CAAC-OS.

<a-Like OS>

An a-like OS is an oxide semiconductor with a structure intermediate between that of the nc-OS and that of the amorphous oxide semiconductor.

In a high-resolution TEM image of the a-like OS, a void space may be observed. Furthermore, the high-resolution TEM image includes a region in which a crystal part can be clearly recognized and a region in which a crystal part cannot be recognized.

The a-like OS has an unstable structure because it contains a void space. To verify that the a-like OS has an unstable structure as compared with the CAAC-OS and the nc-OS, a structure change caused by electron irradiation will be described below.

An a-like OS (denoted by Sample A), an nc-OS (denoted by Sample B), and a CAAC-OS (denoted by Sample C) are prepared as samples subjected to electron irradiation. Each of the samples is an In—Ga—Zn oxide.

First, a high-resolution cross-sectional TEM image of each sample is obtained. The high-resolution cross-sectional TEM images show that all the samples have crystal parts.

Note that which part is regarded as one crystal part may be determined as follows. For example, it is known that a unit cell of the InGaZnO$_4$ crystal has a structure in which three In—O layers and six Ga—Zn—O layers, nine layers in total, are stacked in a layered manner in the c-axis direction. The distance between the adjacent layers is equivalent to the lattice spacing (also referred to as d value) on the (009) plane. The value is calculated to be 0.29 nm from crystal structure analysis. Accordingly, a portion in which the distance between lattice fringes is greater than or equal to 0.28 nm and less than or equal to 0.30 nm can be regarded as a crystal part of InGaZnO$_4$. Note that the lattice fringe corresponds to the a-b plane of the InGaZnO$_4$ crystal.

Figure 42:
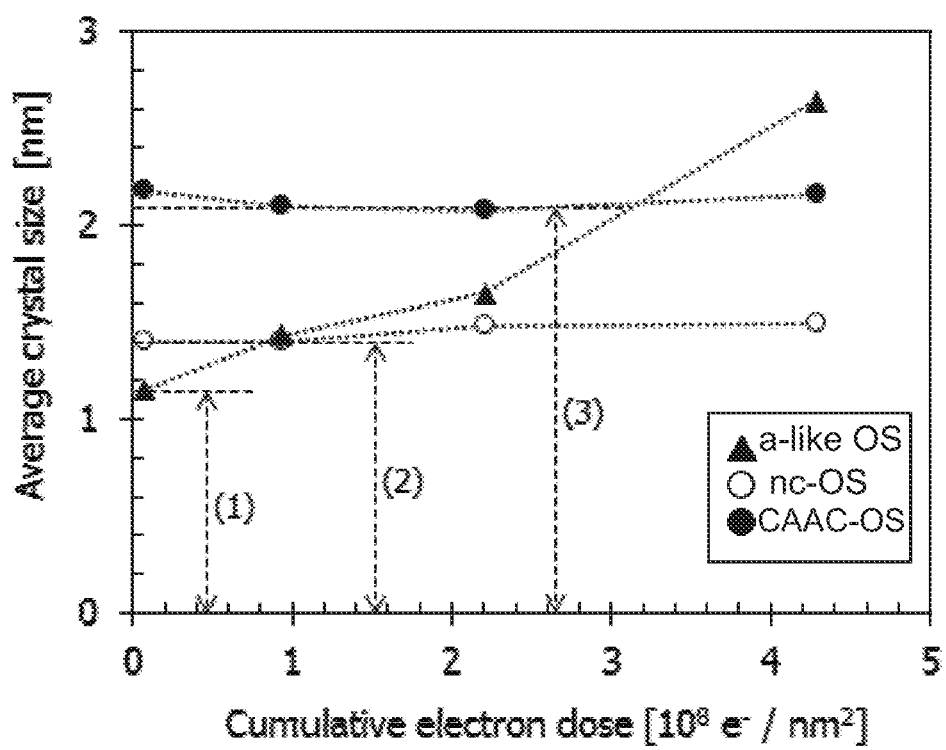
FIG. 42 A diagram showing a change of crystal parts of an In—Ga—Zn oxide owing to electron irradiation.

FIG. 42 exemplifies the researched average size of crystal parts (average crystal size) (at 22 points to 45 points) in each sample. Note that the size of the crystal part corresponds to the length of the above-described lattice fringe. FIG. 42 indicates that the crystal part in the a-like OS becomes larger with an increase in cumulative dose of electrons (cumulative electron dose). Specifically, as shown by (1) in FIG. 42, a crystal part of approximately 1.2 nm (also referred to as an initial nucleus) at the beginning of TEM observation grows to a size of approximately 2.6 nm at a cumulative dose of $4.2 \times 10^8$ e$^-$/nm$^2$. In contrast, the size of the crystal part in the nc-OS and the CAAC-OS shows little change from the start of electron irradiation to a cumulative dose of electrons of $4.2 \times 10^8$ e$^-$/nm$^2$. Specifically, as shown by (2) and (3) in FIG. 42, the size of the crystal part in the nc-OS and that in the CAAC-OS are approximately 1.4 nm and approximately 2.1 nm, respectively, regardless of the cumulative dose of electrons.

In the a-like OS, such growth of the crystal part due to electron irradiation is observed in some cases. In contrast, in the nc-OS and the CAAC-OS, growth of the crystal part due to electron irradiation is found to be hardly observable. That is, the a-like OS is found to have an unstable structure as compared with the nc-OS and the CAAC-OS.

Furthermore, since containing a void space, the a-like OS has a structure with a lower density than that of the nc-OS and that of the CAAC-OS. Specifically, the density of the a-like OS is greater than or equal to 78.6% and less than 92.3% of the density of a single crystal having the same composition. In addition, the density of the nc-OS and the density of the CAAC-OS are each greater than or equal to 92.3% and less than 100% of the density of the single crystal having the same composition. The deposition itself of an oxide semiconductor having a density less than 78% of the density of the single crystal is difficult.

For example, regarding an oxide semiconductor in which In:Ga:Zn=1:1:1 [atomic ratio] is satisfied, the density of single crystal InGaZnO$_4$ with a rhombohedral crystal structure is 6.357 g/cm$^3$. Accordingly, regarding the oxide semiconductor in which In:Ga:Zn=1:1:1 [atomic ratio] is satisfied, for example, the density of the a-like OS is higher than or equal to 5.0 g/cm$^3$ and lower than 5.9 g/cm$^3$. Furthermore, regarding the oxide semiconductor in which In:Ga:Zn=1:1:1 [atomic ratio] is satisfied, for example, the density of the nc-OS and the density of the CAAC-OS are each higher than or equal to 5.9 g/cm$^3$ and lower than 6.3 g/cm$^3$.

Note that a single crystal with the same composition does not exist in some cases. In that case, single crystals with different compositions are combined in an adequate ratio, which makes it possible to estimate a density equivalent to that of a single crystal with a desired composition. The density equivalent to that of the single crystal with the desired composition may be estimated using a weighted average with respect to the combination ratio of the single crystals with different compositions. Note that it is preferable to combine as few kinds of single crystals as possible for density estimation.

As described above, oxide semiconductors have various structures and various properties. Note that an oxide semiconductor may be a stack of films including two or more kinds of an amorphous oxide semiconductor, an a-like OS, an nc-OS, and a CAAC-OS, for example.

In addition, as an example of an oxide semiconductor that can be used for the semiconductor layer 242a, the semiconductor layer 242b, and a semiconductor layer 108c, an oxide containing indium can be given. An oxide containing indium has high carrier mobility (electron mobility), for example. Furthermore, the oxide semiconductor preferably contains an element M The element M is preferably aluminum, gallium, yttrium, tin, or the like. Other elements which can be used as the element M are boron, silicon, titanium, iron, nickel, germanium, zirconium, molybdenum, lanthanum, cerium, neodymium, hafnium, tantalum, tungsten, magnesium, and the like. Note that the element M may be a combination of two or more of the above elements. The element M is an element having a high bonding energy with oxygen, for example. The element M is an element having a function of increasing the energy gap of the oxide, for example. Furthermore, the oxide semiconductor preferably contains zinc. When an oxide contains zinc, for example, the oxide is easily crystallized.

Note that the oxide semiconductor is not limited to the oxide containing indium. The oxide semiconductor may be, for example, zinc tin oxide, gallium tin oxide, or gallium oxide.

In addition, an oxide with a large energy gap is used as the oxide semiconductor. For example, the energy gap of the oxide semiconductor is greater than or equal to 2.5 eV and less than or equal to 4.2 eV, preferably greater than or equal to 2.8 eV and less than or equal to 3.8 eV, further preferably greater than or equal to 3 eV and less than or equal to 3.5 eV.

An influence of impurities in the oxide semiconductor will be described below. Note that for stabilization of the electrical characteristics of the transistor, it is effective to reduce the impurity concentration in the oxide semiconductor to achieve low carrier density and high purification. To reduce the impurity concentration in the oxide semiconductor, the impurity concentration in an adjacent film is also preferably reduced.

For example, silicon in the oxide semiconductor might serve as a carrier trap or a carrier generation source. Therefore, the silicon concentration in the oxide semiconductor, which is measured by secondary ion mass spectrometry (SIMS), is lower than $1\times10^{19}$ atoms/cm$^3$, preferably lower than $5\times10^{18}$ atoms/cm$^3$, further preferably lower than $2\times10^{18}$ atoms/cm$^3$.

Furthermore, when hydrogen is contained in the oxide semiconductor, the carrier density might be increased. The hydrogen concentration in the oxide semiconductor, which is measured by SIMS, is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, still further preferably lower than or equal to $5\times10^{18}$ atoms/cm$^3$. Furthermore, when nitrogen is contained in the oxide semiconductor, the carrier density might be increased. The nitrogen concentration in the oxide semiconductor, which is measured by SIMS, is lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Furthermore, to reduce the hydrogen concentration in the oxide semiconductor, the hydrogen concentrations in the insulating layer 409 and the insulating layer 117 which are in contact with the semiconductor layer 242 are preferably reduced. The hydrogen concentrations in the insulating layer 409 and the insulating layer 117, which are measured by SIMS, are each lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, still further preferably lower than or equal to $5\times10^{18}$ atoms/cm$^3$. Furthermore, to reduce the nitrogen concentration in the oxide semiconductor, the nitrogen concentrations in the insulating layer 409 and the insulating layer 117 are preferably reduced. The nitrogen concentrations in the insulating layer 409 and the insulating layer 117, which are measured by SIMS, are each lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

In this embodiment, first, the semiconductor layer 242a is formed over the insulating layer 409, and the semiconductor layer 242b is formed over the semiconductor layer 242a.

Note that the oxide semiconductor layer is preferably deposited by a sputtering method. As a sputtering method, an RF sputtering method, a DC sputtering method, an AC sputtering method, or the like can be used. A DC sputtering method or an AC sputtering method can achieve uniform deposition as compared with an RF sputtering method.

In this embodiment, as the semiconductor layer 242a, a 20-nm-thick In—Ga—Zn oxide is formed by a sputtering method using an In—Ga—Zn oxide target (In:Ga:Zn=1:3:2). Note that without being limited thereto, other constituent elements and compositions are applicable to the semiconductor layer 242a.

Furthermore, oxygen doping treatment may be performed after the formation of the semiconductor layer 242a.

Next, the semiconductor layer 242b is formed over the semiconductor layer 242a. In this embodiment, as the semiconductor layer 242b, a 30-nm-thick In—Ga—Zn oxide is formed by a sputtering method using an In—Ga—Zn oxide target (In:Ga:Zn=1:1:1). Note that without being limited thereto, other constituent elements and compositions are applicable to the semiconductor layer 242b.

Furthermore, oxygen doping treatment may be performed after the formation of the semiconductor layer 242b.

Next, heat treatment may be performed to further reduce impurities such as moisture or hydrogen contained in the semiconductor layer 242a and the semiconductor layer 242b, so that the semiconductor layer 242a and the semiconductor layer 242b are highly purified.

For example, the semiconductor layer 242a and the semiconductor layer 242b are subjected to heat treatment in a reduced-pressure atmosphere, an inert atmosphere of nitrogen, a rare gas, or the like, an oxidation atmosphere, or an ultra-dry air (an air with a moisture content of 20 ppm (in a dew point equivalent to −55° C.) or less, preferably 1 ppm or less, preferably 10 ppb or less, in the case where the measurement is performed with a dew point meter in a CRDS (cavity ring down laser spectroscopy) system). Note that the oxidation atmosphere refers to an atmosphere containing 10 ppm or more oxidation gas such as oxygen, ozone, or nitrogen oxide. Furthermore, the inert atmosphere refers to an atmosphere containing the above oxidation gas at less than 10 ppm and is filled with nitrogen or a rare gas.

Moreover, by the heat treatment, oxygen contained in the insulating layer 409 can be diffused into the semiconductor layer 242a and the semiconductor layer 242b concurrently with the release of impurities, so that oxygen vacancies in the semiconductor layer 242a and the semiconductor layer 242b can be reduced. Note that heat treatment in an inert gas atmosphere may be followed by heat treatment in an atmosphere containing 10 ppm or more, 1% or more, or 10% or more oxidation gas. Note that the heat treatment may be performed at any time after the semiconductor layer 242b is formed. For example, the heat treatment may be performed after the semiconductor layer 242b is selectively etched.

The heat treatment may be performed at higher than or equal to 250° C. and lower than or equal to 650° C., preferably higher than or equal to 300° C. and lower than or equal to 500° C. The treatment time is shorter than or equal to 24 hours. Heat treatment for over 24 hours is not preferable because the productivity is reduced.

Next, a resist mask is formed over the semiconductor layer 242b, and with the use of the resist mask, part of the semiconductor layer 242a and part of the semiconductor layer 242b are selectively etched. At this time, the insulating layer 409 might be partly etched, so that the insulating layer 409 might have a projection.

A dry etching method and/or a wet etching method may be used for the etching of the semiconductor layer 242a and the semiconductor layer 242b. After the etching, the resist mask is removed.

Furthermore, in the transistor 602, the electrode 244 and the electrode 245 which are partly in contact with the semiconductor layer 242b are provided over the semiconductor layer 242b. The electrode 244 and the electrode 245 (including another electrode or wiring that is formed in the same layer as they) can be formed using a material and a method similar to those of the wiring 421.

In addition, the transistor 602 includes the semiconductor layer 242c over the semiconductor layer 242b, the electrode 244, and the electrode 245. The semiconductor layer 242c is partly in contact with the semiconductor layer 242b, the electrode 244, and the electrode 245.

In this embodiment, the semiconductor layer 242c is formed by a sputtering method using an In—Ga—Zn oxide target (In:Ga:Zn=1:3:2). Note that without being limited thereto, other constituent elements and compositions are applicable to the semiconductor layer 242c. For example, gallium oxide may be used for the semiconductor layer 242c. Furthermore, oxygen doping treatment may be performed on the semiconductor layer 242c.

Furthermore, the transistor 602 includes the insulating layer 117 over the semiconductor layer 242c. The insulating layer 117 can function as a gate insulating layer. The insulating layer 117 can be formed using a material and a method similar to those of the insulating layer 409. Furthermore, oxygen doping treatment may be performed on the insulating layer 117.

After the semiconductor layer 242c and the insulating layer 117 are formed, a mask may be formed over the insulating layer 117, and part of the semiconductor layer 242c and part of the insulating layer 117 may be selectively etched, whereby the island-shaped semiconductor layer 242c and the island-shaped insulating layer 117 are obtained.

Furthermore, the transistor 602 includes the electrode 243 over the insulating layer 117. The electrode 243 (including another electrode or wiring that is formed in the same layer as it) can be formed using a material and a method similar to those of the wiring 421.

In this embodiment, an example in which the electrode 243 is a stack of an electrode 243a and an electrode 243b is shown. For example, the electrode 243a is formed using tantalum nitride, and the electrode 243b is formed using copper. The electrode 243a functions as a barrier layer to prevent copper diffusion. Thus, a semiconductor device with high reliability can be provided.

Furthermore, the transistor 602 includes an insulating layer 418 which covers the electrode 243. The insulating layer 418 can be formed using a material and a method similar to those of the insulating layer 409. Furthermore, oxygen doping treatment may be performed on the insulating layer 418. In addition, a surface of the insulating layer 418 may be subjected to CMP treatment.

In addition, an insulating layer 439 is provided over the insulating layer 418, and an insulating layer 419 is provided over the insulating layer 439. The insulating layer 439 and the insulating layer 419 can each be formed using a material and a method similar to those of the insulating layer 405. In addition, a surface of the insulating layer 419 may be subjected to CMP treatment. The CMP treatment can reduce unevenness of a surface of a material and improve coverage with an insulating layer or a conductive layer formed later. In addition, openings are formed in part of the insulating layer 419, part of the insulating layer 439, and part of the insulating layer 418. Furthermore, contact plugs are formed in the openings.

Furthermore, a wiring 427 and a wiring 444 (including another electrode or wiring that is formed in the same layer as they) are formed over the insulating layer 419. The wiring 444 is electrically connected to the electrode 273 via the contact plug in the opening provided in the insulating layer 419 and the insulating layer 418. Similarly, the wiring 427 is electrically connected to the electrode 243 via the contact plug in the opening provided in the insulating layer 419 and the insulating layer 418.

The imaging device 115 further includes an insulating layer 415 which covers the wiring 427 and the wiring 444 (including another electrode or wiring that is formed in the same layer as they). The insulating layer 415 can be formed using a material and a method similar to those of the insulating layer 405. In addition, a surface of the insulating layer 415 may be subjected to CMP treatment. The CMP treatment can reduce unevenness of a surface of a material and improve coverage with an insulating layer or a conductive layer formed later. In addition, an opening is formed in part of the insulating layer 415.

Furthermore, a wiring 422, a wiring 423, and the wiring 266 (including another electrode or wiring that is formed in the same layer as they) are formed over the insulating layer 415.

Note that the wiring 422, the wiring 423, and the wiring 266 (including another electrode or wiring that is formed in the same layer as they) can each be electrically connected to a wiring in another layer or an electrode in another layer via a contact plug in an opening formed in the insulating layer.

Furthermore, an insulating layer 416 is provided to cover the wiring 422, the wiring 423, and the wiring 266. The insulating layer 416 can be formed using a material and a method similar to those of the insulating layer 405. In addition, a surface of the insulating layer 416 may be subjected to CMP treatment.

[Transistor 281, Transistor 282]

FIG. 25(A) is an enlarged cross-sectional view of the transistor 281 illustrated in FIG. 22 as an example of a transistor included in a peripheral circuit. Furthermore, FIG. 25(B) is an enlarged cross-sectional view of the transistor 282 illustrated in FIG. 22. In this embodiment, the case where the transistor 281 is a p-channel transistor and the transistor 282 is an n-channel transistor will be described as an example.

The transistor 281 includes a channel formation region 283, high-concentration p-type impurity regions 285, an insulating layer 286, an electrode 287, and a sidewall 288. Furthermore, low-concentration p-type impurity regions 284 are provided in regions overlapping with the sidewall 288 with the insulating layer 286 positioned therebetween. The insulating layer 286 can function as a gate insulating layer. The electrode 287 can function as a gate electrode.

The low-concentration p-type impurity regions 284 can be formed in such a manner that an impurity element is introduced with the use of the electrode 287 as a mask after the formation of the electrode 287 and before the formation of the sidewall 288. In other words, the low-concentration p-type impurity regions 284 can be formed in a self-aligned manner. After the sidewall 288 is formed, the high-concentration p-type impurity regions 285 are formed. Furthermore, the high-concentration p-type impurity regions 285 can be formed concurrently in the same process as the p-type semiconductor 221 included in the photoelectric conversion element 601. Note that the low-concentration p-type impurity regions 284 have the same conductivity type as the high-concentration p-type impurity regions 285 and have a lower concentration of the impurity imparting the conductivity type than the high-concentration p-type impurity regions 285. Furthermore, the low-concentration p-type impurity regions 284 are not necessarily provided depending on circumstances.

In the transistor 282, a channel formation region 1283 is formed in the well 220. Furthermore, the transistor 282 includes the channel formation region 1283, high-concentration n-type impurity regions 1285, the insulating layer 286, the electrode 287, and the sidewall 288. Furthermore, low-concentration n-type impurity regions 1284 are provided in regions overlapping with the sidewall 288 with the insulating layer 286 positioned therebetween.

The low-concentration n-type impurity regions 1284 can be formed in such a manner that an impurity element is introduced with the use of the electrode 287 as a mask after the formation of the electrode 287 and before the formation of the sidewall 288. In other words, the low-concentration n-type impurity regions 1284 can be formed in a self-aligned manner. After the sidewall 288 is formed, the high-concentration n-type impurity regions 1285 are formed. Note that the low-concentration n-type impurity regions 1284 have the same conductivity type as the high-concentration n-type impurity regions 1285 and have a lower concentration of the impurity imparting the conductivity type than the high-concentration n-type impurity regions 1285. Furthermore, the low-concentration n-type impurity regions 1284 are not necessarily provided depending on circumstances.

The transistor 281 and the transistor 282 are electrically isolated from each other by an element isolation layer 414. The element isolation region can be formed by a LOCOS (Local Oxidation of Silicon) method, an STI (Shallow Trench Isolation) method, or the like.

Modification Example 1

Figure 26:
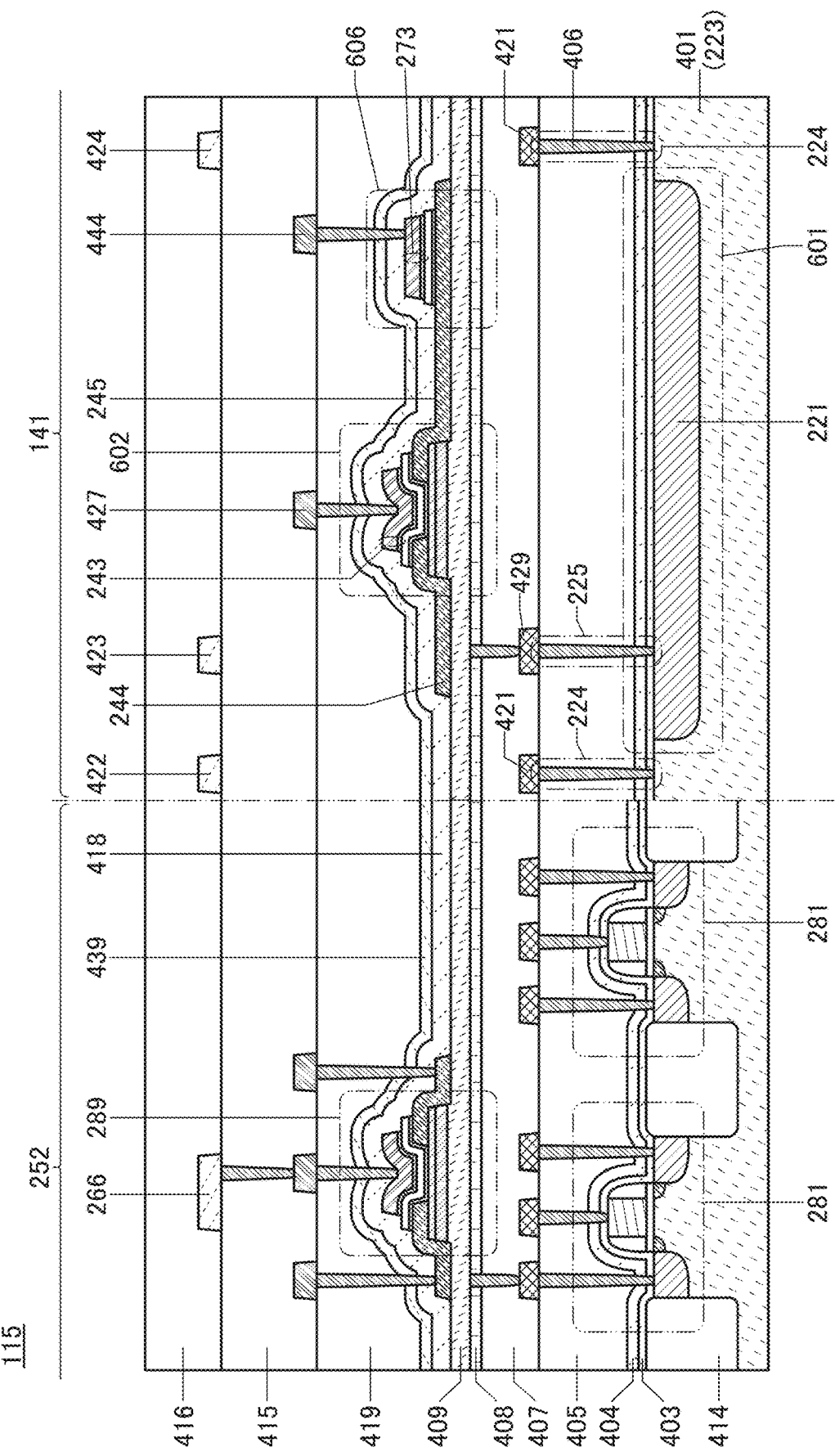
FIG. 26 A view illustrating a structure example of an imaging device.

FIG. 26 illustrates a structure example of an imaging device which is different from the one in FIG. 22. As illustrated in FIG. 26, a structure without the n-channel transistor 282 may also be employed. A CMOS circuit needed for the peripheral circuit can be obtained by combining the n-channel transistor 289 with the p-channel transistor 281. Since the n-channel transistor 282 is not provided, manufacturing steps of the imaging device 115 can be reduced. Accordingly, an imaging device with favorable producibility can be provided. Moreover, an imaging device can be manufactured at a lower cost.

Modification Example 2

Figure 27:
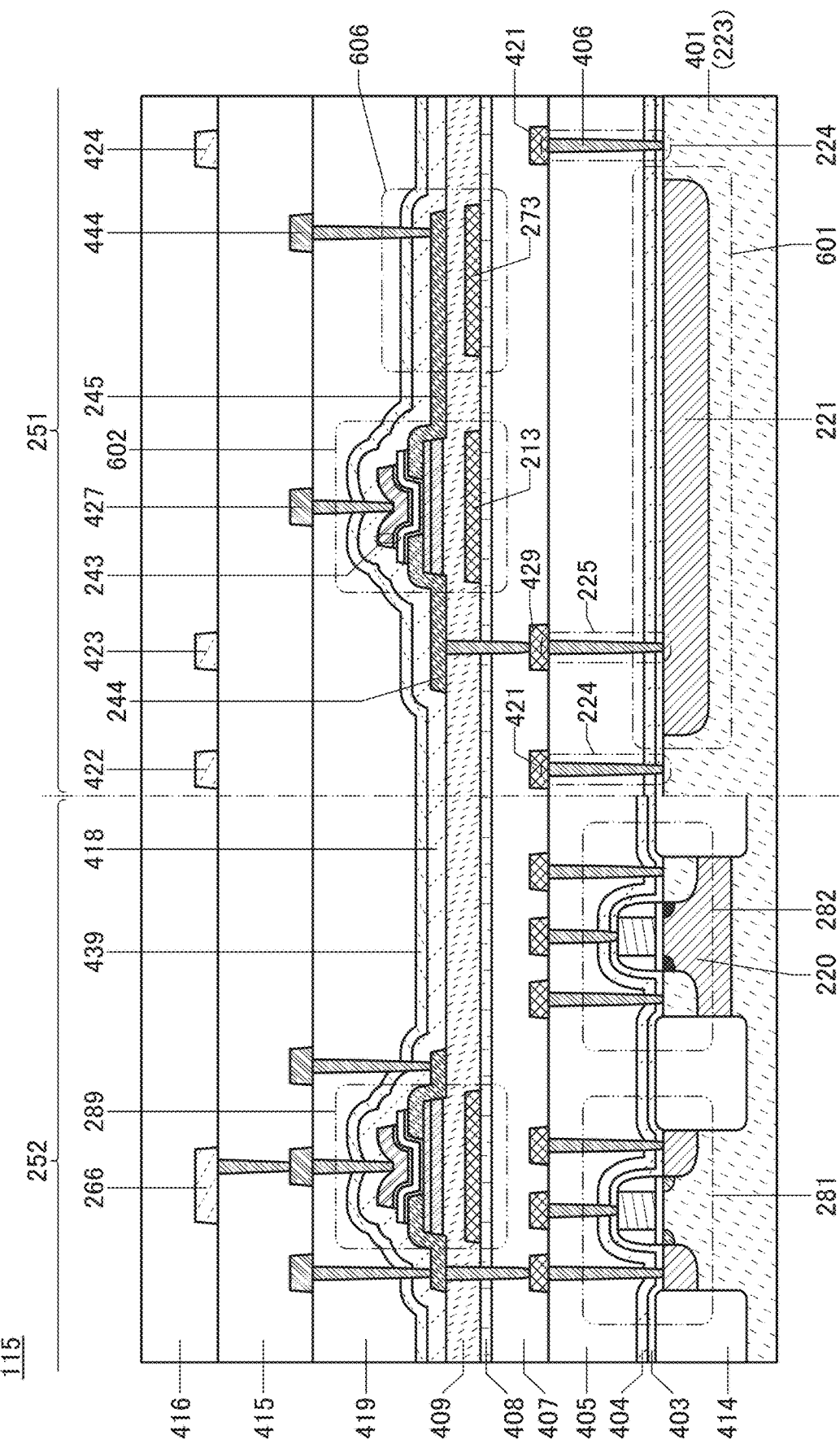
FIG. 27 A view illustrating a structure example of an imaging device.

FIG. 27 illustrates a structure example of an imaging device which is different from the ones in FIG. 22 and FIG. 26. In each of the transistors 602 and 289 illustrated in FIG. 27, an electrode 213 functioning as a back gate is provided in a region overlapping with the semiconductor layer 242 with the insulating layer 409 positioned therebetween. In addition, the electrode 273 included in the capacitor 606 is provided in a region overlapping with the electrode 245 with the insulating layer 409 positioned therebetween.

In the case where the electrode 213 functioning as a back gate is provided in each of the transistors 602 and 289, the electrode 273 can be formed using part of a conductive layer for forming the electrode 213. The electrode 213 and the electrode 273 can be concurrently formed over the same layer with the use of the same manufacturing method and material. That is, the electrode 213 and the electrode 273 are layers which have processed into the island shapes through the same deposition step and the same etching step.

In addition, the electrode 213 and the electrode 273 can be formed using a material and a method similar to those of the electrode 243. Note that in the case where the capacitor 606 has a light-transmitting property, a conductive material having a light-transmitting property is preferably used for the electrode 245 and the electrode 273. When the capacitor 606 has a light-transmitting property, the effective aperture ratio can be increased. Moreover, there is no need to separately perform a step for forming the electrode 273; thus, the producibility of the imaging device can be increased.

Note that the variety of films such as the metal film, the semiconductor film, and the inorganic insulating film which are disclosed in this specification and the like can be formed by a sputtering method or a plasma CVD method; however, they may be formed by another method, for example, a thermal CVD (Chemical Vapor Deposition) method. For example, an MOCVD (Metal Organic Chemical Vapor Deposition) method or an ALD (Atomic Layer Deposition) method may be employed as a thermal CVD method.

A thermal CVD method, which is a deposition method using no plasma, has an advantage that no defect due to plasma damage is generated.

Deposition by a thermal CVD method may be performed in such a manner that a source gas and an oxidizer are supplied at the same time to a chamber under an atmospheric pressure or a reduced pressure and react with each other in the vicinity of a substrate or over the substrate to be deposited over the substrate.

Furthermore, deposition by an ALD method may be performed in such a manner that the pressure in a chamber is set to an atmospheric pressure or a reduced pressure, source gases for reaction are sequentially introduced into the chamber, and the gas introduction sequence is repeated. For example, two or more kinds of source gases are supplied in turn to the chamber by switching respective switching valves (also referred to as high-speed valves). To prevent mixture of the plurality of source gases, an inert gas (e.g., argon or nitrogen) or the like is introduced at the same time as or after a first source gas, and then, a second source gas is introduced. Note that in the case where the inert gas is introduced at the same time, the inert gas serves as a carrier gas; the inert gas may also be introduced at the same time as the second source gas. Alternatively, instead of the introduction of the inert gas, the first source gas may be exhausted by vacuum evacuation, and then, the second source gas may be introduced. The first source gas is adsorbed on a surface of the substrate and deposited as a first layer, and then, the second source gas is introduced and reacts with it to form a second layer stacked over the first layer; thus, a thin film is formed. This gas introduction sequence is repeated a plurality of times until a desired thickness is obtained, whereby a thin film with excellent step coverage can be formed. The thickness of the thin film can be controlled by the number of times of repetition of the gas introduction sequence; therefore, the film thickness can be precisely controlled, which is suitable for manufacture of a minute FET (Field Effect Transistor).

The variety of films such as the metal film, the semiconductor film, and the inorganic insulating film which are disclosed in the above-described embodiments can be formed by a thermal CVD method such as an MOCVD method or an ALD method. For example, in the case where an In—Ga—Zn—O film is deposited, trimethylindium (In($CH_3$)$_3$), trimethylgallium (Ga($CH_3$)$_3$), and dimethylzinc (Zn($CH_3$)$_2$) are used. Furthermore, without limitation to this combination, triethylgallium (Ga($C_2H_5$)$_3$) can be used instead of trimethylgallium, and diethylzinc (Zn($C_2H_5$)$_2$) can be used instead of dimethylzinc.

For example, in the case where a hafnium oxide film is formed with a deposition apparatus employing ALD, two kinds of gases, i.e., ozone ($O_3$) as an oxidizer and a source gas which is obtained by vaporizing a liquid containing a solvent and a hafnium precursor compound (hafnium alkoxide or hafnium amide such as tetrakis(dimethylamide)hafnium (TDMAH, Hf[N($CH_3$)$_2$]$_4$)) are used. Another example of the material is tetrakis(ethylmethylamide)hafnium.

For example, in the case where an aluminum oxide film is formed with a deposition apparatus employing ALD, two kinds of gases, i.e., $H_2O$ as an oxidizer and a source gas which is obtained by vaporizing a liquid containing a solvent and an aluminum precursor compound (e.g., trimethylaluminum (TMA, Al($CH_3$)$_3$)) are used. Other examples of the material include tris(dimethylamide)aluminum, triisobutylaluminum, and aluminum tris(2,2,6,6-tetramethyl-3,5-heptanedionate).

For example, in the case where a silicon oxide film is formed with a deposition apparatus employing ALD, hexachlorodisilane is adsorbed on a surface on which a film is to be deposited, chlorine contained in the adsorbate is removed, and radicals of an oxidation gas ($O_2$ or dinitrogen monoxide) are supplied to react with the adsorbate.

For example, in the case where a tungsten film is deposited with a deposition apparatus employing ALD, a $WF_6$ gas and a $B_2H_6$ gas are alternately introduced to form an initial tungsten film, and then, a $WF_6$ gas and an $H_2$ gas are alternately introduced, so that a tungsten film is formed. Note that an $SiH_4$ gas may be used instead of a $B_2H_6$ gas.

For example, in the case where an oxide semiconductor film, e.g., an In—Ga—Zn—O film is deposited with a deposition apparatus employing ALD, an In($CH_3$)$_3$ gas and an $O_3$ gas) are alternately introduced to form an In—O layer, then, a Ga($CH_3$)$_3$ gas and an $O_3$ gas) are alternately introduced to form a GaO layer, and then, a Zn($CH_3$)$_2$ gas and an $O_3$ gas) are alternately introduced to form a ZnO layer. Note that the order of these layers is not limited to this example. A mixed oxide layer such as an In—Ga—O layer, an In—Zn—O layer, or a Ga—Zn—O layer may be formed using these gases. Note that although an $H_2O$ gas which is obtained by bubbling water with an inert gas such as Ar may be used instead of an $O_3$ gas), it is preferable to use an $O_3$ gas), which does not contain H. Furthermore, instead of an In($CH_3$)$_3$ gas, an In($C_2H_5$)$_3$ gas may be used. Similarly, instead of a Ga($CH_3$)$_3$ gas, a Ga($C_2H_5$)$_3$ gas may be used.

Modification Example 3

Figure 28:
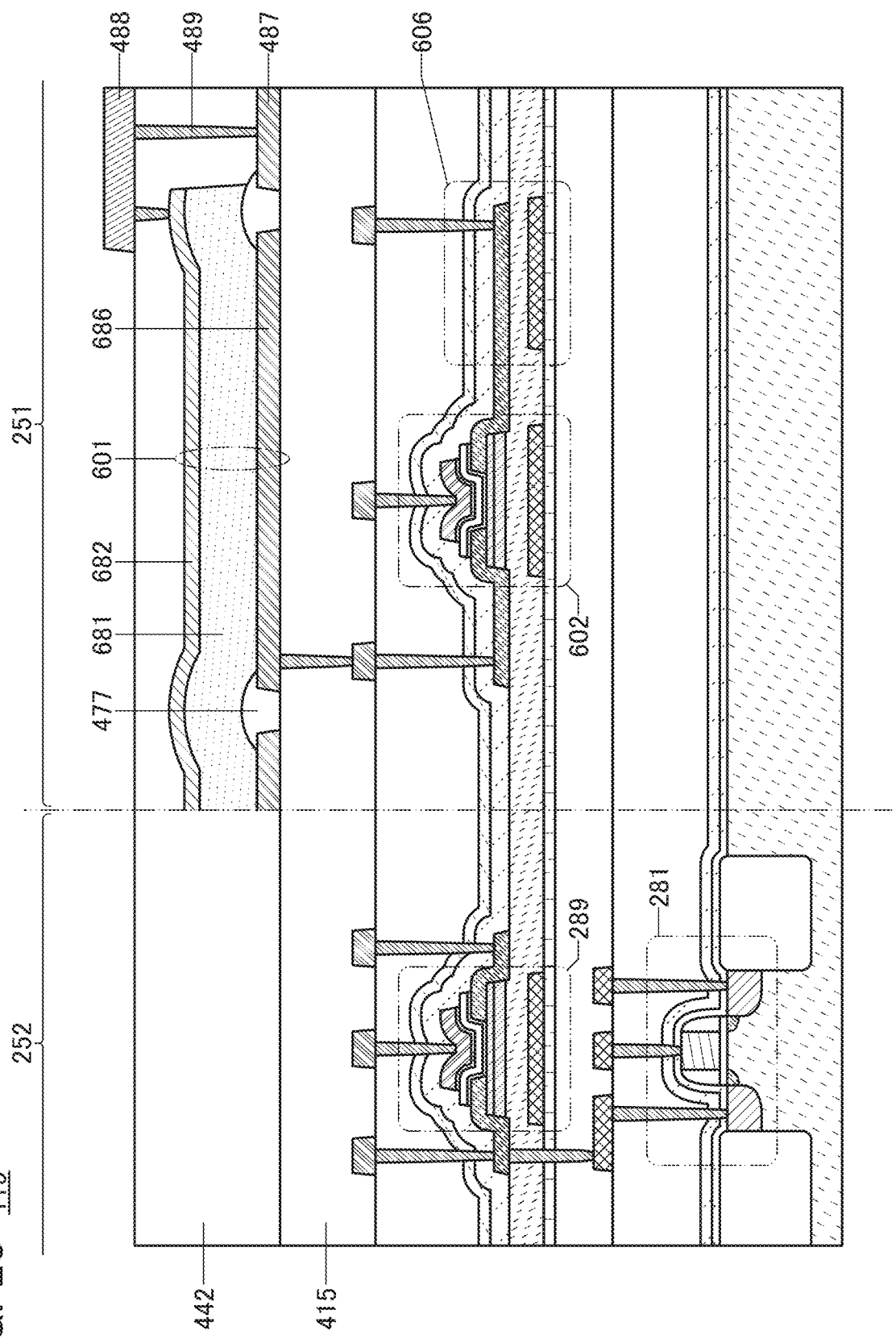
FIG. 28 A view illustrating a structure example of an imaging device.

FIG. 28 illustrates a structure example of the imaging device 115 which is different from the ones in FIG. 22, FIG. 26, and FIG. 27.

In the imaging device 115 illustrated in FIG. 28, the photoelectric conversion element 601 is provided over the insulating layer 415. The photoelectric conversion element 601 illustrated in FIG. 28 includes a photoelectric conversion layer 681 between an electrode 686 formed using a metal material or the like and a light-transmitting conductive layer 682. FIG. 28 illustrates an embodiment in which a selenium-based material is used for the photoelectric conversion layer 681. The photoelectric conversion element 601 in which the selenium-based material is used has characteristics with high external quantum efficiency with respect to visible light. This photoelectric conversion element enables a highly sensitive sensor in which the electronic amplification with respect to the amount of incident light is high owing to an avalanche phenomenon. Moreover, the selenium-based material, which has a high light-absorption coefficient, has an advantage that the thickness of the photoelectric conversion layer 681 can be easily reduced.

Amorphous selenium or crystalline selenium can be used as the selenium-based material. Crystalline selenium can be obtained by, for example, depositing amorphous selenium and then performing heat treatment. Note that when the crystal grain size of crystalline selenium is smaller than a pixel pitch, variation in characteristics between pixels can be reduced. Moreover, crystalline selenium has characteristics with higher spectral sensitivity and a higher light absorption coefficient with respect to visible light than amorphous selenium.

Note that the photoelectric conversion layer 681 is illustrated as a single layer; however, it is also possible to employ a structure in which gallium oxide, cerium oxide, or the like is provided as a hole injection blocking layer on the light-receiving surface side of the selenium-based material and nickel oxide, antimony sulfide, or the like is provided as an electron injection blocking layer on the electrode 686 side.

Furthermore, the photoelectric conversion layer 681 may be a layer including a compound of copper, indium, and selenium (CIS). Alternatively, it may be a layer including a compound of copper, indium, gallium, and selenium (CIGS). With CIS or CIGS, a photoelectric conversion element that can utilize an avalanche phenomenon as in the case of a single-layer selenium can be formed.

Furthermore, an n-type semiconductor such as cadmium sulfide or zinc sulfide may be provided in contact with CIS or CIGS, which are p-type semiconductors, in order to form a junction.

It is preferable to apply a relatively high voltage (e.g., 10 V or higher) to the photoelectric conversion element in order to cause an avalanche phenomenon. Since the OS transistor has characteristics with a higher drain withstand voltage than a Si transistor, the application of a relatively high voltage to the photoelectric conversion element is easy. Thus, by combination of the OS transistor having a high drain withstand voltage and the photoelectric conversion element in which the selenium-based material is used for the photoelectric conversion layer, a highly sensitive and highly reliable imaging device can be obtained.

For the light-transmitting conductive layer 682, for example, indium tin oxide, indium tin oxide containing silicon, indium oxide containing zinc, zinc oxide, zinc oxide containing gallium, zinc oxide containing aluminum, tin oxide, tin oxide containing fluorine, tin oxide containing antimony, or graphene can be used. In addition, the light-transmitting conductive layer 682 is not limited to a single layer and may be a stack of different films.

Figure 29A:
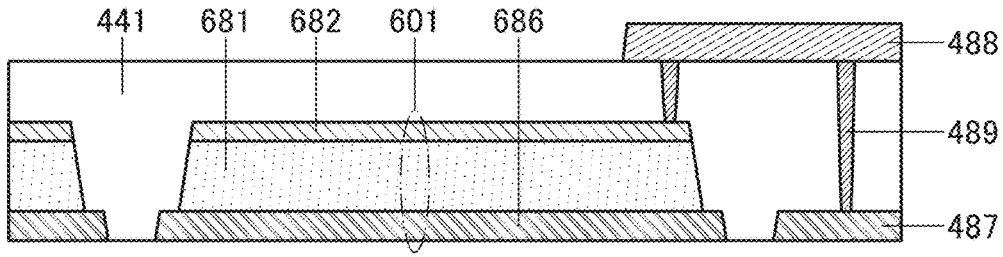
FIGS. 29A-29E Cross-sectional views each illustrating a connection mode of a photoelectric conversion element.
Figure 29B:
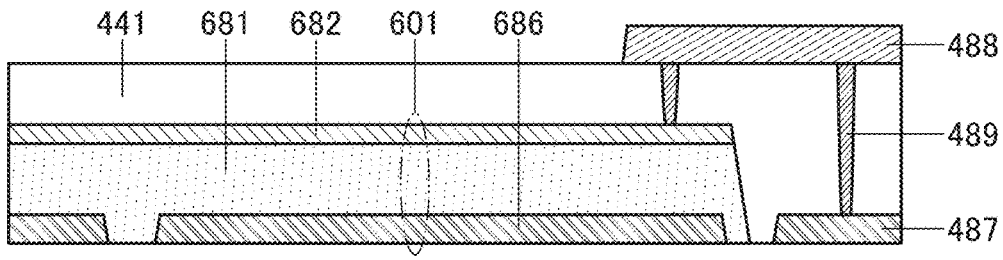
Figure 29C:
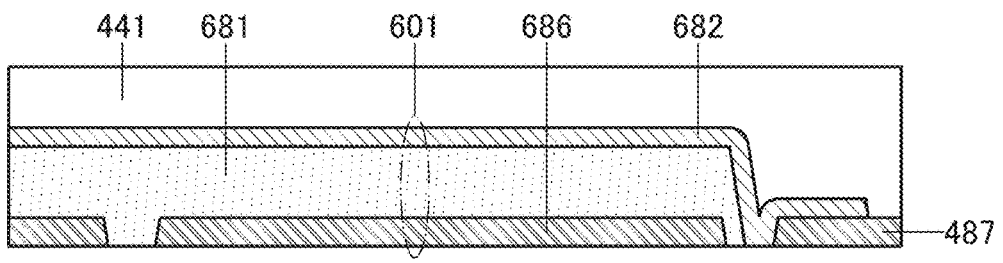
Figure 29D:
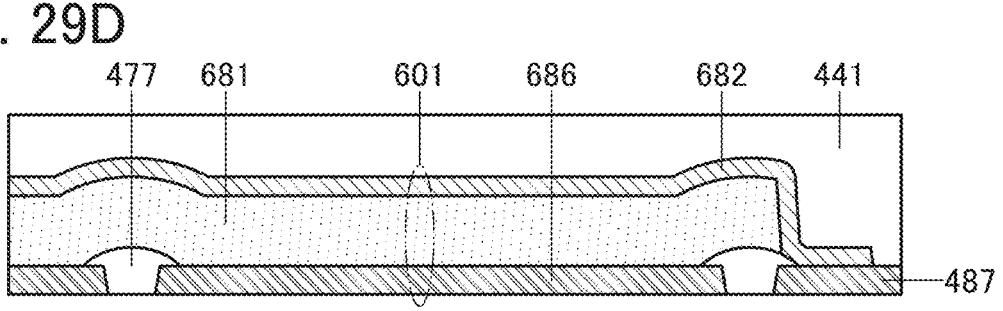

Note that in the structure in FIG. 28, the photoelectric conversion layer 681 and the light-transmitting conductive layer 682 are not divided for each pixel; however, they may be divided for each pixel as illustrated in FIG. 29(A). Furthermore, in a region which is between adjacent pixels and does not include the electrode 686, a partition wall 477 formed of an insulator is preferably provided to prevent a crack in the photoelectric conversion layer 681 and the light-transmitting conductive layer 682. As illustrated in FIG. 29(B), however, a structure without the partition wall 477 may also be employed. In addition, in the structure illustrated in FIG. 28, the light-transmitting conductive layer 682 and a wiring 487 are electrically connected to each other through a wiring 488 and a contact plug 489; however, as illustrated in FIG. 29(C) and FIG. 29(D), the light-transmitting conductive layer 682 and the wiring 487 may be in direct contact with each other.

Figure 29E:
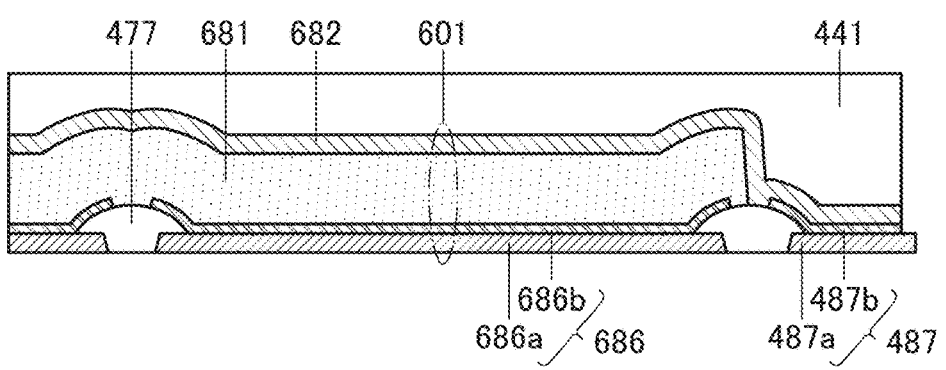

Furthermore, the electrode 686, the wiring 487, and the like may each have a structure in which a plurality of conductive layers is stacked. For example, as illustrated in FIG. 29(E), the electrode 686 can include two layers, i.e., a conductive layer 686*a* and a conductive layer 686*b*, and the wiring 487 can include two layers, i.e., a conductive layer 487*a* and a conductive layer 487*b*. In the structure in FIG. 29(E), for example, a low-resistance metal or the like is preferably selected to form the conductive layer 686*a* and the conductive layer 487*a*, and a metal or the like that exhibits an excellent contact property with the photoelectric conversion layer 681 is preferably selected to form the conductive layer 686*b* and the conductive layer 487*b*. Such a structure can improve the electrical characteristics of the photoelectric conversion element. In addition, some kinds of metal may cause electrochemical corrosion by being in contact with the light-transmitting conductive layer 682. Even in the case where such a metal is used for the conductive layer 487*a*, the conductive layer 487*b* can prevent electrochemical corrosion.

For the conductive layer 686*b* and the conductive layer 487*b*, for example, molybdenum or tungsten can be used. Furthermore, for the conductive layer 686*a* and the conductive layer 487*a*, for example, aluminum, titanium, or a titanium-aluminum-titanium stack can be used.

Furthermore, an insulating layer 442 may have a multi-layer structure. The partition wall 477 can be formed using an inorganic insulator, an insulating organic resin, or the like. In addition, the partition wall 477 may be colored black or the like in order to shield the transistors and the like from light and/or to determine the area of a light-receiving portion in each pixel.

Note that FIG. 28 illustrates an example of an embodiment in which the transistor 289 and the transistor 602 each include a back gate; however, an embodiment without a back gate may also be employed. In an alternative embodiment, at least one transistor, for example, only the transistor 289 may include a back gate. The back gate may be electrically connected to a gate provided on the opposite side. Alternatively, different fixed potentials may be supplied to the back gate and the gate. Note that the description of the presence or absence of the back gate can also apply to the other embodiments of the imaging device described in this embodiment.

Alternatively, a PIN diode element or the like in which an amorphous silicon film, a microcrystalline silicon film, or the like is used may be used as the photoelectric conversion element 601. The photodiode has a structure in which an n-type semiconductor layer, an i-type semiconductor layer, and a p-type semiconductor layer are sequentially stacked. Amorphous silicon is preferably used for the i-type semiconductor layer. Furthermore, amorphous silicon, microcrystalline silicon, or the like which includes dopants imparting the respective conductivity types can be used for the p-type semiconductor layer and the n-type semiconductor layer. A photodiode in which amorphous silicon is used for a photoelectric conversion layer has high sensitivity in a visible light wavelength region and therefore can easily detect weak visible light.

Note that a PN or PIN diode element is preferably provided such that the p-type semiconductor layer serves as a light-receiving surface. When the p-type semiconductor layer serves as a light-receiving surface, the output current of the photoelectric conversion element 601 can be increased.

The above-described photoelectric conversion element 601 formed using a selenium-based material, amorphous silicon, or the like can be formed in a general semiconductor manufacturing process including a deposition step, a lithography step, an etching step, and the like. In addition, since the resistance of the selenium-based material is high, the structure illustrated in FIG. 28 can also be employed, in which the photoelectric conversion layer 681 is not divided between pixels.

Furthermore, as illustrated in FIG. 30(A1) and FIG. 30(B1), the imaging device may be bent. FIG. 30(A1) illustrates a state in which the imaging device is bent in the direction of dashed-two dotted line X1-X2. FIG. 30(A2) is a cross-sectional view of a portion indicated by dashed-two dotted line X1-X2 in FIG. 30(A1). FIG. 30(A3) is a cross-sectional view of a portion indicated by dashed-two dotted line Y1-Y2 in FIG. 30(A1).

FIG. 30(B1) illustrates a state in which the imaging device is bent in the direction of dashed-two dotted line X3-X4 in the same drawing and bent in the direction of dashed-two dotted line Y3-Y4 in the same drawing. FIG. 30(B2) is a cross-sectional view of a portion indicated by dashed-two dotted line X3-X4 in FIG. 30(B1). FIG. 30(B3) is a cross-sectional view of a portion indicated by dashed-two dotted line Y3-Y4 in FIG. 30(B1).

The bent imaging device enables field curvature and astigmatism to be reduced. Thus, the optical design of lens or the like which is used in combination with the imaging device can be facilitated. For example, the number of lenses for aberration correction can be reduced; accordingly, the size or the weight of a semiconductor device or the like in which the imaging device is used can be easily reduced. In addition, the quality of a captured image can be improved. This embodiment can be implemented in an appropriate combination with any of the structures described in the other embodiments.

Embodiment 4

In this embodiment, structure examples of transistors that can be used as the transistors shown in the above embodiments will be described with reference to drawings.
[Bottom-Gate Transistor]
A transistor 410 illustrated as an example in FIG. 31(A1) is a channel-protective transistor that is a kind of bottom-gate transistor. The transistor 410 includes an electrode 246 that can function as a gate electrode over the insulating layer 409. Furthermore, the semiconductor layer 242 is provided over the electrode 246 with an insulating layer 216 positioned therebetween. The electrode 246 can be formed using a material and a method similar to those of the electrode 243. The insulating layer 216 can be formed using a material and a method similar to those of the insulating layer 117.

The transistor 410 further includes an insulating layer 209 that can function as a channel protective layer over a channel formation region of the semiconductor layer 242. The insulating layer 209 can be formed using a material and a method similar to those of the insulating layer 216. Furthermore, the electrode 244 and the electrode 245 are provided over the insulating layer 216 so as to be partly in contact with the semiconductor layer 242. Part of the electrode 244 and part of the electrode 245 are formed over the insulating layer 209.

With the insulating layer 209 provided over the channel formation region, the semiconductor layer 242 can be prevented from being exposed at the time of forming the electrode 244 and the electrode 245. Thus, the channel formation region of the semiconductor layer 242 can be prevented from being etched at the time of forming the electrode 244 and the electrode 245. According to one embodiment of the present invention, a transistor with favorable electrical characteristics can be provided.

Furthermore, the transistor 410 includes the insulating layer 418 over the electrode 244, the electrode 245, and the insulating layer 209 and includes the insulating layer 439 over the insulating layer 418.

A transistor 411 illustrated in FIG. 31(A2) is different from the transistor 410 in that the electrode 213 that can function as a back gate electrode is provided over the insulating layer 439. The electrode 213 can be formed using a material and a method similar to those of the electrode 243.

In general, a back gate electrode is formed using a conductive layer and positioned such that a channel formation region of a semiconductor layer is interposed between a gate electrode and the back gate electrode. Thus, the back gate electrode can function in a manner similar to that of the gate electrode. The potential of the back gate electrode may be equal to that of the gate electrode or may be a ground potential, a given potential, or the like. Furthermore, by changing the potential of the back gate electrode independently of that of the gate electrode, the threshold voltage of the transistor can be controlled.

The electrode 246 and the electrode 213 can each function as a gate electrode. Thus, the insulating layer 216, the insulating layer 209, the insulating layer 418, and the insulating layer 439 can each function as a gate insulating layer.

Note that in the case where one of the electrodes 246 and 213 is referred to as "gate electrode", the other may be referred to as "back gate electrode". For example, in the transistor 411, in the case where the electrode 213 is referred to as "gate electrode", the electrode 246 is referred to as "back gate electrode". Furthermore, in the case where the electrode 213 is used as "gate electrode", the transistor 411 can be regarded as a kind of top-gate transistor.

By providing the electrode 246 and the electrode 213 with the semiconductor layer 242 positioned therebetween, and furthermore, by setting the potentials of the electrode 246 and the electrode 213 to the same value, a region of the semiconductor layer 242 through which carriers flow is enlarged in the film thickness direction; thus, the number of transferred carriers is increased. As a result, the on-state current and the field-effect mobility of the transistor 411 are increased.

Thus, the transistor 411 is a transistor that has a high on-state current for the area it occupies. That is, the area occupied by the transistor 411 can be small for a required on-state current. According to one embodiment of the present invention, the area occupied by a transistor can be reduced. Therefore, according to one embodiment of the present invention, a semiconductor device having a high degree of integration can be provided.

Furthermore, the gate electrode and the back gate electrode are formed using conductive layers and thus each have a function of preventing an electric field generated outside the transistor from affecting the semiconductor layer in which the channel is formed (in particular, a function of blocking an electric field such as static electricity). When the back gate electrode is formed larger than the semiconductor layer such that the semiconductor layer is covered with the back gate electrode, the electric field blocking function can be enhanced.

Since the electrode 246 and the electrode 213 each have a function of blocking an electric field from the outside, charges of charged particles and the like generated below the electrode 246 and above the electrode 213 do not influence the channel formation region of the semiconductor layer 242. As a result, degradation due to a stress test (e.g., a -GBT (Gate Bias-Temperature) stress test) in which a negative charge is applied to a gate) is suppressed. Moreover, the electrode 246 and the electrode 213 can block an electric field generated from the drain electrode from affecting the semiconductor layer. Thus, a change in the rising voltage of the on-state current due to a change in drain voltage can be suppressed. Note that this effect is significant in the case where potentials are supplied to the electrode 246 and the electrode 213.

Note that the BT stress test is a kind of acceleration test and can evaluate, in a short time, a change caused by long-term use (a change over time) in characteristics of a transistor. In particular, the amount of change in the threshold voltage of a transistor by the BT stress test is an important indicator for examining the reliability. A smaller amount of change in threshold voltage by the BT stress test indicates that the transistor has higher reliability.

Moreover, by providing the electrode 246 and the electrode 213 and setting the potentials of the electrode 246 and the electrode 213 to the same value, the amount of change in threshold voltage is reduced. Accordingly, variation in electrical characteristics between a plurality of transistors is reduced as well.

In addition, the transistor including the back gate electrode shows a smaller change in threshold voltage by a +GBT stress test, in which a positive charge is applied to a gate, than a transistor including no back gate electrode.

In addition, a back gate electrode which is formed using a conductive film having a light-blocking property can prevent, in the case where light is incident on the back gate electrode side, light from entering the semiconductor layer from the back gate electrode side. Therefore, photodegradation of the semiconductor layer can be prevented, and deterioration in electrical characteristics of the transistor, such as a shift of the threshold voltage, can be prevented.

Furthermore, the electrode 213 may be provided between the insulating layer 418 and the insulating layer 439. Another insulating layer may exist between the electrode 213 and the insulating layer 439.

According to one embodiment of the present invention, a transistor with favorable reliability can be provided. Furthermore, a semiconductor device with favorable reliability can be provided.

A transistor 420 illustrated as an example in FIG. 31(B1) is a channel-protective transistor that is one of bottom-gate transistors. The transistor 420 has a structure substantially similar to that of the transistor 410 but is different in that the insulating layer 209 covers the semiconductor layer 242. Furthermore, the semiconductor layer 242 and the electrode 244 are electrically connected to each other in an opening portion formed by selectively removing part of the insulating layer 209 which overlaps with the semiconductor layer 242. Similarly, the semiconductor layer 242 and the electrode 245 are electrically connected to each other in another opening portion formed by selectively removing part of the insulating layer 209 which overlaps with the semiconductor layer 242. A region of the insulating layer 209 which overlaps with the channel formation region can function as a channel protective layer.

A transistor 424 illustrated in FIG. 31(B2) is different from the transistor 420 in that the electrode 213 that can function as a back gate electrode is provided over the insulating layer 439.

With the insulating layer 209, the semiconductor layer 242 can be prevented from being exposed at the time of forming the electrode 244 and the electrode 245. Thus, the semiconductor layer 242 can be prevented from being reduced in thickness at the time of forming the electrode 244 and the electrode 245.

Moreover, the distance between the electrode 244 and the electrode 246 and the distance between the electrode 245 and the electrode 246 in the transistor 420 and the transistor 424 are longer than those in the transistor 410 and the transistor 411. Thus, the parasitic capacitance generated between the electrode 244 and the electrode 246 can be reduced. The parasitic capacitance generated between the electrode 245 and the electrode 246 can also be reduced. According to one embodiment of the present invention, a transistor with favorable electrical characteristics can be provided.

A transistor 425 illustrated in FIG. 31(C1) is a channel-etched transistor that is one of bottom-gate transistors. In the transistor 425, the electrode 244 and the electrode 245 are formed without using the insulating layer 209. Thus, part of the semiconductor layer 242 which is exposed when the electrode 244 and the electrode 245 are formed is etched in some cases. On the other hand, since the insulating layer 209 is not provided, the producibility of the transistor can be increased.

A transistor 426 illustrated in FIG. 31(C2) is different from the transistor 420 in that the electrode 213 that can function as a back gate electrode is provided over the insulating layer 439.

[Top-Gate Transistor]

A transistor 430 illustrated as an example in FIG. 32(A1) is a kind of top-gate transistor. In the transistor 430, the semiconductor layer 242 is provided over the insulating layer 409, the electrode 244 which is in contact with part of the semiconductor layer 242 and the electrode 245 which is in contact with part of the semiconductor layer 242 are provided over the semiconductor layer 242 and the insulating layer 409, the insulating layer 216 is provided over the semiconductor layer 242, the electrode 244, and the electrode 245, and the electrode 246 is provided over the insulating layer 216.

In the transistor 430, the electrode 246 and the electrode 244 do not overlap with each other, and the electrode 246 and the electrode 245 do not overlap with each other; therefore, the parasitic capacitance generated between the electrode 246 and the electrode 244 and the parasitic capacitance generated between the electrode 246 and the electrode 245 can be reduced. Moreover, after the formation of the electrode 246, an impurity element 255 is introduced into the semiconductor layer 242 with the use of the electrode 246 as a mask, so that impurity regions can be formed in the semiconductor layer 242 in a self-aligned (self-alignment) manner (see FIG. 32(A3)). According to one embodiment of the present invention, a transistor with favorable electrical characteristics can be provided.

Note that the introduction of the impurity element 255 can be performed with an ion doping apparatus, an ion implantation apparatus, or a plasma treatment apparatus.

As the impurity element 255, for example, at least one kind of element of Group 13 elements and Group 15 elements can be used. Alternatively, in the case where an oxide semiconductor is used for the semiconductor layer 242, it is also possible to use at least one kind of element of a rare gas, hydrogen, and nitrogen as the impurity element 255.

A transistor 431 illustrated in FIG. 32(A2) is different from the transistor 430 in that the electrode 213 and an insulating layer 217 are provided. The transistor 431 includes the electrode 213 formed over the insulating layer 409 and the insulating layer 217 formed over the electrode 213. As described above, the electrode 213 can function as a back gate electrode. Thus, the insulating layer 217 can function as a gate insulating layer. The insulating layer 217 can be formed using a material and a method similar to those of the insulating layer 216.

Like the transistor 411, the transistor 431 is a transistor that has a high on-state current for the area it occupies. That is, the area occupied by the transistor 431 can be small for a required on-state current. According to one embodiment of the present invention, the area occupied by a transistor can be reduced. Therefore, according to one embodiment of the present invention, a semiconductor device having a high degree of integration can be provided.

A transistor 440 illustrated as an example in FIG. 32(B1) is one of top-gate transistors. The transistor 440 is different from the transistor 430 in that the semiconductor layer 242 is formed after the formation of the electrode 244 and the electrode 245. Furthermore, a transistor 441 illustrated as an example in FIG. 32(B2) is different from the transistor 440 in that the electrode 213 and the insulating layer 217 are provided. In the transistor 440 and the transistor 441, part of the semiconductor layer 242 is formed over the electrode 244 and another part of the semiconductor layer 242 is formed over the electrode 245.

Like the transistor 411, the transistor 441 is a transistor that has a high on-state current for the area it occupies. That is, the area occupied by the transistor 441 can be small for a required on-state current. According to one embodiment of the present invention, the area occupied by a transistor can be reduced. Therefore, according to one embodiment of the present invention, a semiconductor device having a high degree of integration can be provided.

Also in the transistor 440 and the transistor 441, after the formation of the electrode 246, the impurity element 255 is introduced into the semiconductor layer 242 with the use of the electrode 246 as a mask, so that impurity regions can be formed in the semiconductor layer 242 in a self-aligned manner. According to one embodiment of the present invention, a transistor with favorable electrical characteristics can be provided. Furthermore, according to one embodiment of the present invention, a semiconductor device having a high degree of integration can be provided.

[S-Channel Type Transistor]

FIG. 33 illustrates a structure example of a transistor in which an oxide semiconductor is used for the semiconductor layer 242. A transistor 450 illustrated as an example in FIG. 33 has a structure in which the semiconductor layer 242b is formed over the semiconductor layer 242a and the semiconductor layer 242c covers a top surface and a side surface of the semiconductor layer 242b and a side surface of the semiconductor layer 242a. FIG. 33(A) is a top view of the transistor 450. FIG. 33(B) is a cross-sectional view (a cross-sectional view in the channel length direction) of a portion indicated by dashed-dotted line X1-X2 in FIG. 33(A). FIG. 33(C) is a cross-sectional view (a cross-sectional view in the channel width direction) of a portion indicated by dashed-dotted line Y1-Y2 in FIG. 33(A).

In the transistor 450 illustrated in FIG. 33, the semiconductor layer 242b is provided over a projection of the insulating layer 409. When the semiconductor layer 242b is provided over the projection of the insulating layer 409, the side surface of the semiconductor layer 242b can be covered with the electrode 243. That is, the transistor 450 has a structure in which the semiconductor layer 242b can be electrically surrounded by an electric field of the electrode 243. Such a transistor structure in which a semiconductor layer in which a channel is formed is electrically surrounded by an electric field of a conductive film is called a surrounded channel (s-channel) structure. In addition, a transistor having the s-channel structure is also referred to as "s-channel type transistor" or "s-channel transistor".

In the s-channel structure, a channel is formed in the whole (bulk) of the semiconductor layer 242b in some cases. In the s-channel structure, the drain current of the transistor can be increased, so that a higher on-state current can be obtained. Furthermore, the entire region of the channel formation region formed in the semiconductor layer 242b can be depleted by an electric field of the electrode 243. Accordingly, the off-state current of the transistor with the s-channel structure can be further reduced.

Note that when the height of the projection of the insulating layer 409 is increased and the channel width is reduced, the effects of the s-channel structure, such as an increase in on-state current and a reduction in off-state current, can be enhanced. Furthermore, part of the semiconductor layer 242a exposed in the formation of the semiconductor layer 242b may be removed. In this case, the side surfaces of the semiconductor layer 242a and the semiconductor layer 242b may be aligned with each other.

Figure 34A:
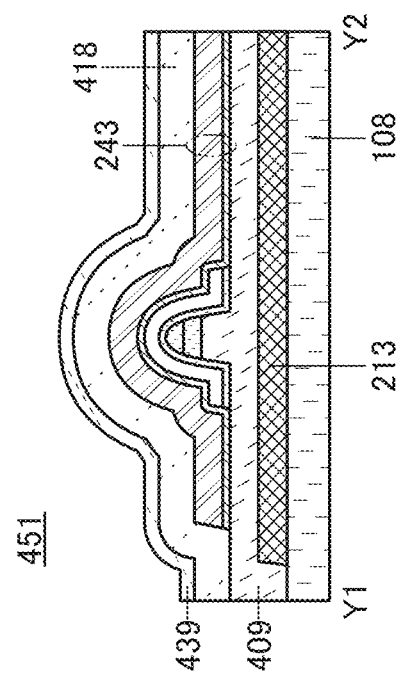
FIGS. 34A-34C Views illustrating an example of a transistor.
Figure 34B:
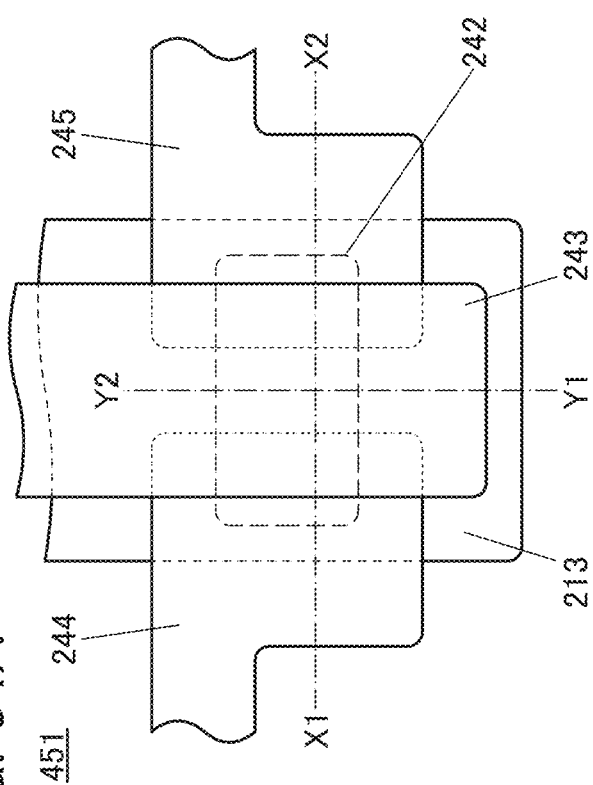
Figure 34C:
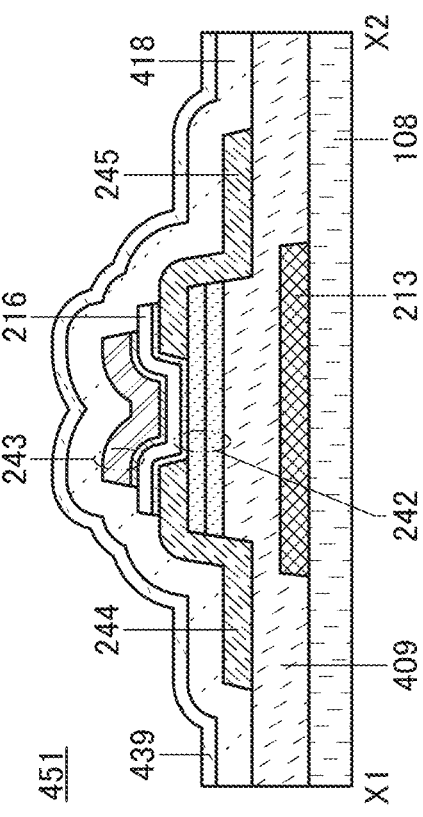

Furthermore, as in a transistor 451 illustrated in FIG. 34, the electrode 213 may be provided below the semiconductor layer 242 with an insulating layer positioned therebetween. FIG. 34(A) is a top view of the transistor 451. FIG. 34(B) is a cross-sectional view of a portion indicated by dashed-dotted line X1-X2 in FIG. 34(A). FIG. 34(C) is a cross-sectional view of a portion indicated by dashed-dotted line Y1-Y2 in FIG. 34(A).

FIG. 35 illustrates another example of a transistor with the s-channel structure. In a transistor 452 illustrated as an example in FIG. 35, the electrode 244 and the electrode 245 are provided over the semiconductor layer 242b and are not in contact with the side surfaces of the semiconductor layer 242b and the semiconductor layer 242a. The electrode 244 is electrically connected to an electrode 434 via a contact plug in an opening provided in the insulating layer 418, the insulating layer 439, and the insulating layer 419. The electrode 245 is electrically connected to an electrode 435 via a contact plug in an opening provided in the insulating layer 418, the insulating layer 439, and the insulating layer 419.

According to one embodiment of the present invention, the area occupied by a transistor can be reduced. Therefore, according to one embodiment of the present invention, a semiconductor device having a high degree of integration can be provided.

Figure 36A:
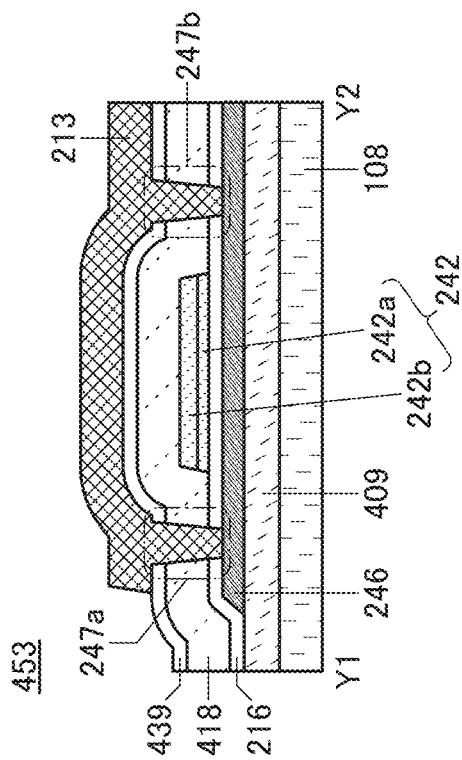
FIGS. 36A-36C Views illustrating an example of a transistor.
Figure 36B:
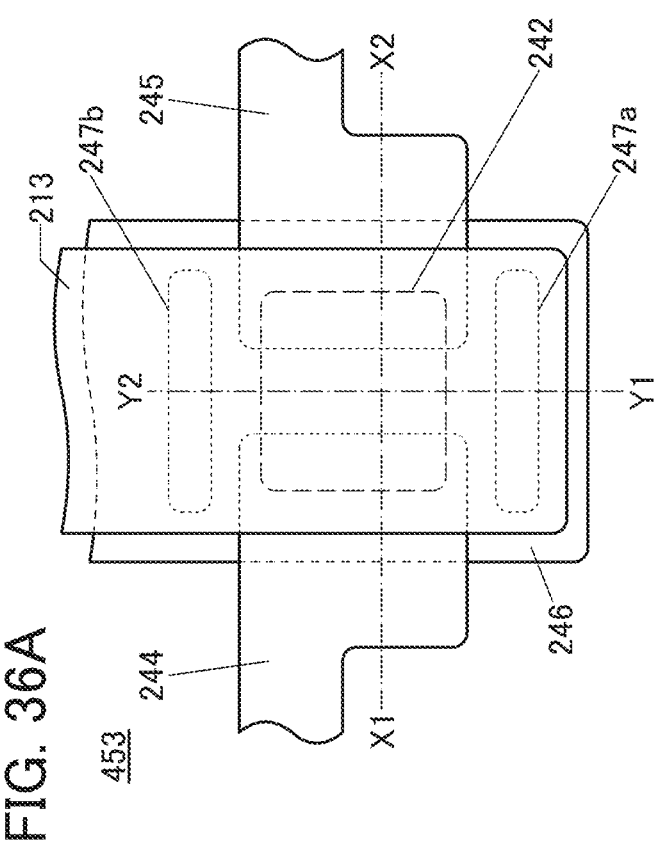
Figure 36C:
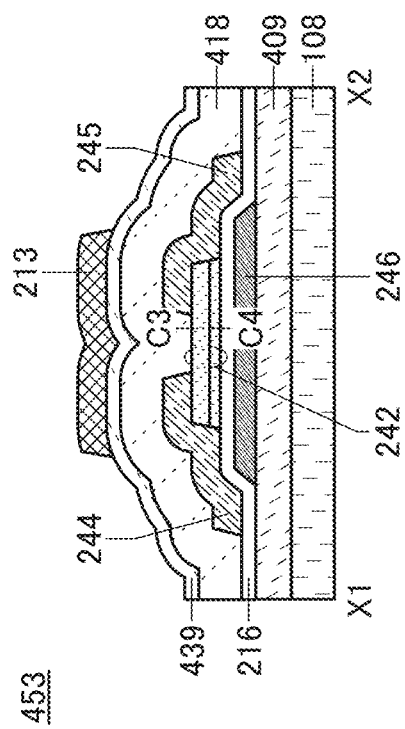

FIG. 36 illustrates another example of a transistor with the s-channel structure. In a transistor 453 illustrated as an example in FIG. 36, the semiconductor layer 242b is formed over the semiconductor layer 242a. The transistor 453 is a kind of bottom-gate transistor including a back gate electrode. FIG. 36(A) is a top view of the transistor 453. FIG. 36(B) is a cross-sectional view (a cross-sectional view in the channel length direction) of a portion indicated by dashed-dotted line X1-X2 in FIG. 36(A). FIG. 36(C) is a cross-sectional view (a cross-sectional view in the channel width direction) of a portion indicated by dashed-dotted line Y1-Y2 in FIG. 36(A).

The electrode 213 provided over the insulating layer 439 is electrically connected to the electrode 246 in an opening 247a and an opening 247b which are provided in the insulating layer 216, the insulating layer 418, and the insulating layer 439. Thus, the same potential is supplied to the electrode 213 and the electrode 246. Furthermore, either the opening 247a or the opening 247b may be omitted. Furthermore, both the opening 247a and the opening 247b may be omitted. In the case where neither the opening 247a nor the opening 247b is provided, different potentials can be supplied to the electrode 213 and the electrode 246.

Note that the transistor 453 is shown as an example in which the semiconductor layer 242 has a two-layer structure of the semiconductor layer 242a and the semiconductor layer 242b.

Figure 37:
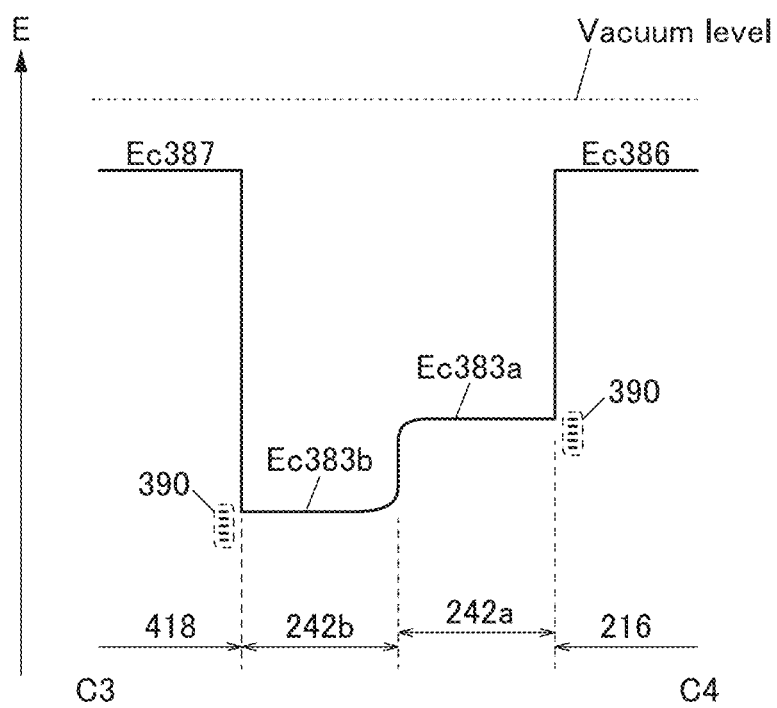
FIG. 37 A diagram illustrating an energy band structure.

FIG. 37 is an energy band structure diagram of a portion indicated by dashed-dotted line C3-C4 in FIG. 36(B). FIG. 37 illustrates the energy band structure of a channel formation region of the transistor 453.

In FIG. 37, Ec387 denotes the energy of the conduction band minimum of the insulating layer 418. The semiconductor layer 242 includes two layers, i.e., the semiconductor layer 242a and the semiconductor layer 242b; thus, the producibility of the transistor can be increased. Note that the absence of the semiconductor layer 242c allows the trap states 390 to have a larger influence; however, as compared with the case where the semiconductor layer 242 has a single-layer structure, high field-effect mobility can be obtained.

According to one embodiment of the present invention, a transistor with low power consumption can be provided. Accordingly, an imaging device or the like with low power consumption can be provided. According to one embodiment of the present invention, a transistor with favorable reliability can be provided. Accordingly, an imaging device or the like with favorable reliability can be provided.

This embodiment can be implemented in an appropriate combination with any of the structures described in the other embodiments.

REFERENCE NUMERALS

100: car
101: steering
102: dashboard
108: airbag
110: occupant protection device
112: pixel driver circuit
114: pixel
115: imaging device
117: insulating layer
119: sensor
120: control device
123: wiring
131: airbag device
132: airbag device
140: pixel portion
141: pixel
209: insulating layer
213: electrode
216: insulating layer
217: insulating layer
219: insulating layer
220: well
221: p-type semiconductor
223: n-type semiconductor
224: opening
225: opening
242: semiconductor layer
243: electrode
244: electrode
245: electrode
246: electrode
252: peripheral circuit region
255: impurity element
260: circuit
261: signal processing circuit
262: column driver circuit
263: output circuit
264: circuit
265: wiring
266: wiring
267: wiring
268: wiring
269: wiring
270: circuit
273: electrode
277: insulating layer
280: circuit
281: transistor
282: transistor
283: formation region
284: low-concentration p-type impurity region
285: high-concentration p-type impurity region
286: insulating layer
287: electrode
288: sidewall
289: transistor
290: circuit
382: Ec
386: Ec
387: Ec
390: trap state
401: substrate
403: insulating layer
404: insulating layer
405: insulating layer
406: contact plug
407: insulating layer
408: insulating layer
409: insulating layer
410: transistor
411: transistor
414: element isolation layer
415: insulating layer
416: insulating layer
418: insulating layer
419: insulating layer
420: transistor
421: wiring
422: wiring
423: wiring
424: transistor
425: transistor
427: wiring
429: wiring
430: transistor
431: transistor
434: electrode
435: electrode
439: insulating layer
440: transistor
441: transistor
442: insulating layer
444: wiring
450: transistor
451: transistor
452: transistor
453: transistor
477: partition wall
487: wiring
488: wiring
489: contact plug
601: photoelectric conversion element
602: transistor
603: transistor
604: transistor
605: transistor
606: capacitor
607: node
608: wiring
609: wiring
610: circuit
611: wiring
681: photoelectric conversion layer
682: light-transmitting conductive layer
686: electrode
900: car
1283: channel formation region
1284: low-concentration n-type impurity region
1285: high-concentration n-type impurity region
5100: pellet
5120: substrate 5161: region
103a: door
103b: door
104a: door
104b: door
108c: semiconductor layer
111a: imaging device
111b: imaging device
111c: imaging device
112a: imaging device
112b: imaging device
112c: imaging device
113a: imaging device
113b: imaging device
114a: imaging device
114b: imaging device
133a: airbag device
133b: airbag device
134a: airbag device
134b: airbag device
242a: semiconductor layer
242b: semiconductor layer
242c: semiconductor layer
243a: electrode
243b: electrode
247a: opening
247b: opening
264a: circuit
264b: counter circuit
264c: latch circuit
272c: semiconductor layer
383a: Ec
383b: Ec
383c: Ec
487a: conductive layer
487b: conductive layer
686a: conductive layer
686b: conductive layer

The invention claimed is:

1. An imaging device comprising:
a pixel portion comprising a plurality of pixels arranged in a matrix; and
a driver circuit,
wherein each of the plurality of pixels comprises a light-receiving element, a first transistor, and a capacitor which is electrically connected to a cathode of the light-receiving element through the first transistor,
wherein the driver circuit comprises a second transistor,
wherein the second transistor is on a different layer from the first transistor, the capacitor, and the light-receiving element,
wherein the first transistor and the capacitor are overlapped with an anode of the light-receiving element,
wherein the first transistor comprises a first channel formation region, a first conductive layer as a first gate, and a source or drain,
wherein the second transistor comprises a second channel formation region and a second conductive layer as a second gate,
wherein the anode of the light-receiving element is on a first side of the first channel formation region,
wherein the first conductive layer is on a second side which is on the side opposite to the first side of the first channel formation region,
wherein the anode of the light-receiving element is on a first side of the second channel formation region,
wherein the second conductive layer is on the first side of the second channel formation region,
wherein a first electrode of the capacitor is on the same layer as the first conductive layer, and
wherein a second electrode of the capacitor is on the same layer as a third conductive layer which is electrically connected to the source or drain of the first transistor.

2. An imaging device comprising:
a pixel portion comprising a plurality of pixels arranged in a matrix; and
a driver circuit,
wherein each of the plurality of pixels comprises a light-receiving element, a first transistor, and a capacitor which is electrically connected to a cathode of the light-receiving element through the first transistor,
wherein the driver circuit comprises a second transistor,
wherein the second transistor is on a different layer from the first transistor, the capacitor, and the light-receiving element,
wherein the first transistor and the capacitor are overlapped with an anode of the light-receiving element,
wherein the first transistor comprises a first channel formation region, a first conductive layer as a first gate, and a source or drain,
wherein the second transistor comprises a second channel formation region and a second conductive layer as a second gate,
wherein the anode of the light-receiving element is on a first side of the first channel formation region,
wherein the first conductive layer is on a second side which is on the side opposite to the first side of the first channel formation region,
wherein the anode of the light-receiving element is on a first side of the second channel formation region,
wherein the second conductive layer is on the first side of the second channel formation region,
wherein a first electrode of the capacitor is on the same layer as the first conductive layer,
wherein a second electrode of the capacitor is on the same layer as a third conductive layer which is electrically connected to the source or drain of the first transistor, and
wherein a side surface of the light-receiving element is in contact with an insulating layer.

3. The imaging device according to claim 1, wherein the first transistor comprises an oxide semiconductor in the first channel formation region.

4. The imaging device according to claim 1, wherein the light-receiving element comprises selenium.

5. The imaging device according to claim 1, further comprising a wiring including copper,
wherein the wiring is electrically connected to the first transistor.

6. The imaging device according to claim 2, wherein the first transistor comprises an oxide semiconductor in the first channel formation region.

7. The imaging device according to claim 2, wherein the light-receiving element comprises selenium.

8. The imaging device according to claim 2, further comprising a wiring including copper,
wherein the wiring is electrically connected to the first transistor.

* * * * *